(12) United States Patent
Omichi

(10) Patent No.: US 8,159,756 B2
(45) Date of Patent: Apr. 17, 2012

(54) VARIABLE FOCAL LENGTH LENS SYSTEM IMAGE PICK UP APPARATUS

(75) Inventor: Hiroshi Omichi, Tokyo (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/662,489

(22) Filed: Apr. 20, 2010

(65) Prior Publication Data
US 2010/0296172 A1 Nov. 25, 2010

(30) Foreign Application Priority Data
May 25, 2009 (JP) ................................. 2009-125425

(51) Int. Cl.
G02B 15/14 (2006.01)

(52) U.S. Cl. ........ 359/687; 359/683; 359/684; 359/685; 359/715; 359/740; 359/774

(58) Field of Classification Search .......... 359/683–687, 359/715, 739, 740, 774
See application file for complete search history.

(56) References Cited

U.S. PATENT DOCUMENTS

| | | | |
|---|---|---|---|
| 2002/0012174 A1* | 1/2002 | Horiuchi | 359/687 |
| 2006/0221462 A1* | 10/2006 | Hamano | 359/687 |
| 2007/0091460 A1* | 4/2007 | Saruwatari et al. | 359/687 |
| 2008/0106798 A1* | 5/2008 | Sato | 359/687 |
| 2008/0180807 A1* | 7/2008 | Saruwatari | 359/687 |
| 2009/0116121 A1* | 5/2009 | Take | 359/687 |
| 2010/0097497 A1* | 4/2010 | Bito et al. | 359/683 |

FOREIGN PATENT DOCUMENTS

| | | |
|---|---|---|
| JP | 2007-094174 | 4/2007 |
| JP | 2008-046208 | 2/2008 |
| JP | 2008-102165 | 5/2008 |
| JP | 2008-146016 | 6/2008 |

* cited by examiner

Primary Examiner — Evelyn A. Lester
(74) Attorney, Agent, or Firm — Rader, Fishman & Grauer PLLC

(57) ABSTRACT

A vari-focal length lens system includes a first lens group having a positive refractive power, a second lens group having a negative refractive power, a third lens group having a positive refractive power, and a fourth lens group having a positive refractive power. In the second lens group, each of the object-side surface of the negative lens arranged on the object side and the object-side surface of the positive lens is formed in an aspherical shape and satisfies the following conditional expression:

$$2.0 < f1/(fw \cdot ft)^{1/2} < 2.5$$

wherein
f1 is a focal length of the first lens group,
fw is a focal length in the whole lens system in a wide angle end state, and ft is a focal length in the whole lens system in a telephoto end state.

20 Claims, 25 Drawing Sheets

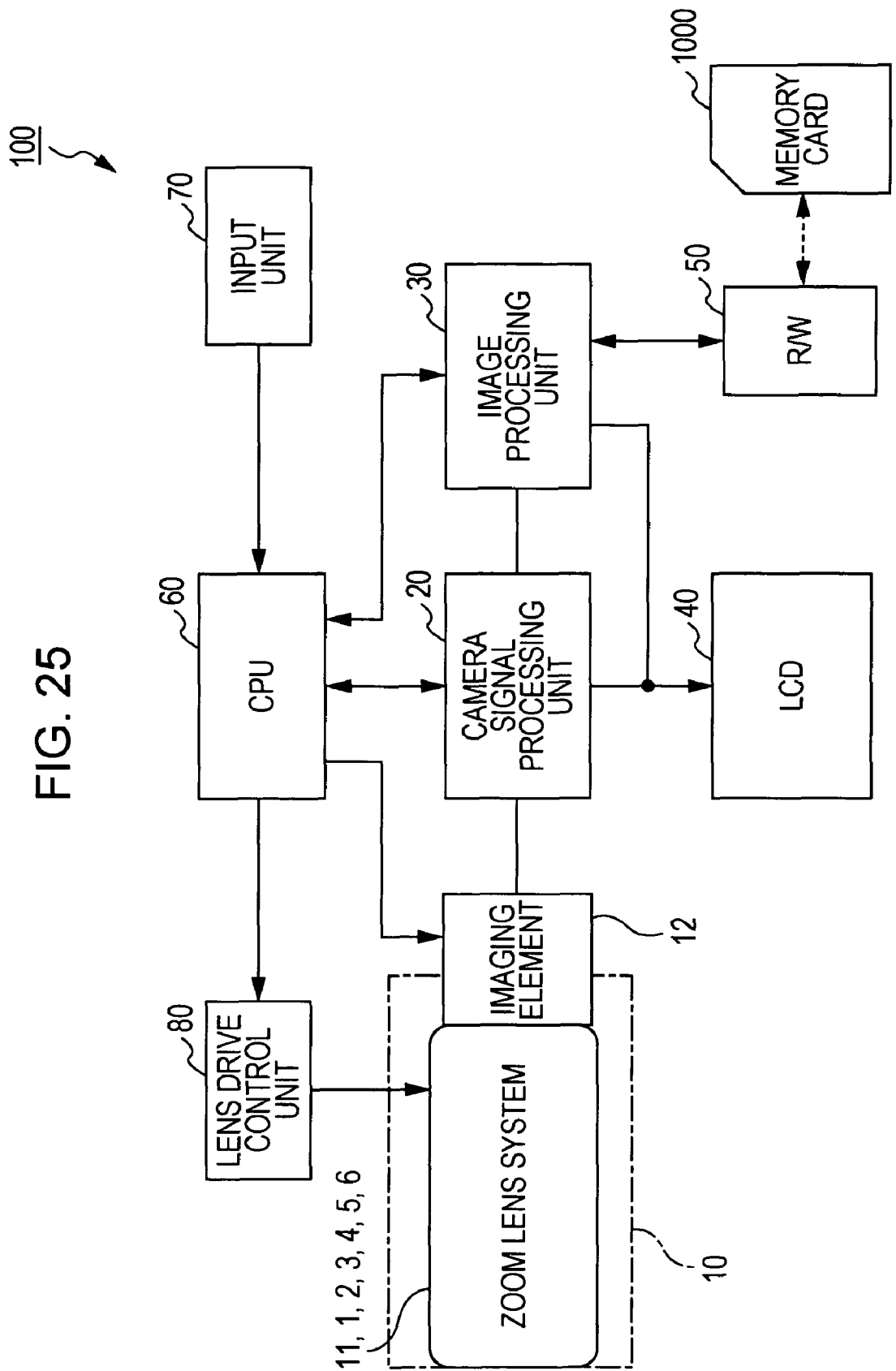

VARIABLE FOCAL LENGTH LENS SYSTEM IMAGE PICK UP APPARATUS

BACKGROUND OF THE INVENTION

1. Field of the Invention

The present invention relates to a variable focal length lens system and an image pickup apparatus, and specifically to a variable focal length lens system and an image pickup apparatus which can be used for a video camera, a digital still camera, or the like while providing an angle view of 70 degrees or more and a zoom ratio of seven or more.

2. Description of the Related Art

The recording method of a camera, which has been known in the art, includes allowing an imaging element using a photoelectric conversion element, such as a charge coupled device (CCD) or a complementary metal oxide semiconductor (CMOS), to form an object image on the surface of the imaging element and allowing each of photoelectric conversion elements to convert the light quantity of the subject image formed on the subject image into an electric output.

Attempts have been made to increase the speed of a central processing unit (CPU) and the integration of a storage medium with recent advancement in fine processing technology. Image data of large capacity, which had not been dealt with, can now be processed at high speed. In addition, attempts have been also made to increase the integration of a light receiving element while decreasing the size thereof to record higher space frequency.

However, the high integration and size reduction as described above had caused a decrease in light reception surface of each photoelectric conversion element, causing an increase in influence of noise with a decrease in electric output. Thus, to reduce the influence of noise, there is an attempt to cause an increase in amount of light reaching to the light receiving element by increasing the aperture ratio of an optical system. In addition, there is also an attempt to place a minute lens element referred to as a microlens array in front of each light receiving element.

The microlens array restricts the exit pupil position of a lens system instead of guiding a light flux traveling between the adjacent elements onto the target element. The more the exist pupil position of the lens system approaches the light receiving element, the more the angle of a principal ray reaching to the light receiving element with the optical axis. Thus, an off-axis light flux directing to a screen-surrounding part forms a large angle with the optical axis. As a result, the light quantity necessary for the light receiving element is not obtained, thereby causing shortage of light quantity.

In recent years, the needs of users have been diversified as digital cameras have become widely used.

In particular, there is a demand of a small-sized camera with a zoom lens of a high variable magnification ratio (variable focal length lens system, hereinafter, also referred to as a vari-focal length lens system) a zoom lens with a variable magnification ratio of more than seven has been provided, while there is a demand of a small-sized camera with a zoom lens of a high variable magnification ratio (vari-focal length lens system).

The type of a zoom lens which has been commonly used as one with a high variable magnification ratio is one of a so-called "positive-negative-positive-positive" four-group type. The zoom lens of the "positive-negative-positive-positive" four-group type includes a first lens group having a positive refractive power, a second lens group having a negative refractive power, a third lens group having a positive refractive power, and a fourth lens group, having a positive refractive power. In the zoom lens of the "positive-negative-positive-positive" four-group type, when the positional lens state changes from a wide angle end state with the longest focal length to a telephoto end state with the shortest focal length, the distance between the first lens group and the second lens group increases while the distance between the second lens group and the third lens group decreases. Each of the first to third lens groups moves and the movement of the fourth lens group compensates for a variation in image surface position.

As an example of such a zoom lens of the "positive-negative-positive-positive" four-group type, a zoom lens disclosed in Japanese Published Patent Application No. 2008-146016 has been known in the art.

In recent years, the number of wide-angle zoom lenses with zoom ratios of more than 10 has been increased. As such wide-angle zoom lenses, a so-called "negative precedence type" lens in which the first lens group has a negative refractive power has been used in many cases.

For example, in the case of a zoom lens described in Japanese Published Patent Application No. 2007-94174 includes two lens groups, a first lens group having a negative refractive power and a second lens group having a positive refractive power. These lenses are arranged from the object side to the image side in this order.

In addition, a zoom lens described in Japanese Published Patent Application No. 2008-46208 includes a first lens having a negative refractive power, a second lens group having a positive refractive power, and a third refractive group having a negative refractive power, and a fourth lens group having a positive refractive index, which are arranged from the object side to the image side in this order.

Furthermore, in recent years, an aspheric surface lens has come into popular use and a so-called positive precedence type zoom lens having a first lens group with a positive refractive power has also come into use in many cases.

For example, in a positive-precedence zoom lens described in Japanese Published Patent Application No. 2008-102165, aspherical surface lenses are abundantly used for attaining a wider angle and a higher magnification.

SUMMARY OF THE INVENTION

However, for simultaneously attaining an angle of view of 75 degrees and a higher variable power of almost 10, the negative-precedence type zoom lens causes a temporally spread optical ray at a telephoto end state. Thus, the light flux with a larger diameter may pass through each of the second and subsequent lens groups, calling for better correction of a spherical aberration. As a result, both a shorter length of a lens and a smaller diameter thereof have been demanded.

The above needs are hardly occurred in the positive-precedence type zoom lens, such as a zoom lens of the "positive-negative-positive-positive" four-group type. However, an off-axis light flux incident on the first lens group exists at a large angle with the optical axis in a wide angle end state. As a result, there is a necessity of a larger diameter of each lens in the first group and a remarkable decrease in performance of the zoom lens due to the eccentric relationship between the first lens group and the second lens group.

Therefore, for example, the zoom lens described in Japanese Published Patent Application No. 2008-102165 may secure an angle of view of about 75 degrees at most.

Therefore, there is a necessity of providing the vari-focal length lens system and the image pickup apparatus of the present embodiment which are reduced in size and provided with a higher variable power and a wider angle.

According to a first embodiment of the present invention, a vari-focal length lens system includes a first lens group having a positive refractive power, a second lens group having a negative refractive power, a third lens group having positive refractive power, and a fourth lens group having a positive refractive power, which are arranged from an object side to an image side.

When a positional lens state is changed from a wide angle end state to a telephoto end state, the distance between the first lens group and the second lens group increases, the distance between the second lens group and the third lens group decreases, and the distance between the third lens group and the fourth lens group varies. When a positional lens state is changed from a wide angle end state to a telephoto end state, all of the lens groups are movable, an aperture stop is arranged near the third lens group, and the fourth lens group moves at the time of short distance focusing. The first lens group includes a negative lens with a concave that faces to an image and a positive lens with a convex that faces an object. These lenses are arranged from the object side to the image side in this order. The second lens group includes a negative lens with a concave side to the image, a negative lens with a concave that faces to the object and an opposite concave that faces to the image, and a meniscus-shaped positive lens with a convex that faces to the object. The lenses are arranged in this order from the object side to the image side. In the second lens group, each of the object-side surface of the negative lens arranged on the object side and the object-side surface of the positive lens is formed in an aspherical shape and satisfies the following conditional expression (1):

$$2.0 < f1/(fw \cdot ft)^{1/2} < 2.5, \text{ wherein} \tag{1}$$

f1: focal length of the first lens group;
fw: focal length in the whole lens system in a wide angle end state; and ft: focal length in the whole lens system in a telephoto end state.

In the above vari-focal length lens system, an aberration-correcting function is secured, the first lens group can be thinned, and negative spherical aberration generated by the first lens group can be appropriately corrected.

In the above-mentioned vari-focal length lens system, it is desirable to satisfy the following conditional expression (2):

$$0.65 < |dwt1/dt| < 0.9, \text{ wherein} \tag{2}$$

dwt1: a moving distance of the first lens group; and
dt: an air spacing between the first lens group and the second lens group in a telephoto end state.

When the vari-focal length lens system satisfies the conditional expression (2), a zoom ratio is secured and the full length of the lens system can be shorted at the time of each of a telephoto state and a collapsed state.

In the above-mentioned vari-focal length lens system, it is desirable to satisfy the following conditional expression (3).

$$0.42 < |f2|/(fw \cdot ft)^{1/2} < 0.49, \text{ wherein} \tag{3}$$

f2: focal length of the second lens group;
fw: focal length in the whole lens system in a wide angle end state; and
ft: focal length in the whole lens system in a telephoto end state.

When the vari-focal length lens system satisfies the conditional expression (3), an off-axis aberration on the periphery of a screen is suppressed, and a variation in off-axis aberration accompanying a variation in positional lens state is suppressed.

In the vari-focal length lens system, the aperture stop is arranged on the object side of the third lens group and moves together with the third lens group when the positional lens state changes, while being expected to satisfy the following conditional expression (4).

$$0.44 < dS3/R31 < 0.58, \text{ wherein} \tag{4}$$

dS3: the distance between the aperture stop and the nearest surface of the third lens group from an image plane, and
R31: the curvature radius of the nearest surface of the third lens group from an object.

When the vari-focal length lens system is designed as described above and satisfies the conditional expression (4), A negative spherical aberration generated in the third lens group can be suppressed, and the entire length of the lens system in a telephoto end state can be shortened.

It is preferable that the above vari-focal length lens system should satisfy the following conditional expression (5).

$$1.75 < f3/fw < 2.1, \text{ wherein} \tag{5}$$

f3: focal length of the third lens group; and
fw: focal length in the whole lens system in a wide angle end state.

When the vari-focal length lens system satisfies the conditional expression (5), a variation in coma aberration occurred with a change in angle of view in a wide angle state and the whole length of the system can be shortened.

An image pickup apparatus includes a vari-focal length lens system and an imaging element that converts an optical image formed by the vari-focal length lens system into an electrical signal. The vari-focal length lens system includes a first lens group having a positive refractive power, a second lens group having a negative refractive power, a third lens group having positive refractive power, and a fourth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. When a positional lens state is changed from a wide angle end state to a telephoto end state, all of the lens groups are movable, an aperture stop is arranged near the third lens group, and the fourth lens group moves at the time of short distance focusing. The first lens group includes a negative lens with a concave that faces to an image and a positive lens with a convex that faces an object. These lenses are arranged from the object side to the image side in this order. The second lens group includes a negative lens with a concave that faces to an image, a negative lens with a concave that faces to the object and an opposite concave that faces to the image, and a meniscus-shaped positive lens with a convex that faces to the object. These lenses are arranged from an object side to an image side. In the second lens group, each of the object-side surface of the negative lens arranged on the object side and the image-side surface of the positive lens is formed in an aspherical shape and satisfies the following conditional expression (1):

$$2.0 < f1/(fw \cdot ft)^{1/2} < 2.5, \text{ wherein} \tag{1}$$

f1: focal length of the first lens group;
fw: focal length in the whole lens system in a wide angle end state; and
ft: focal length in the whole lens system in a telephoto end state.

In the above image pickup apparatus, an aberration-correcting function is secured, the first lens group can be thinned, and negative spherical aberration generated by the first lens group can be appropriately corrected.

Another vari-focal length lens system, a first lens group having a positive refractive power, a second lens group having a negative refractive power, a third lens group having positive refractive power, a fourth lens group having a positive refractive power, and a fifth lens group having a positive refractive power. These lenses are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. The position of the fifth lens group is fixed for variable power. When a positional lens state is changed from a wide angle end state to a telephoto end state, each of the first to fourth lens groups is movable, an aperture stop is arranged near the third lens group, and the fourth lens group moves at the time of short distance focusing. The first lens group includes a negative lens with a concave that faces to an image and a positive lens with a convex that faces an object. The lenses are arranged from the object side to the image side in this order. The second lens group includes a negative lens with a concave that faces to an image, a negative lens with a concave that faces to the object and an opposite concave that faces to the image, and a meniscus-shaped positive lens with a convex that faces to the object. The lenses are arranged in this order from the object side to the image side. In the second lens group, each of the object-side surface of the negative lens arranged on the object side and the image-side surface of the positive lens is formed in an aspherical shape and satisfies the following conditional expression (7):

$$2.4 < f1/(fw \cdot ft)^{1/2} < 2.7, \text{ wherein} \tag{7}$$

f1: focal length of the first lens group;
fw: focal length in the whole lens system in a wide angle end state; and
ft: focal length in the whole lens system in a telephoto end state.

In another vari-focal length lens system, an aberration-correcting function is secured, the first lens group can be thinned, and negative spherical aberration generated by the first lens group can be appropriately corrected.

In addition, the arrangement of the fixed fifth lens group allows light incident on the imaging element to be almost in parallel with the optical axis.

It is preferable that the above another vari-focal length lens system should satisfy the following conditional expression (8).

$$5 < |dwt1/dwt2| < 5.8, \text{ wherein} \tag{8}$$

dwt1: a moving distance of the first lens group; and
dwt2: a moving distance of the second lens group.

When the another vari-focal length lens system satisfies the conditional expression (8), a zoom ratio is secured and the full length of the lens system can be shorted at the time of each of a telephoto state and a collapsed state.

It is preferable that the above another vari-focal length lens system should satisfy the following conditional expression (9).

$$0.47 < |f2|/(fw \cdot ft)^{1/2} < 0.53, \text{ wherein} \tag{9}$$

f2: focal length of the second lens group;
fw: focal length in the whole lens system in a wide angle end state; and
ft: focal length in the whole lens system in a telephoto end state.

When the another vari-focal length lens system is designed as described above and satisfies the conditional expression (9), an off-axis aberration on the periphery of a screen is suppressed, and a variation in off-axis aberration accompanying a variation in positional lens state is suppressed.

In the above another vari-focal length lens system, the aperture stop is arranged on the object side of the third lens group. When the positional lens state changes, the aperture stop moves together with the third lens group, while satisfying the following conditional expressions (10).

$$0.53 < dS3/R31 < 0.59, \text{ wherein} \tag{10}$$

dS3: the distance between the aperture stop and the nearest surface of the third lens group from an image plane, and
R31: the curvature radius of the nearest surface of the third lens group from an object.

When the another vari-focal length lens system is designed as described above and satisfies the conditional expression (10), a negative spherical aberration generated in the third lens group can be suppressed, and the entire length of the lens system in a telephoto end state can be shortened.

In the another above-mentioned vari-focal length lens system, it is desirable to satisfy the following conditional expressions (11);

$$2.1 < f3/fw < 2.3, \text{ wherein} \tag{11}$$

f3: focal length of the third lens group; and
fw: focal length in the whole lens system in a wide angle end state.

When the another vari-focal length lens system satisfies the conditional expression (11), a variation in coma aberration with a change in angle of view in a wide angle end state is suppressed, and the entire length of the lens system can be shortened.

It is preferable that the above another vari-focal length lens system should satisfy the following conditional expression (12).

$$5.6 < f5/fw < 7.2, \text{ wherein} \tag{12}$$

f5: focal length of the fifth lens group; and
fw: focal length in the whole lens system in a wide angle end state.

When another vari-focal length lens system satisfies the conditional expression (12), a wider angle can be obtained in the wide angle end state and a field curvature can be reduced.

Another image pickup apparatus includes a vari-focal length lens system and an imaging element that converts an optical image formed by the vari-focal length lens system into an electrical signal. The vari-focal length lens system includes a first lens group having a positive refractive power, a second lens group having a negative refractive power, a third lens group having positive refractive power, a fourth lens group having a positive refractive power, and a fifth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. The position of the fifth lens group is fixed for variable power. When a positional lens state is changed from a wide angle end state to a telephoto end state, each of the first to fourth lens groups is movable, an aperture stop is arranged near the third lens group, and the fourth lens group moves at the time of short distance focusing. The first lens group includes a negative lens with a concave side to the image and a positive lens with a convex that faces to the object. The lenses are arranged from an object side to an image side. The second lens group includes a negative lens with a concave side to the image and a negative lens with a concave that faces to the object and an opposite concave that faces to the image, and a meniscus-shaped positive lens with a convex that faces to the object. The lenses are arranged from an object side to an image side. In the second lens group, each of the object-side surface of the negative lens arranged on the object side and the object-side surface of the positive lens is formed in an aspherical shape and satisfies the following conditional expression (7):

$$2.4 < f1/(fw \cdot ft)^{1/2} < 2.7, \text{ wherein} \quad (7)$$

f1: focal length of the first lens group;
fw: focal length in the whole lens system in a wide angle end state; and
ft: focal length in the whole lens system in a telephoto end state.

In the above another image pickup apparatus, an aberration-correcting function is secured, the first lens group can be thinned, and negative spherical aberration generated by the first lens group can be appropriately corrected.

In addition, the arrangement of the fixed fifth lens group allows light incident on the imaging element to be almost in parallel with the optical axis.

Effect of the Invention

The vari-focal length lens system according to the embodiment of the present invention includes a first lens group having a positive refractive power, a second lens group having a negative refractive power, a third lens group having positive refractive power, and a fourth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. When a positional lens state is changed from a wide angle end state to a telephoto end state, all of the lens groups are movable, an aperture stop is arranged near the third lens group, and the fourth lens group moves at the time of short distance focusing. The first lens group includes a negative lens with a concave side to the image and a positive lens with a convex that faces to the object. The lenses are arranged from an object side to an image side. The second lens group includes a negative lens with a concave side to the image and a negative lens with a concave that faces to the object and an opposite concave that faces to the image, and a meniscus-shaped positive lens with a convex that faces to the object. The lenses arranged from an object side to an image side. In the second lens group, each of the object-side surface of the negative lens arranged on the object side and the object-side surface of the positive lens is formed in an aspherical shape and satisfies the following conditional expression (1):

$$2.0 < f1/(fw \cdot ft)^{1/2} < 2.5, \text{ wherein} \quad (1)$$

f1: focal length of the first lens group;
fw: focal length in the whole lens system in a wide angle end state; and
ft: focal length in the whole lens system in a telephoto end state.

Therefore, the lens can be thinned after securing an aberration-correcting function. In addition, the size reduction can be attained after securing high optical performance.

According to the second embodiment of the present invention, the following conditional expression (2) is satisfied.

$$0.65 < |dwt1/dt| < 0.9, \text{ wherein} \quad (2)$$

dwt1: a moving distance of the first lens group; and
dt: an air spacing between the first lens group and the second lens group in a telephoto end state.

In addition, thickness reduction of the lens can be attained at the telephoto end and in a collapse state.

According to each of the third and fourth embodiments of the present invention, the following conditional expression (3) is satisfied.

$$0.42 < |f2|/(fw \cdot ft)^{1/2} < 0.49, \text{ wherein} \quad (3)$$

f2: focal length of the second lens group;
fw: focal length in the whole lens system in a wide angle end state; and
ft: focal length in the whole lens system in a telephoto end state.

Therefore, a high-order off-axis aberration on the periphery of a screen and an off-axis aberration with a variation in positional lens state are favorably corrected, so that high performance can be attained.

According to each of fifth and sixth embodiments of the present invention, the aperture stop is arranged on the object side of the third lens group.

When the positional lens state changes, the aperture stop moves together with the third lens group, while satisfying the following conditional expressions (4).

$$0.44 < dS3/R31 < 0.58, \text{ wherein} \quad (4)$$

dS3: the distance between the aperture stop and the nearest surface of the third lens group from an image plane, and
R31: the curvature radius of the nearest surface of the third lens group from an object.

Therefore, a negative spherical aberration generated in the third lens group can be favorably corrected, and the entire length of the lens system in a telephoto end state can be shortened, thereby attaining high performance.

According to each of seventh and eighth embodiments of the present invention, the following conditional expressions (5) is satisfied.

$$1.75 < f3/fw < 2.1, \text{ wherein} \quad (5)$$

f3: focal length of the third lens group; and
fw: focal length in the whole lens system in a wide angle end state.

Therefore, a variation in coma aberration with a change in angle of view in a wide angle end state is favorably corrected, and the entire length of the lens system can be shortened without depending the positional lens state.

The image pickup apparatus according to the embodiment of the present invention includes a vari-focal length lens system and an imaging element that converts an optical image formed by the vari-focal length lens system into an electrical signal. The vari-focal length lens system includes a first lens group having a positive refractive power, a second lens group having a negative refractive power, a third lens group having positive refractive power, and a fourth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. When a positional lens state is changed from a wide angle end state to a telephoto end state, all of the lens groups are movable, an aperture stop is arranged near the third lens group, and the fourth lens group moves at the time of short distance focusing. The first lens group includes a negative lens with a concave side to the image, a positive lens with a convex that faces to the object. The lenses are arranged from an object side to an image side.

The second lens group includes a negative lens with a concave that faces to an image, a negative lens with a concave that faces to the object and an opposite concave that faces to the image, and a meniscus-shaped positive lens with a convex that faces to the object. The lenses are arranged from an object side to an image side. In the second lens group, each of the object-side surface of the negative lens arranged on the object side and the image-side surface of the positive lens is formed in an aspherical shape and satisfies the following conditional expression (1):

$$2.0 < f1/(fw \cdot ft)^{1/2} < 2.5, \text{ wherein} \tag{1}$$

f1: focal length of the first lens group;
fw: focal length in the whole lens system in a wide angle end state; and
ft: focal length in the whole lens system in a telephoto end state.

Therefore, the first lens group can be thinned after securing an aberration-correcting function. In addition, the size reduction can be attained after securing high optical performance.

The another vari-focal length lens system according to the embodiment of the present invention includes a first lens group having a positive refractive power, a second lens group having a negative refractive power, a third lens group having positive refractive power, a fourth lens group having a positive refractive power, and a fifth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, and the distance between the third lens group and the fourth lens group varies. The position of the fifth lens group is fixed for variable power. When a positional lens state is changed from a wide angle end state to a telephoto end state, each of the first to fourth lens groups is movable, an aperture stop is arranged near the third lens group, and the fourth lens group moves at the time of short distance focusing. The first lens group includes a negative lens with a concave side to the image and a positive lens with a convex that faces to the object. The lenses are arranged from an object side to an image side. The second lens group includes a negative lens with a concave that faces to an image, a negative lens with a concave that faces to the object and an opposite concave that faces to the image, and a meniscus-shaped positive lens with a convex that faces to the object. The lenses are arranged from an object side to an image side. An object-side surface of the negative lens arranged at the object side in the second lens group. An image-side surface of the positive lens is formed in an aspherical surface, and this is trying to satisfy the following conditional expressions (7).

$$2.4 < f1/(fw \cdot ft)^{1/2} < 2.7, \text{ wherein} \tag{7}$$

f1: focal length of the first lens group;
fw: focal length in the whole lens system in a wide angle end state; and
ft: focal length in the whole lens system in a telephoto end state.

Therefore, the lens can be thinned after securing an aberration-correcting function.

In addition, the size reduction can be attained after securing high optical performance.

In addition, the refractive power of the fifth lens group shortens the focal length of the lens system composed of four lens groups to attain a wider angle, while favorably correcting the field curvature. As a result, the size reduction of the lens system can be attained.

According to the 11th embodiment of the present invention, the following conditional expression (8) is satisfied.

$$5 < |dwt1/dwt2| < 5.8, \text{ wherein} \tag{8}$$

dwt1: a moving distance of the first lens group; and dwt2: a moving distance of the second lens group.

In addition, thickness reduction of a zoom lens can be attained at the telephoto end and in a collapse state.

According to each of the 12th and 13th embodiments of the present invention, the following conditional expressions (9) is satisfied.

$$0.47 < |f2|/(fw \cdot ft)^{1/2} < 0.53, \text{ wherein} \tag{9}$$

f2: focal length of the second lens group;
fw: focal length in the whole lens system in a wide angle end state; and
ft: focal length in the whole lens system in a telephoto end state.

Therefore, a high-order off-axis aberration on the periphery of a screen and an off-axis aberration with a variation in positional lens state are favorably corrected, so that high performance can be attained.

According to each of the 14th and 15th embodiments of the present invention, the aperture stop is arranged on the object side of the third lens group. When the positional lens state changes, the aperture stop moves together with the third lens group, while satisfying the following conditional expressions (10).

$$0.53 < dS3/R31 < 0.59, \text{ wherein} \tag{10}$$

dS3: the distance between the aperture stop and the nearest surface of the third lens group from an image plane, and
R31: the curvature radius of the nearest surface of the third lens group from an object.

Therefore, a negative spherical aberration generated in the third lens group can be favorably corrected, and the entire length of the lens system in a telephoto end state can be shortened, thereby attaining high performance.

According to each of 16th and 17th embodiments of the present invention, the following conditional expression (11) is satisfied.

$$2.1 < f3/fw < 2.3, \text{ wherein} \tag{11}$$

f3: focal length of the third lens group; and
fw: focal length in the whole lens system in a wide angle end state.

Therefore, a variation in coma aberration with a change in angle of view in a wide angle end state is favorably corrected, and the entire length of the lens system can be shortened without depending the positional lens state.

According to each of 18th and 19th embodiments of the present invention, the following conditional expressions (12) is satisfied.

$$5.6 < f5/fw < 7.2, \text{ wherein} \tag{12}$$

f5: focal length of the fifth lens group; and
fw: focal length in the whole lens system in a wide angle end state.

Therefore, field curvature with a change in angle of view in a wide angle end state is favorably corrected, and the entire length of the lens system can be shortened without depending the positional lens state.

Another image pickup apparatus according to the embodiment of the present invention includes a vari-focal length lens system and an image element that converts an optical image formed by the vari-focal length lens system into an electrical signal. The vari-focal length lens system includes a first lens group having a positive refractive power, a second lens group having a negative refractive power, a third lens group having positive refractive power, a fourth lens group having a positive refractive power, and a fifth lens group having a positive refractive power, which are arranged from an object side to an image side. When a positional lens state is changed from a wide angle end state to a telephoto end state, the distance between the first lens group and the second lens group increases, the distance between the second lens group and the third lens group decreases, the distance between the third lens group and the fourth lens group varies, and the position of the fifth lens group is fixed for variable power. When a positional lens state is changed from a wide angle end state to a telephoto end state, each of the first to fourth lens groups is movable, an aperture stop is arranged near the third lens group, and the fourth lens group moves at the time of short distance focusing. The first lens group includes a negative lens with a concave side to the image and a positive lens with a convex that faces to the object. The lenses are arranged from an object side to an image side. The second lens group includes a negative lens with a concave that faces to an image, a negative lens with a concave that faces to the object and an opposite concave that faces to the image, and a meniscus-shaped positive lens with a convex that faces to the object. The lenses are arranged from an object side to an image side. In the second lens group, each of the object-side surface of the negative lens arranged on the object side and the image-side surface of the positive lens is formed in an aspherical shape and satisfies the following conditional expression (7):

$$2.4 < f1/(fw \cdot ft)^{1/2} < 2.7, \text{ wherein} \quad (7)$$

f1: focal length of the first lens group;
fw: focal length in the whole lens system in a wide angle end state; and
ft: focal length in the whole lens system in a telephoto end state.

Therefore, the lens can be thinned after securing an aberration-correcting function. In addition, the size reduction can be attained after securing high optical performance.

In addition, the refractive power of the fifth lens group shortens the focal length of the lens system composed of four lens groups to attain a wider angle, while favorably correcting the field curvature. As a result, the size reduction of the lens system can be attained.

BRIEF DESCRIPTION OF THE DRAWINGS

FIG. 25 is a block diagram illustrating an exemplary configuration of an image pickup apparatus according to one embodiment of the present invention.

DESCRIPTION OF THE PREFERRED EMBODIMENTS

Figure 1:
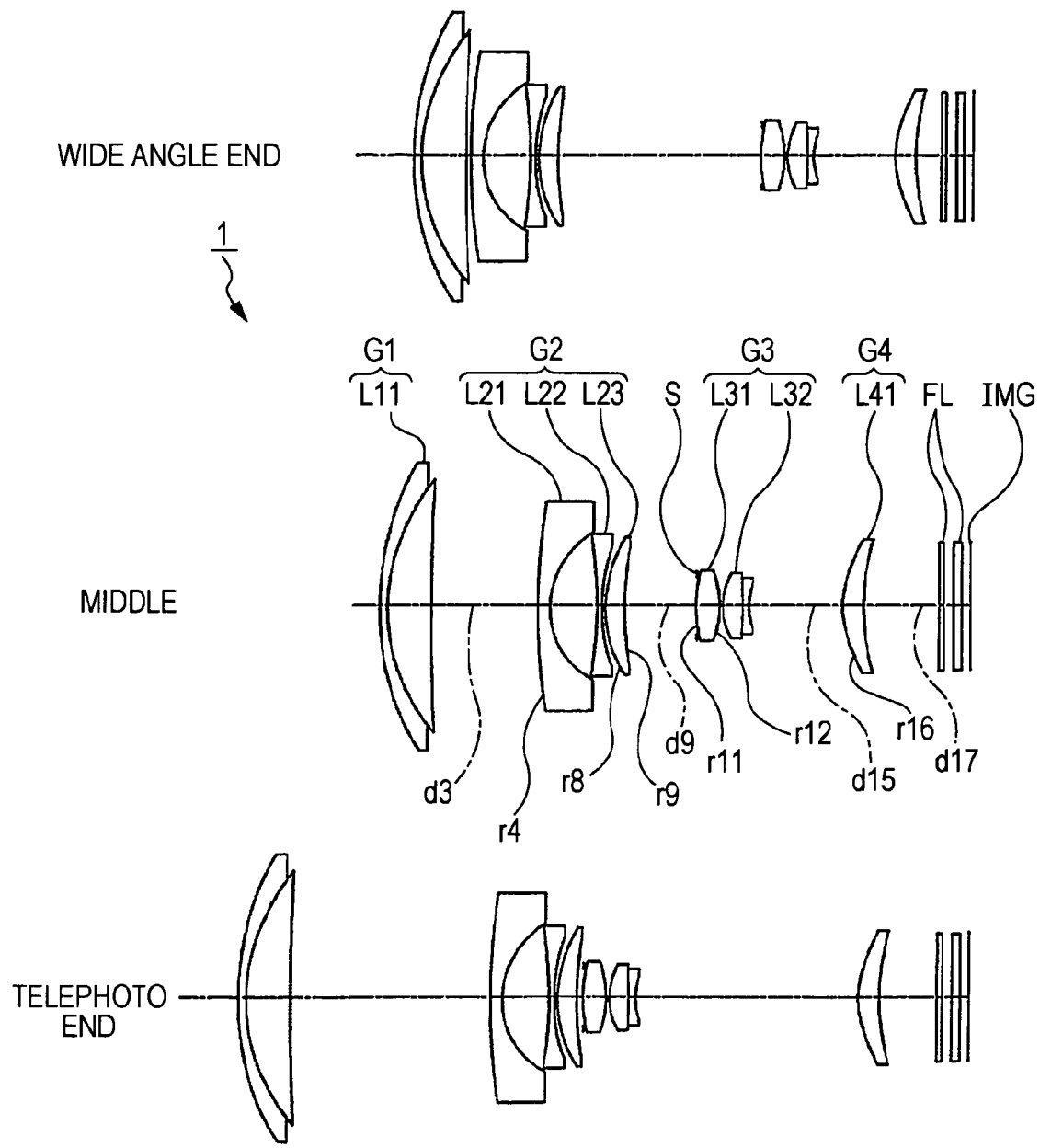
FIG. 1 is a diagram illustrating a lens arrangement in a vari-focal length lens system according to a first embodiment of the present invention.

Hereinafter, the best mode for carrying out the vari-focal length lens system and the image pickup apparatus according to any of the embodiments of the present invention will be described.

The vari-focal length lens system of image pickup apparatus according to any of embodiments of the present invention is those in which the vari-focal length lens system includes four lens groups, or first to fourth lens groups and the image pickup apparatus includes such a vari-focal length system. Furthermore, another vari-focal length lens system according to any of the embodiments of the present invention includes five lens groups, or first to fifth lens groups. In addition, another image pickup apparatus according to any of the embodiments of the present invention includes such a vari-focal length system.

[Configuration of Vari-Focal Length Lens System (Four Lens Groups)]

First, the vari-focal length lens system of the present embodiment with four lens groups, first to fourth lens groups, according to one embodiment of the present invention will be described.

The vari-focal length lens system of the present embodiment includes a first lens group having a positive refractive power, a second lens group having a negative refractive power, a third lens group having positive refractive power, and a fourth lens group having a positive refractive power, which are arranged from an object side to an image side.

In the vari-focal length lens system of the present embodiment, when a positional lens state is changed from a wide angle end state to a telephoto end state, the distance between the first lens group and the second lens group increases, the distance between the second lens group and the third lens group decreases, and the distance between the third lens group and the fourth lens group varies.

In the vari-focal length lens system of the present embodiment, when a positional lens state is changed from a wide angle end state to a telephoto end state, all of the lens groups are movable, an aperture stop is arranged near the third lens group, and the fourth lens group moves at the time of short distance focusing.

Hereinafter, the functions of each lens group in the vari-focal length lens system of the present embodiment will be described.

In the vari-focal length lens system of the present embodiment, a first lens group and a second lens group are arranged close to each other while being in a wide angle end state to make an off-axis light flux incident on the first lens group close to an optical axis. As a result, the diameters of the respective lenses can be reduced. Simultaneously, when a positional lens state is changed from a wide angle end state toward a telephoto end state, an increase in distance between the first lens group and the second lens group occurs. Thus, the off-axis light flux passing through the first lens group becomes far from the optical axis.

In the vari-focal length lens system of the present embodiment, a variation in off-axis aberration with a change in positional lens state is favorably correct using a change in height of the off-axis light flux. In particular, the whole length of the lens is shortened in a wide angle end state and lengthened in a telephoto end state to prevent the off-axis light flux incident on the first lens group from getting away from the optical axis too much.

The distance between a second lens group and a third lens group is lengthened to prevent the off-axis light flux passing through the second lens group from getting away from the optical axis too much. As a result, an on-axis aberration and an off-axis aberration can be corrected independently.

When the positional lens state is changed toward the telephoto end state, the distance between the second lens group and the third lens group is shortened to make the off-axis light flux passing through the second lens close to the optical axis. As a result, a variation in off-axis aberration with a change in positional lens state is favorably corrected, so that high performance can be attained.

Since a fourth lens group is arranged near an image plane, the movement of the fourth lens group causes only a small change in lateral magnification. Thus, the fourth lens moves so that a variation in image surface position with the movements of the first to third lens groups can be corrected.

In addition, a suitable lens for the image pickup apparatus (camera) that records a subject using an imaging element is in a state that an exit pupil position is far from an image plane, or the principle ray is almost in parallel with an optical axis. Therefore, a variation in height of light rays becomes small when the light flux passing through the lens moves to the optical axis direction. Thus, since the change of the height of rays is small, the fourth lens group is suitable for a so-called short distance focusing that compensates a variation in image surface position occurred by a change in object position when moving to the optical axis direction. From the above, the vari-focal length lens system of the present embodiment, the fourth lens group is moved at the time of short distance focusing.

The position of an aperture stop should be considered in order to simultaneously attain size reduction of lens diameter and high performance.

This is because, in general, a change in height of off-axis light flux passing through each lens group occurs more easily as the number of lens groups changing their distances from the aperture stop increases. A change in height of off-axis light flux can be used for correcting a variation in off-axis aberration due to a change in positional lens state. Alternatively, the height of the off-axis light flux may be changed positively to correct the variation of the off-axis aberration more effectively. Furthermore, the arrangement of the aperture stop near the middle of the lens system allows the lenses to have smaller diameters. Thus, in the vari-focal length lens system of the present embodiment, as described above, the aperture stop is placed near the third lens group to attain the size reduction of lens diameter and high performance of the lens system.

In addition, the aperture step is arranged on the object side of the third lens group to allow the aperture stop and the third lens group to move together, thereby attaining a further reduction in lens diameter and a simplified structure of the lens barrel.

Furthermore, particularly in a wide angle end state, the arrangement of the aperture stop on the object side of the third lens group allows the off-axis light flux passing through the first lens group to be close to the optical axis to attain a size reduction in lens diameter. Simultaneously, the off-axis light flux passing through the first lens group approaches the optical axis in a wide angle end state, it becomes possible to prevent the generation of a coma aberration in the periphery of a screen to attain high performance.

For simultaneously attaining higher variable power, and size reduction, it is effective to increase the refractive power of each lens group. However, an increase in refractive power of each lens group leads to an increase in curvature of each lens surface in each lens group. Thus, a significantly large aberration may occur in the periphery of a screen when a wider angle is attained after attaining the higher variable power, and size reduction. In the positive precedence type, the off-axis light flux passing through the first lens group tends to be far from the optical axis in a wide angle end state. In particular, the more the refractive power of the first lens group increases, the more the off-axis flux passing through the first lens group moves away from the optical axis. In this case, furthermore, a large coma aberration occurs in the periphery of the screen.

Therefore, in order to attain a wider angle after simultaneously attaining higher variable power, and size reduction, it is preferable to reduce the refractive power of the first lens group. In this case, however, a decrease in refractive power of the first lens group leads to an increase in whole length of the lens system, thereby resulting in difficulty in securing a predetermined variable magnification ratio.

Thus, in the vari-focal length lens system of the present embodiment, the first and second lens groups are designed as described above to ensure high optical performance by attaining a wider angle while attaining higher variable power, and size reduction without depending to the position of the lens.

In particular, the vari-focal length lens system of the present embodiment can attain both the higher variable power, and the size reduction while having a wider angle of more than 70 degrees in a wide angle end state. In the vari-focal length lens system according to the embodiment of the present invention, the first lens group includes a negative lens with a concave that faces to an image and a positive lens with a convex that faces an object. The lenses are arranged from the object side to the image side in this order.

In the vari-focal length lens system according to the embodiment of the present invention, the second lens group includes a negative lens with a concave that faces to an image (first negative lens), a negative lens with a concave that faces to the object and an opposite concave that faces to the image (second negative lens), and a meniscus-shaped positive lens with a convex that faces to the object. The lenses are arranged from an object side to an image side. In the second lens group, each of the object-side surface of the first negative lens and the image-side surface of the positive lens is formed in an aspherical shape.

In the second lens group of the vari-focal length lens system of the present embodiment, an on-axis aberration is corrected by forming the image-side surface of the positive lens into an aspherical surface. In addition an off-axis aberration is corrected by forming the negative lens into an aspheric surface lens.

As the vari-focal length lens system of the present embodiment is configured as described above, the lenses can be thinned after securing an aberration-correcting function. In addition, the size reduction of the first lens group can be attained after securing high optical performance.

In addition, the first lens group may include two lenses, a negative lens and a positive lens to make a suitable moving distance from the wide-angle end to the telephoto end or vice versa. Thus, the thickness of the lens system at the time of collapsing the lens system and the whole length of the lens system in a telephoto end state can be reduced.

The vari-focal length lens system of the present embodiment can realize higher optical performance by using the aspheric surface lens. In particular, the use of the aspheric surface lens in the second lens group allows the lens system to favorably correct a variation in coma aberration due to an angle of view generated in a wide angle end state.

In the vari-focal length lens system of the present embodiment, at least two surfaces of the surface on the object side of the negative lens (first negative lens) and the surface on the image side of the positive lens arranged on the object side of the second lens group are formed into aspheric surfaces, respectively. Thus, the size reduction and the high performance can be simultaneously attained in a wide angle end state.

For using an aspherical surface, in general, there are methods, (A) a method of forming a surface near an aperture stop into an aspherical surface; and (B) a method of forming a surface far from the aperture stop into an aspherical surface.

In the case of (A), the aspherical surface is suitable for the correction of spherical aberration. In the case of (B), on the other hand the aspherical surface is suitable for the correction of off-axis aberration, such as distortion aberration and field curvature.

In the vari-focal length lens system of the present embodiment, two spherical surfaces are arranged far from each other in the second lens group to independently correct a refractive power near the optical axis and a refractive power, at a position far from the optical axis. Specifically, an entrance pupil position in a paraxial area and an entrance pupil position in the circumference of a screen are corrected independently. As a result, it becomes possible to move the off-axis light flux incident on the first lens group close to the optical axis, the lens diameter can be reduced and a variation in off-axis aberration due to a change in angle of view can be favorably corrected.

[Conditional Expression of Vari-Focal Length Lens System (Four Lens Groups)]

Hereinafter, the conditional expression of the vari-focal length lens with four lens groups, first to fourth lens groups, according to one embodiment of the present invention will be described.

The vari-focal length lens system of the present embodiment satisfies the following conditional expressions (1).

$$2.0 < f1/(fw \cdot ft)^{1/2} < 2.5, \text{ wherein} \qquad (1)$$

f1: focal length of the first lens group;
fw: focal length in the whole lens system in a wide angle end state; and
ft: focal length in the whole lens system in a telephoto end state.

The conditional expression (1) is provided for shortening the whole length of the first lens group in a telephoto end state and favorably correcting a negative spherical aberration generated in the first lens group.

If it is higher than the upper limit of the conditional expression (1), the whole length of the first lens in a telephoto end state becomes long.

On the other hand, if it is smaller than the lower limit of the conditional expression (1), the negative spherical aberration generated in the first lens group is not corrected favorably. Thus, a further improvement in optical performance is hardly attained.

Therefore, when the vari-focal length lens system satisfies the conditional expression (2), the whole length of the lens system in a telephoto end state can be shortened and the negative spherical aberration generated in the first lens group can be favorably corrected.

It is desirable that the vari-focal length lens system according to one embodiment of the present invention satisfies the following conditional expression (2).

$$0.65 < |dwt1/dt| < 0.9, \text{ wherein} \quad (2)$$

dwt1: a moving distance of the first lens group; and
dt: an air spacing between the first lens group and the second lens group in a telephoto end state.

The conditional expression (2) is provided for defining the moving distance of the first lens group.

In addition, thickness reduction of a zoom lens can be attained at the telephoto end and in a collapse state.

If it is smaller than the lower limit of the conditional expression (2), a desired zoom ratio is not obtained.

On the other hand, if it is higher than the upper limit of the conditional expression (2), the whole length of the first lens in a telephoto end state becomes long. In this case, there is a necessity of increasing the thickness of a mechanical component for securing a cam track corresponding the moving distance between the wide-angle end and the telephoto end of the first lens group, resulting in the hindrance of thickness reduction at the time of collapsing.

Therefore, the vari-focal length lens system satisfies the conditional expression (2) to attain the thickness reduction of lens at the telephoto end and at the time of collapsing.

In the vari-focal length lens system according to one embodiment of the present invention, the vari-focal length lens system may satisfy the following conditional expression (3) in addition to the above conditional expression (1).

$$0.42 < |f2|/(fw \cdot ft)^{1/2} < 0.49, \text{ wherein} \quad (3)$$

f2: focal length of the second lens group;
fw: focal length in the whole lens system in a wide angle end state; and
ft: focal length in the whole lens system in a telephoto end state.

The conditional expression (3) is provided for defining the focal distance of the second lens group to attain high performance.

If it is smaller than the lower limit of the conditional expression (3), the high-order off-axis aberration occurs significantly. Thus, a further improvement in performance is hardly attained.

On the other hand, if it is higher than the upper limit of the conditional expression (3), a variation in off-axis aberration with a change in positional lens state is hardly corrected in a favorable manner. Thus, a further improvement in performance is hardly attained.

Therefore, when the vari-focal length lens system satisfies the conditional expression (3), the high-order off-axis aberration on the periphery of a screen is suppressed, and a variation in off-axis aberration with a change in positional lens state can be favorably corrected. As a result, a more improvement in performance can be attained.

In the vari-focal length lens system of the present embodiment, to simultaneously obtain still higher variable power, still more size reduction, and still higher performance, the first lens group may be configured as described below.

In order to attain such still higher variable power, it is desired to favorably correct chromatic aberration and spherical aberration because of an increased focal length in a telephoto end state. In order to attain higher performance, it is desired to at least one positive lens and at least one negative lens in the first lens group because of being desired to favorably correct chromatic aberration and spherical aberration generated in each lens group.

Furthermore, in order to shorten the whole length of the lens system in a telephoto end state to reduce the diameter of lens, it is preferable that the first lens group includes a negative lens with a concave side to the image and a positive lens with a convex that faces to the object. The lenses are arranged from an object side to an image side.

In the vari-focal length lens system of the present embodiment, such a configuration of the first lens group allows the positive lens to be arranged nearest to an image, so that an off-axis light flux incident on the first lens group can approach the optical axis and simultaneously the whole length of the lens system can be shortened.

In the vari-focal length lens system of one embodiment of the present invention, it is desirable to satisfy the following conditional expressions (4).

$$0.44 < dS3/R31 < 0.58, \text{ wherein} \quad (4)$$

dS3: the distance between the aperture stop and the nearest surface of the third lens group from an image plane, and
R31: the curvature radius of the nearest surface of the third lens group from an object.

The conditional expression (4) is provided for defining the profile of the nearest surface of the third lens group from an object.

The third lens group has a strong refractive power in order to converge a light flux emitted from the second lens group. Therefore, when optimizing the shape of the third lens group and attaining still higher performance, the nearest surface of the third lens group to the object will play an important role.

If it is higher than the upper limit of the conditional expression (4), the negative spherical aberration generated in the third lens group is not corrected favorably. Thus, a further improvement in performance is hardly attained.

If it is smaller than the lower limit of the conditional expression (4), it becomes difficult to shorten the whole length of the lens system in a telephoto end state.

Therefore, when the vari-focal length lens system satisfies the conditional expression (4), a negative spherical aberration generated in the third lens group can be corrected favorably, while the whole length of the lens system in a telephoto end state can be shortened.

In the vari-focal length lens system of one embodiment of the present invention, it is desirable to satisfy the following conditional expressions (5) to attain still higher performance.

$$1.75 < f3/fw < 2.1, \text{ wherein} \quad (5)$$

f3: focal length of the third lens group; and
fw: focal length in the whole lens system in a wide angle end state.

If it is lower than the lower limit of the conditional expression (5), it becomes difficult to favorably correct a variation in coma aberration with a change in angle of view in a wide angle end state. Thus, a sufficient high performance is hardly attained. On the other hand, if it is higher than the upper limit of the conditional expression (5), the whole length of the lens system becomes long without depending on the positional lens state. Thus, still more size reduction is hardly attained.

Therefore, when the vari-focal length lens system satisfies the conditional expression (6), it is possible to favorably correct a variation in coma aberration in a wide angle end state and the whole length of the lens system can be shortened without depending on the positional lens state. In the vari-focal length lens system of one embodiment of the present invention, it is desirable to satisfy the following conditional expressions (5) to favorably correct a positive spherical aberration generated in the second lens group and attain high performance.

$$0.85 < |1/\beta 2t| < 1.25, \text{ wherein} \quad (6)$$

β2t: lateral magnification of the second lens group in a telephoto end state.

The conditional expression (6) is provided for defining the lateral magnification of the second lens group.

If it is higher than the upper limit of the conditional expression (6), the positive spherical aberration generated in the second lens group is not corrected favorably. Thus, a further improvement in performance is hardly attained.

On the other hand, if it is lower than the lower limit of the conditional expression (6), the whole length of the lens system in a telephoto end state is not shortened. Thus, a sufficient decrease positive spherical aberration generated in the second lens group is not corrected favorably. Thus, a sufficient size reduction is hardly attained.

Therefore, when the vari-focal length lens system satisfies the conditional expression (6), a positive spherical aberration generated in the second lens group can be corrected sufficiently, while the whole length of the lens system in a telephoto end state can be shortened.

Furthermore, in the vari-focal length lens system of the present embodiment, one lens group or part of one lens group among the first to fourth lens groups is shifted in a direction substantially perpendicular to the optical axis. In this way, the vari-focal length lens system can shift the lens group or part thereof in the direction substantially perpendicular to the optical axis. Then, the amount of the shift and may also serve as a vibration control optical system by combining with a detection system for detecting an image shaking, a driving system for shifting each of lens groups, and a control system for providing the driving system with the amount of the shift in response to the output of the detection system.

In particular, in the vari-focal length lens system of the present embodiment, the third lens group is shifted in the direction substantially perpendicular to the optical axis. Thus, a change in performance caused by the shifting can be minimized.

If the aperture stop is arranged near the third lens group, an off-axis light flux passes through near the optical axis.

Thus, it is possible to suppress a change in off-axis aberration caused by shifting the third lens group in the direction substantially perpendicular to the optical axis.

Furthermore, the vari-focal length lens system of the present embodiment may be provided with a low-pass filter on the image side of the lens system to avoid the generation of a moire pattern or may be provided with an infrared cut filter depending on the spectral sensitivity characteristic of a light-receiving element.

In addition, the lens system may be further thinned at the time of collapsing by allowing any one of the first to fourth lens groups to be shifted in the direction perpendicular to the optical axis to prevent each of the lens groups from causing interference.

Furthermore, the center performance and the peripheral performance of the lens system can be further improved by introducing an aspheric surface lens into the third or fourth lens group.

In addition, the vari-focal length lens system can secure still higher optical performance by forming a plurality of aspherical surfaces therein.

[Numerical Example of Vari-Focal Length Lens System (Four Groups)]

Hereinafter, the vari-focal length lens system with four lens groups, first to fourth lens groups according to each of concrete embodiments and numerical examples thereof to which specific numerical values are applied will be described with reference to the attached drawings and tables.

Meanings of signs represented in the descriptions and tables below are as follows: "f" is a focal length, "Fno" is an F number, "ω" is a half angle of view, "i" is a surface identification number, "ri" is a curvature radius, "di" is a distance between the "i"th surface and the "i+1"th surface on the axis, "ni" is a refractive index, and "vi" is an Abbe number. Regarding the surface identification number, "S" means an aperture stop. Regarding the curvature radius, "ASP" means that the corresponding surface is an aspherical surface. "K" represents a conical coefficient (conic constant). In addition, "A4", "A6", "A8", "A10", and "A12" represent fourth-order, sixth-order, eighth-order, tenth-order, and twelfth order aspherical surface coefficients, respectively.

In addition, the refractive index is a value corresponding to a d line (λ=587.6 nm) and the curvature radius "INF" means that the corresponding surface is a pane surface.

The lens used in each of the numeral examples has an aspherical lens surface. The aspherical shape is defined by the following numerical expression 1, wherein "Z" is a distance from the peak of the lens surface in the optical axis direction, "h" is a height in the direction perpendicular to the optical axis (image height), "R" is a paraxial curvature (inverse number of curvature radius) at the peak of the lens, "K" is a conical coefficient (conic constant), and "A4", "A6", . . . represent fourth-order, sixth-order, . . . aspheric coefficients, respectively.

$$Z = \frac{(1/R) \cdot h^2}{1 + \{1 - (1+k) \cdot (1/R)^2 \cdot h^2\}^{1/2}} + A4h^4 + A6h^6 + A8h^8 + A10h^{10} + A12h^{12}$$ [Equation 1]

<First Embodiment>

FIG. 1 is a diagram illustrating a vari-focal length lens system 1 according to a first embodiment of the present invention. The vari-focal length lens system 1 includes nine lenses.

The first lens group G1 is provided as a cemented lens L11 in which a meniscus-shaped negative lens with a convex that faces to an object and a positive lens with a convex that faces to the object are cemented together. The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex side that faces to the object and a negative lens with a concave that faces to the image are cemented together. The fourth lens group G4 includes a meniscus-shaped positive lens L41 with a convex that faces to the object.

A filter FL is arranged between the fourth lens group G4 and an image plane IMG.

Table 1 represents lens data of numerical example 1 obtained by concretely applying numerical values to the vari-focal length lens system 1 of the first embodiment.

TABLE 1

| i | ri | di | ni | vi |
|---|---|---|---|---|
| 1 | 20.309 | 0.600 | 1.92286 | 20.9 |
| 2 | 13.937 | 3.000 | 1.80420 | 46.5 |
| 3 | 133.866 | variable | | |
| 4 | 49.193 (ASP) | 0.800 | 1.82080 | 42.7 |
| 5 | 5.854 | 3.241 | | |
| 6 | −25.739 | 0.450 | 1.88300 | 40.8 |
| 7 | 15.763 | 0.100 | | |
| 8 | 8.937 (ASP) | 1.355 | 2.00178 | 19.3 |
| 9 | 24.787 (ASP) | variable | | |

TABLE 1-continued

| i | ri | di | ni | vi |
|---|---|---|---|---|
| 10 (S) | INF | 0.000 | | |
| 11 | 7.537 (ASP) | 1.560 | 1.69350 | 53.2 |
| 12 | −10.569 (ASP) | 0.108 | | |
| 13 | 4.248 | 1.378 | 1.49700 | 81.6 |
| 14 | 60.224 | 0.403 | 1.90366 | 31.3 |
| 15 | 3.570 | variable | | |
| 16 | 7.758 (ASP) | 1.365 | 1.58313 | 59.5 |
| 17 | 16.717 | variable | | |
| 18 | INF | 0.300 | 1.51680 | 64.2 |
| 19 | INF | 0.720 | | |
| 20 | INF | 0.500 | 1.51680 | 64.2 |
| 21 | INF | | | |

In the vari-focal length lens system 1, an object-side surface (r4) of the first negative lens L21 of the second lens group G2, both surfaces (r8, r9) of the positive lens L23 of the second lens group G2, both surfaces (r11, r12) of the first positive lens L31 of third lens group G3, an object-side surface (r16) of the positive lens L41 of the fourth lens group G4 are formed into aspherical surfaces, respectively. The fourth, sixth, eighth, tenth, and twelfth aspherical surface coefficients, A4, A6, A8, A10, and A12, of the respective aspheric surfaces in the numerical example 1 are listed in Table 2 together with conical coefficient K, respectively.

Furthermore, in Table 2 and each of tables representing aspherical surface coefficients as described later, "E-i" represents an exponential function with base of 10, "10-i", for example "0.12345E-05" represents "0.12345×10$^{-5}$".

TABLE 2

| | K | A4 | A6 | A8 | A10 | A12 |
|---|---|---|---|---|---|---|
| r4 | 0.0000E+00 | −1.4875E−05 | −4.4302E−07 | 1.4548E−08 | −1.5630E−10 | 0.0000E+00 |
| r8 | −7.8071E−01 | −7.0112E−05 | −4.9406E−06 | 4.3804E−07 | 9.6867E−09 | 0.0000E+00 |
| r9 | 0.0000E+00 | −3.9409E−05 | −7.2310E−07 | 4.2638E−07 | 1.2160E−08 | 0.0000E+00 |
| r11 | 0.0000E+00 | −1.4866E−03 | −2.7099E−04 | 2.7883E−05 | −6.1934E−06 | 7.9746E−09 |
| r12 | 0.0000E+00 | −9.8425E−04 | −2.1958E−04 | 1.2822E−05 | −3.5233E−06 | 0.0000E+00 |
| r16 | 0.0000E+00 | −2.8412E−04 | 5.5677E−06 | −3.8686E−07 | 6.7863E−09 | 0.0000E+00 |

In the vari-focal length lens system 1, a surface distance d3 between the first lens group G1 and the second lens group G2, a surface distance d9 between the second lens group G2 and the aperture stop S, a surface distance d15 between the third lens group G3 and the fourth lens group G4, and a surface distance d17 between the fourth lens group G4 and the filter FL change with zooming from a wide angle end state to a telephoto end state or vice versa. Table 3 represents variable distances in a wide angle end state, middle focal distance state, and telephoto end state in the numerical example 1 in addition to represent their respective F numbers (Fno) and half view angles ω.

TABLE 3

| | Wide angle end | Middle | Telephoto end |
|---|---|---|---|
| f | 5.16 | 14.20 | 39.11 |
| Fno | 3.36 | 4.35 | 6.06 |
| ω | 41.31 | 15.09 | 5.39 |
| d3 | 0.40 | 7.31 | 13.54 |
| d9 | 13.85 | 4.84 | 0.50 |
| d15 | 5.87 | 6.65 | 15.48 |
| d17 | 1.70 | 5.20 | 4.00 |

Figure 2:
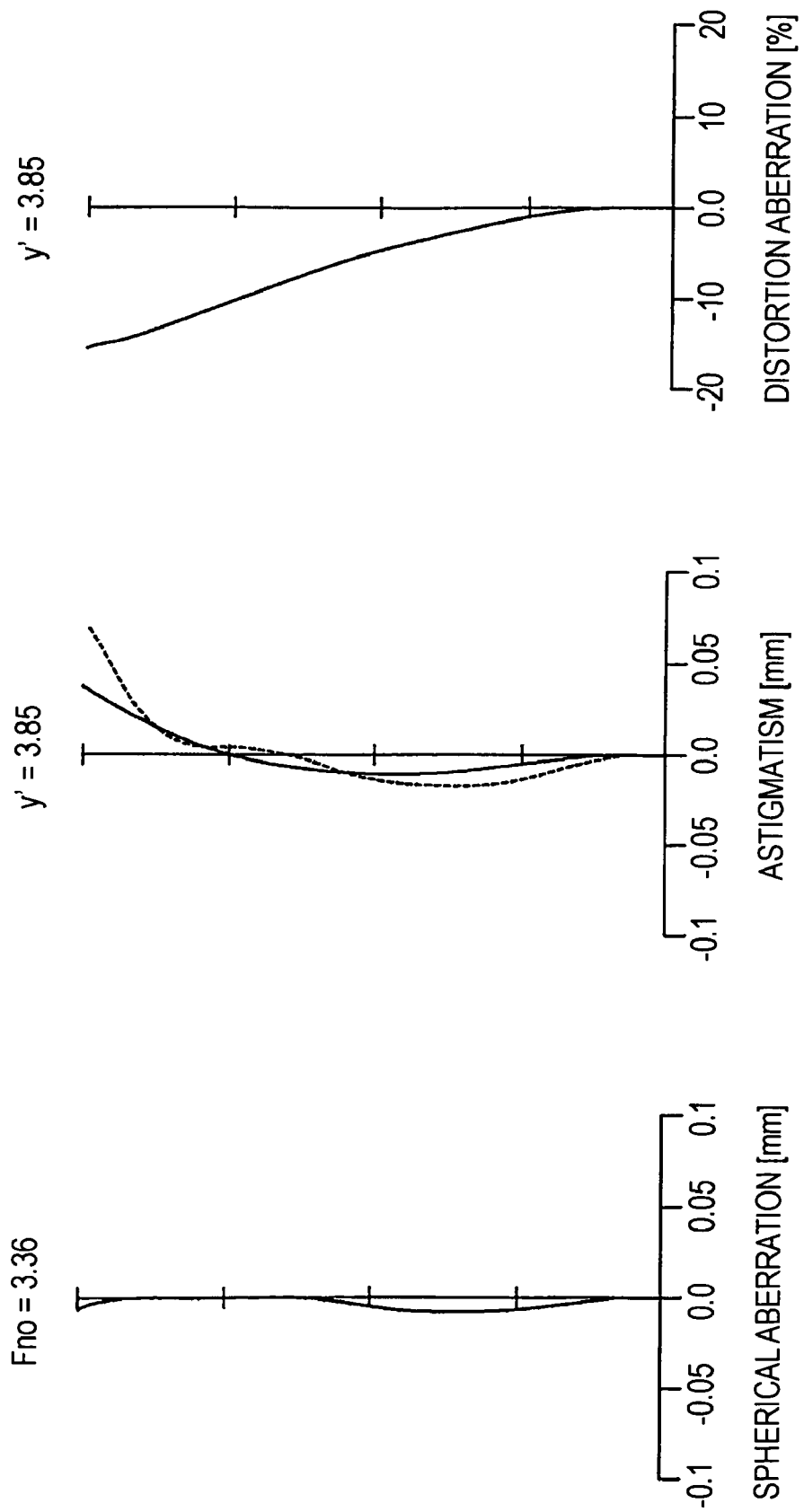
FIG. 2 is a diagram illustrating spherical aberration, astigmatism, and distortion aberration in a wide angle end state, representing an aberration graph of a numerical example in which concrete numerical values are applied to the first embodiment in a manner similar to FIG. 3 and FIG. 4.
Figure 3:
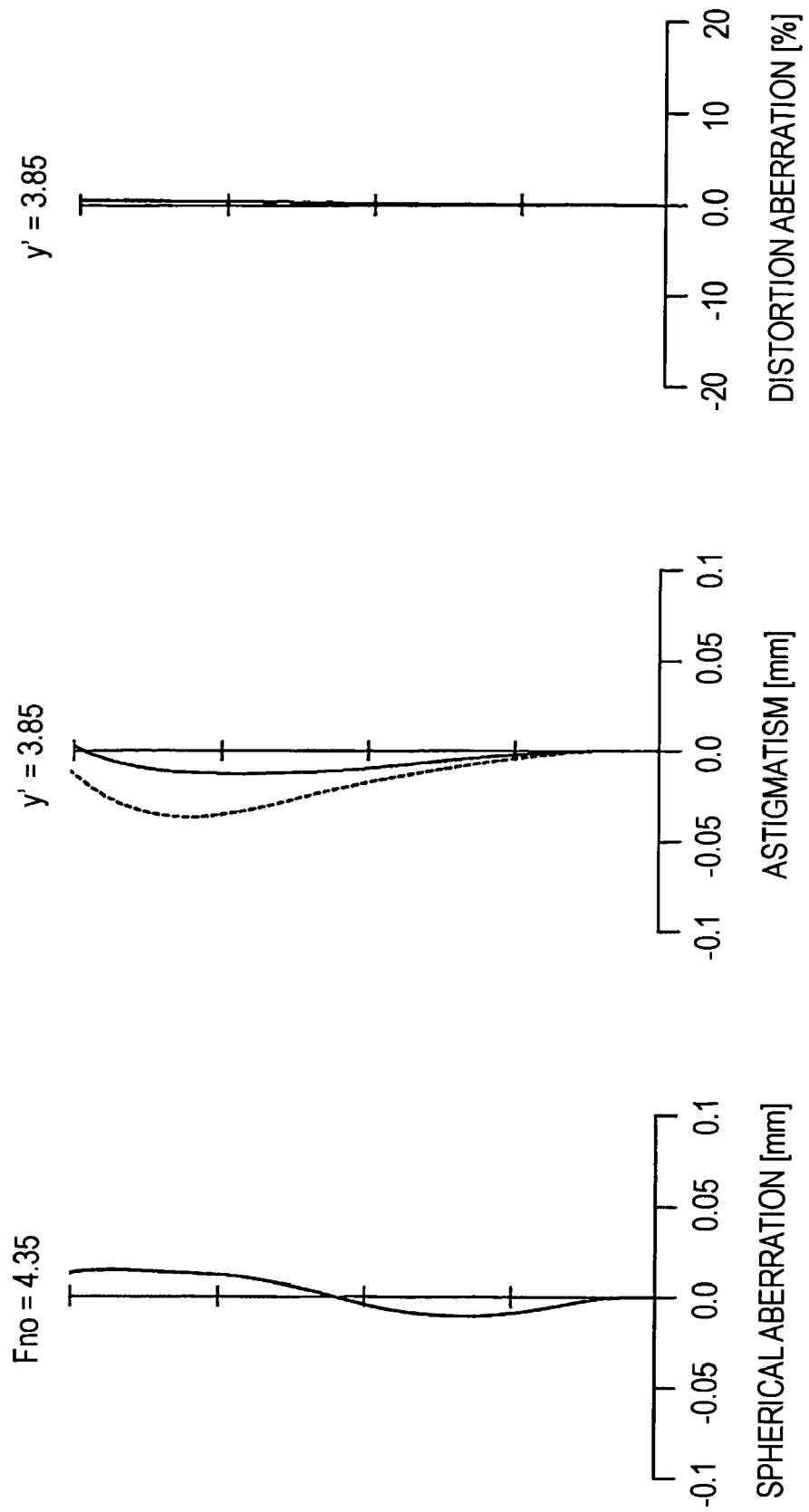
FIG. 3 is a diagram illustrating spherical aberration, astigmatism, and distortion aberration in a middle focal distance state.
Figure 4:
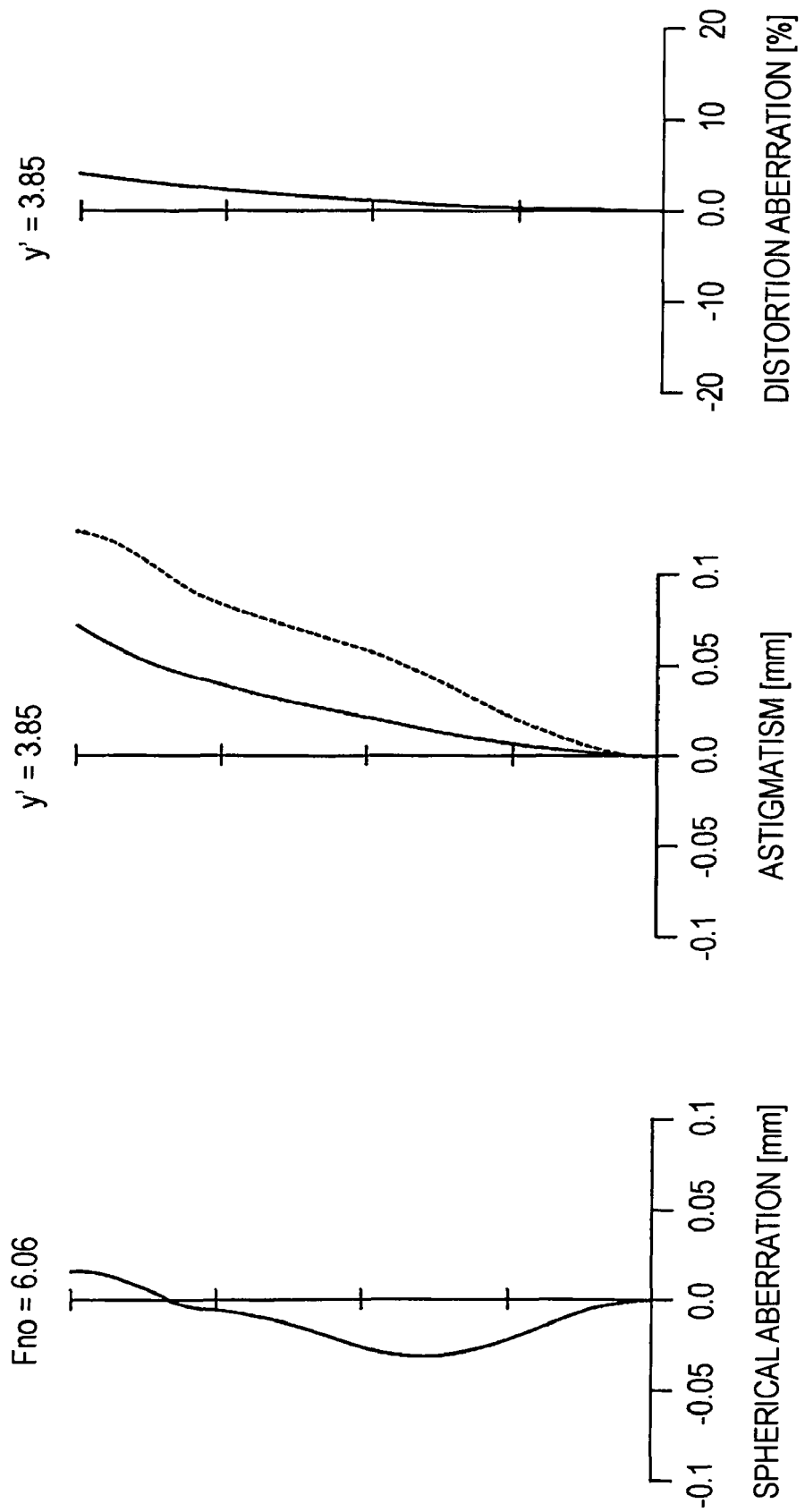
FIG. 4 is a diagram illustrating spherical aberration, astigmatism, and distortion aberration in a telephoto end state.

FIGS. 2 to 4 represent aberration diagrams in an infinity far in-focus state of the numerical example 1. FIG. 2 is an aberration diagram that represents a wide angle end state, FIG. 3 is an aberration diagram that represents a middle focal distance state, and FIG. 4 is an aberration diagram that represents in a telephoto end state.

FIGS. 2 and 4 are illustrated so that solid lines represent values on the sagittal image planes and the dashed lines represent values on the meridional image surfaces.

As is evident from each of the aberration graphs, it is evident that numeral example 1 shows favorably corrected various aberrations and excellent image forming performance.

<Second Embodiment>

Figure 5:
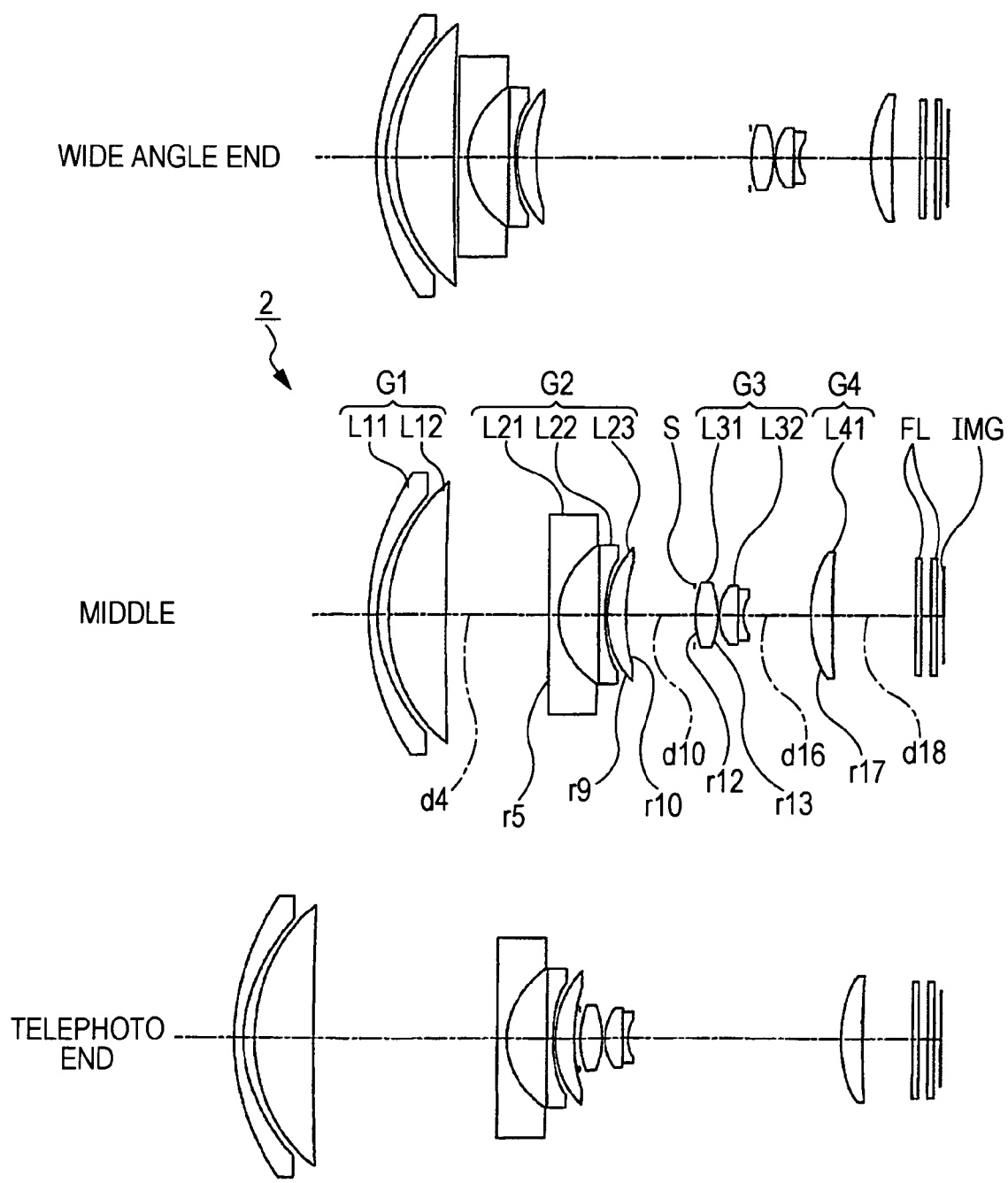
FIG. 5 is a diagram illustrating a lens arrangement in a vari-focal length lens system according to a second embodiment of the present invention.

FIG. 5 is a diagram illustrating a vari-focal length lens system 2 according to a second embodiment of the present invention. The vari-focal length lens system 2 includes nine lenses.

The first lens group G1 includes a meniscus-shaped negative lens L11 with a convex that faces to an object and a positive lens L12 with a convex that faces to the object.

The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex that faces to the object and a negative lens with a concave that faces to the image are cemented together.

The fourth lens group G4 includes a meniscus-shaped positive lens L41 with a convex that faces to the object.

A filter FL is arranged between the fourth lens group G4 and an image plane IMG.

Table 4 represents lens data of numerical example 1 obtained by concretely applying numerical values to the vari-focal length lens system 2 of the first embodiment.

TABLE 4

| i | ri | di | ni | vi |
|---|---|---|---|---|
| 1 | 20.254 | 0.700 | 1.92286 | 20.9 |
| 2 | 13.762 | 0.769 | | |
| 3 | 14.432 | 4.500 | 1.80420 | 46.5 |
| 4 | 266.268 | variable | | |
| 5 | −124.865 (ASP) | 0.800 | 1.82080 | 42.7 |
| 6 | 6.611 | 3.136 | | |
| 7 | −196.932 | 0.450 | 1.88300 | 40.8 |
| 8 | 10.972 | 0.154 | | |
| 9 | 7.817 (ASP) | 1.553 | 2.00178 | 19.3 |
| 10 | 18.095 (ASP) | variable | | |
| 11 (S) | INF | 0.000 | | |
| 12 | 7.011 (ASP) | 1.767 | 1.69350 | 53.2 |
| 13 | −11.906 (ASP) | 0.125 | | |
| 14 | 4.531 | 1.408 | 1.49700 | 81.6 |
| 15 | −249.493 | 0.400 | 1.90366 | 31.3 |
| 16 | 3.635 | variable | | |
| 17 | 10.367 (ASP) | 1.678 | 1.58313 | 59.5 |
| 18 | 73.472 | variable | | |
| 19 | INF | 0.300 | 1.51680 | 64.2 |
| 20 | INF | 0.720 | | |

TABLE 4-continued

| i | ri | di | ni | vi |
|---|----|----|----|-----|
| 21 | INF | 0.500 | 1.51680 | 64.2 |
| 22 | INF | | | |

In the vari-focal length lens system 2, an object-side surface (r5) of the first negative lens L21 of the second lens group G2, both surfaces (r9, r10) of the positive lens L23 of the second lens group G2, both surfaces (r12, r13) of the first positive lens L31 of third lens group G3, an object-side surface (r17) of the positive lens L41 of the fourth lens group G4 are formed into aspherical surfaces, respectively. The fourth, sixth, eighth, tenth, and twelfth aspherical surface coefficients, A4, A6, A8, A10, and A12, of the respective aspheric surfaces in the numerical example 2 are listed in Table 5 together with conical coefficient K.

TABLE 5

| | K | A4 | A6 | A8 | A10 | A12 |
|---|---|----|----|----|-----|-----|
| r5 | 0.0000E+00 | 9.7598E−05 | −6.0098E−07 | 0.0000E+00 | 0.0000E+00 | 0.0000E+00 |
| r9 | −9.7552E−01 | −1.9736E−04 | 6.9732E−06 | −3.9515E−07 | 2.4094E−08 | 0.0000E+00 |
| r10 | 0.0000E+00 | −2.7663E−04 | 1.2845E−05 | −5.5426E−07 | 3.0196E−08 | 0.0000E+00 |
| r12 | 0.0000E+00 | −1.1358E−03 | −2.1211E−04 | 2.4689E−05 | −4.0336E−06 | 7.9746E−09 |
| r13 | 0.0000E+00 | −6.8413E−04 | −1.8253E−04 | 1.4834E−05 | −2.5385E−06 | 0.0000E+00 |
| r17 | 0.0000E+00 | −1.2578E−04 | 6.2343E−06 | −2.3620E−07 | 3.9909E−09 | 0.0000E+00 |

In the vari-focal length lens system 2, the surface distance d4 between the first lens group G1 and the second lens group G2, the surface distance d10 between the second lens group G2 and the aperture stop S, the surface distance d16 between the third lens group G3 and the fourth lens group G4, and the surface distance d18 between the fourth lens group G4 and the filter FL change with the zooming between a wide angle end state and a telephoto end state. Table 6 represents variable distances in a wide angle end state, middle focal distance state, and telephoto end state in the numerical example 2 in addition to represent their respective F numbers (Fno) and half view angles ω.

TABLE 6

| | Wide angle end | Middle | Telephoto end |
|---|----|----|----|
| f | 4.95 | 15.24 | 46.92 |
| Fno | 3.35 | 4.22 | 6.01 |
| ω | 40.85 | 14.44 | 4.69 |
| d4 | 0.40 | 8.12 | 14.38 |
| d10 | 16.68 | 5.39 | 0.50 |
| d16 | 5.69 | 5.25 | 16.56 |
| d18 | 2.13 | 6.59 | 4.00 |

Figure 6:
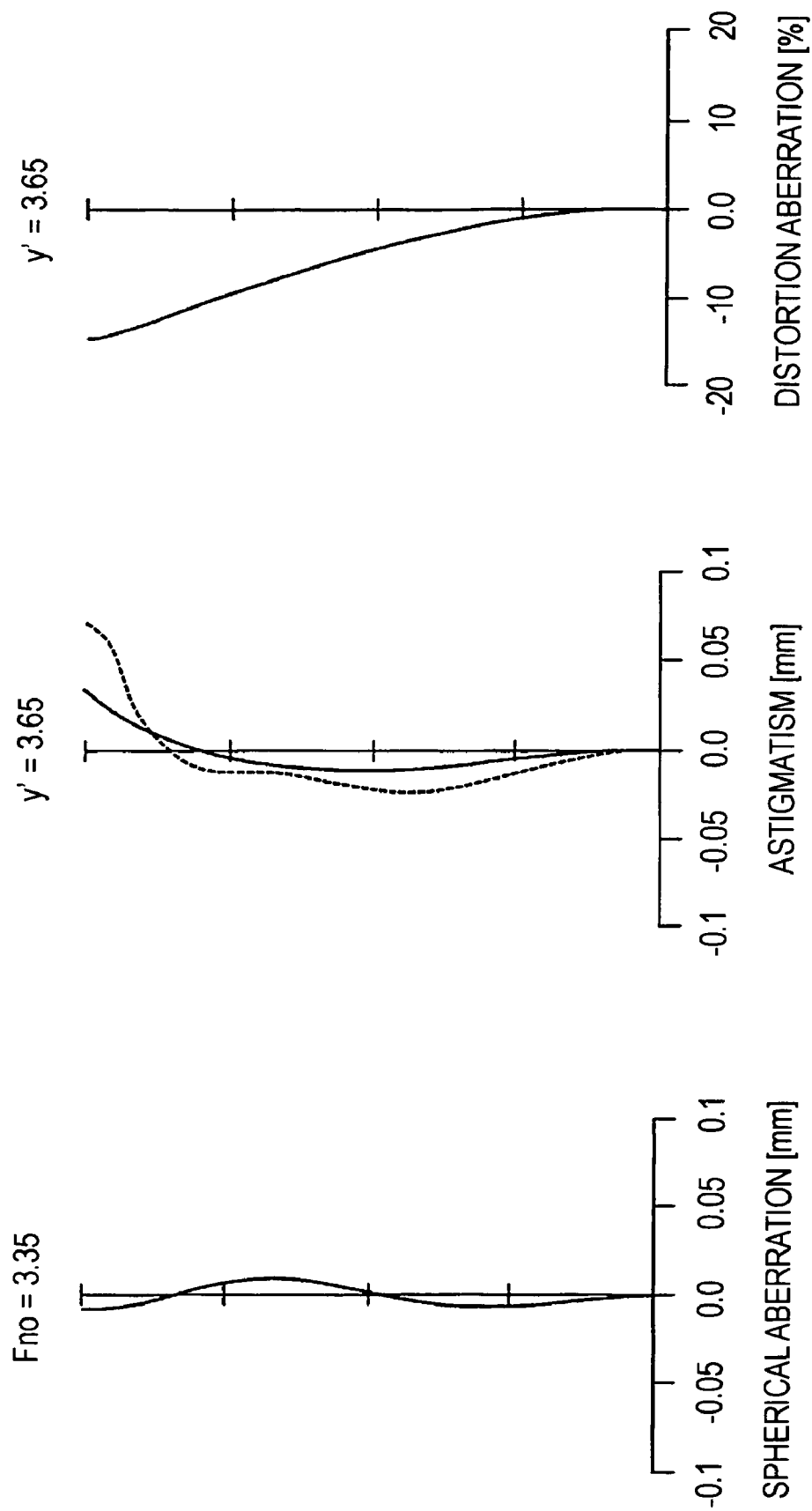
FIG. 6 is a diagram illustrating spherical aberration, astigmatism, and distortion aberration in a wide angle end state, representing an aberration graph of a numerical example in which concrete numerical values are applied to the first embodiment in a manner similar to FIG. 7 and FIG. 8.
Figure 7:
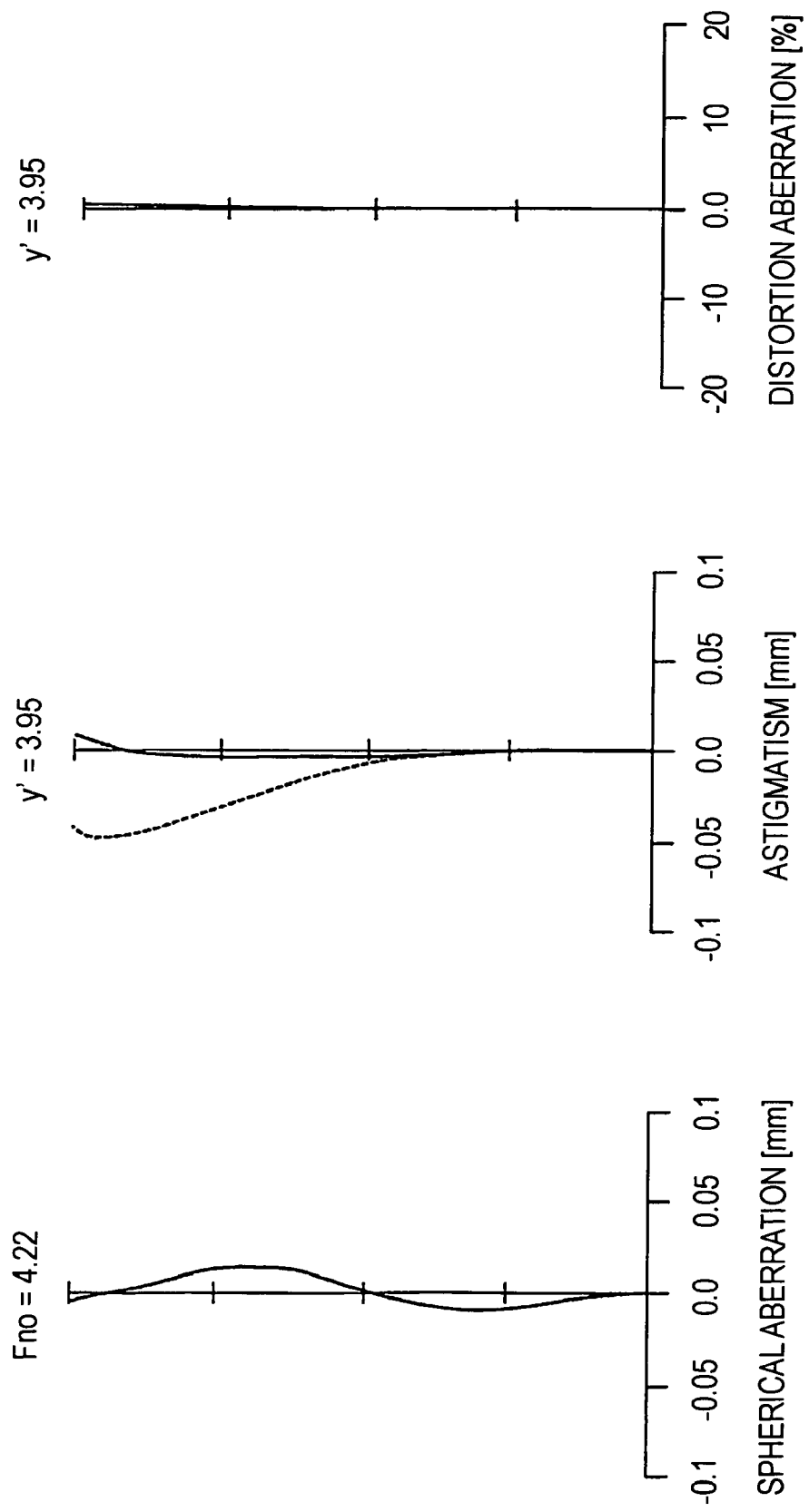
FIG. 7 is a diagram illustrating spherical aberration, astigmatism, and distortion aberration in a middle focal distance state.
Figure 8:
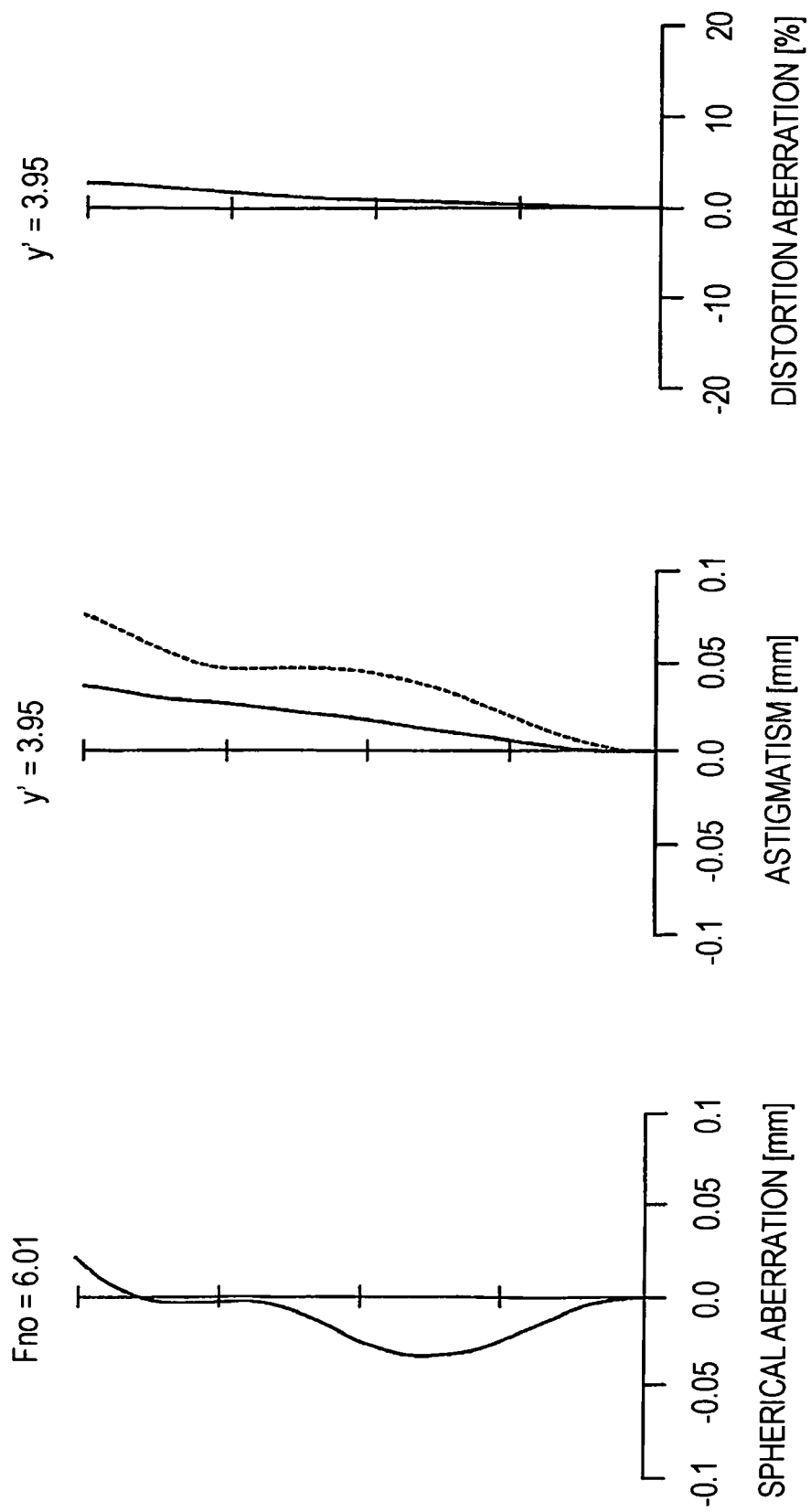
FIG. 8 is a diagram illustrating spherical aberration, astigmatism, and distortion aberration in a telephoto end state.

FIGS. 6 to 8 represent aberration diagrams in an infinity far in-focus state of the numerical example 1. FIG. 6 is an aberration diagram that represents a wide angle end state, FIG. 7 is an aberration diagram that represents a middle focal distance state, and FIG. 8 is an aberration diagram that represents in a telephoto end state.

FIGS. 6 and 8 are illustrated so that solid lines represent values on the sagittal image planes and the dashed lines represent values on the meridional image surfaces.

As is evident from each of the aberration diagrams, it is found that numeral example 2 shows favorably corrected various aberrations and excellent image-forming performance.

<Third Embodiment>

Figure 9:
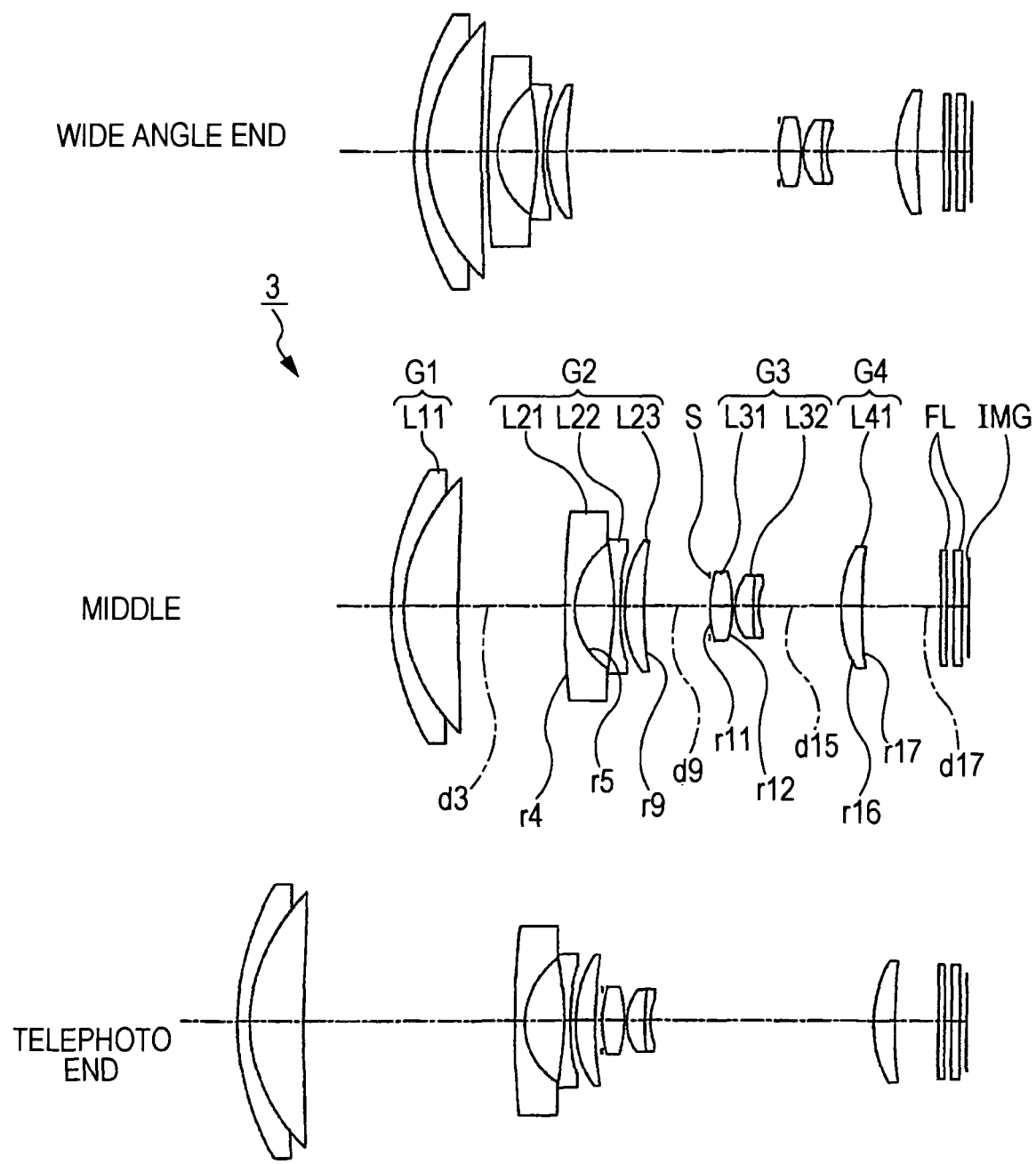
FIG. 9 is a diagram illustrating a lens arrangement in a vari-focal length lens system according to a third embodiment of the present invention.

FIG. 9 is a diagram illustrating a vari-focal length lens system 3 according to a third embodiment of the present invention. The vari-focal length lens system 3 includes nine lenses.

The first lens group G1 is provided as a cemented lens L11 in which a meniscus-shaped negative lens with a convex that faces to an object and a positive lens with a convex that faces to the object are cemented together. The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex that faces to the object and a negative lens with a concave that faces to the image are cemented together.

The fourth lens group G4 includes a meniscus-shaped positive lens L41 with a convex that faces to the object.

A filter FL is arranged between the fourth lens group G4 and an image plane IMG.

Table 7 represents lens data of numerical example 3 obtained by concretely applying numerical values to the vari-focal length lens system 3 of the third embodiment.

TABLE 7

| i | ri | di | ni | vi |
|---|----|----|----|-----|
| 1 | 22.268 | 1.000 | 2.00069 | 25.5 |
| 2 | 13.978 | 4.214 | 1.81600 | 46.6 |
| 3 | 180.162 | variable | | |
| 4 | 208.338 (ASP) | 0.800 | 1.85135 | 40.1 |
| 5 | 6.531 (ASP) | 3.185 | | |
| 6 | −20.696 | 0.450 | 1.83481 | 42.7 |
| 7 | 20.696 | 0.300 | | |
| 8 | 10.850 | 1.487 | 2.00178 | 19.3 |
| 9 | 39.976 (ASP) | variable | | |
| 10 | INF | 0.000 | | |
| 11 | 6.919 (ASP) | 1.800 | 1.62263 | 58.2 |
| 12 | −11.431 (ASP) | 0.239 | | |
| 13 | 4.197 | 1.401 | 1.49700 | 81.6 |
| 14 | 21.826 | 0.401 | 1.90366 | 31.3 |
| 15 | 3.449 | variable | | |
| 16 | 8.699 (ASP) | 1.737 | 1.52470 | 56.2 |
| 17 | 28.850 (ASP) | variable | | |
| 18 | INF | 0.300 | 1.51680 | 64.2 |
| 19 | INF | 0.720 | | |
| 20 | INF | 0.500 | 1.51680 | 64.2 |
| 21 | INF | | | |

In the vari-focal length lens system 3, both surfaces (r4, r5) of the first positive lens L21 of the second lens group G2, an image-side surface (r9) of the positive lens L23 of the second lens group G2, both surfaces (r11, r12) of the first positive lens L31 of third lens group G3, and both surfaces (r16, r17) of the positive lens L41 of the fourth lens group G4, are formed into aspherical surfaces, respectively. The fourth, sixth, eighth, tenth, and twelfth aspherical surface coefficients, A4, A6, A8, A10, and A12, of the respective aspheric surfaces in the numerical example 3 are listed in Table 8 together with conical coefficient K.

TABLE 8

| | K | A4 | A6 | A8 | A10 | A12 |
|---|---|---|---|---|---|---|
| r4 | 0.0000E+00 | 6.7104E−05 | −4.2912E−07 | 0.0000E+00 | 0.0000E+00 | 0.0000E+00 |
| r5 | 0.0000E+00 | 4.3847E−05 | −7.1026E−07 | 1.6467E−07 | −4.0382E−09 | 0.0000E+00 |
| r9 | 0.0000E+00 | 1.4254E−04 | 3.7109E−06 | −1.2634E−07 | 2.7579E−09 | 0.0000E+00 |
| r11 | 0.0000E+00 | −1.1480E−03 | −1.7720E−04 | 1.4940E−05 | −2.7591E−06 | 0.0000E+00 |
| r12 | 0.0000E+00 | −5.8788E−04 | −1.4690E−04 | 5.9594E−06 | −1.5092E−06 | 0.0000E+00 |
| r16 | 0.0000E+00 | −6.0630E−04 | 2.7269E−05 | −5.7840E−07 | −2.6059E−08 | 0.0000E+00 |
| r17 | 0.0000E+00 | −5.8339E−04 | 3.3048E−05 | −8.7726E−07 | −2.3237E−08 | 0.0000E+00 |

In the vari-focal length lens system 3, a surface distance d3 between the first lens group G1 and the second lens group G2, a surface distance d9 between the second lens group G2 and the aperture stop S, a surface distance d15 between the third lens group G3 and the fourth lens group G4, and a surface distance d17 between the fourth lens group G4 and the filter FL change with the zooming between a wide angle end state and a telephoto end state. Table 9 represents variable distances in a wide angle end state, middle focal distance state, and telephoto end state in the numerical example 3 in addition to represent their respective F numbers(Fno) and half view angles ω.

[Each Value of Conditional Expression of Vari-Focal Length Lens System (Four Lens Groups)]

Hereinafter, each value of the conditional expression of the vari-focal length lens with four lens groups, first to fourth lens groups, according to one embodiment of the present invention will be described.

The values of the above conditional expressions (1) to (6) in the varifocal length lens systems 1 to 3 are listed in Table 10, respectively.

TABLE 10

| | | Numerical example 1 | Numerical example 2 | Numerical example 3 |
|---|---|---|---|---|
| | f1 | 31.750 | 30.735 | 35.802 |
| | fw | 5.16 | 4.95 | 4.86 |
| | ft | 39.11 | 46.92 | 46.04 |
| Conditional equation (1) | $2.0 < f1/(fw \cdot ft)^{1/2} < 2.5$ | 2.24 | 2.02 | 2.39 |
| | dwt1 | 11.690 | 10.551 | 13.665 |
| | dt | 13.54 | 14.38 | 16.53 |
| Conditional equation (2) | $0.65 < |dwt1/dt| < 0.9$ | 0.86 | 0.73 | 0.83 |
| | f2 | −6.740 | −6.738 | −7.112 |
| Conditional equation (3) | $0.42 < |f2|/(fw \cdot ft)^{1/2} < 0.49$ | 0.47 | 0.44 | 0.48 |
| | dS3 | 3.450 | 3.699 | 3.842 |
| | R31 | 7.537 | 7.011 | 6.919 |
| Conditional equation (4) | $0.44 < dS3/R31 < 0.58$ | 0.46 | 0.53 | 0.56 |
| | f3 | 9.247 | 10.117 | 10.024 |
| Conditional equation (5) | $1.75 < f3/fw < 2.1$ | 1.79 | 2.04 | 2.06 |
| Conditional equation (6) | $0.85 < |1/\beta 2t| < 1.25$ | 1.20 | 0.90 | 1.13 |

TABLE 9

| | Wide angle end | Middle | Telephoto end |
|---|---|---|---|
| f | 4.86 | 14.96 | 46.04 |
| Fno | 3.08 | 4.16 | 5.88 |
| ω | 41.03 | 14.66 | 4.72 |
| d3 | 0.40 | 8.36 | 16.53 |
| d9 | 16.50 | 5.04 | 0.50 |
| d15 | 5.32 | 6.48 | 17.33 |
| d17 | 1.98 | 6.06 | 3.50 |

Figure 10:
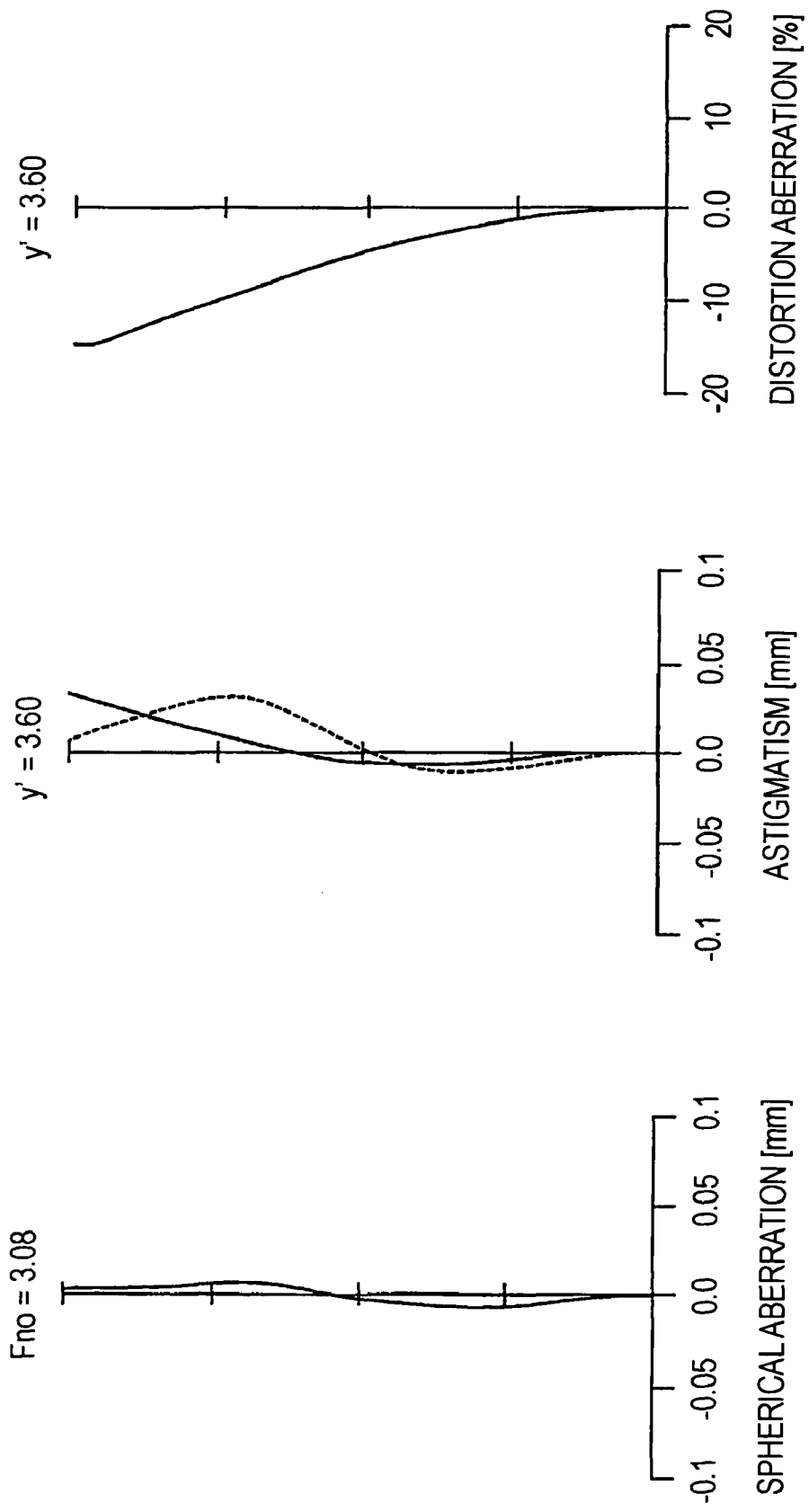
FIG. 10 is a diagram illustrating spherical aberration, astigmatism, and distortion aberration in a wide angle end state, representing an aberration graph of a numerical example in which concrete numerical values are applied to the first embodiment in a manner similar to FIG. 11 and FIG. 12.
Figure 11:
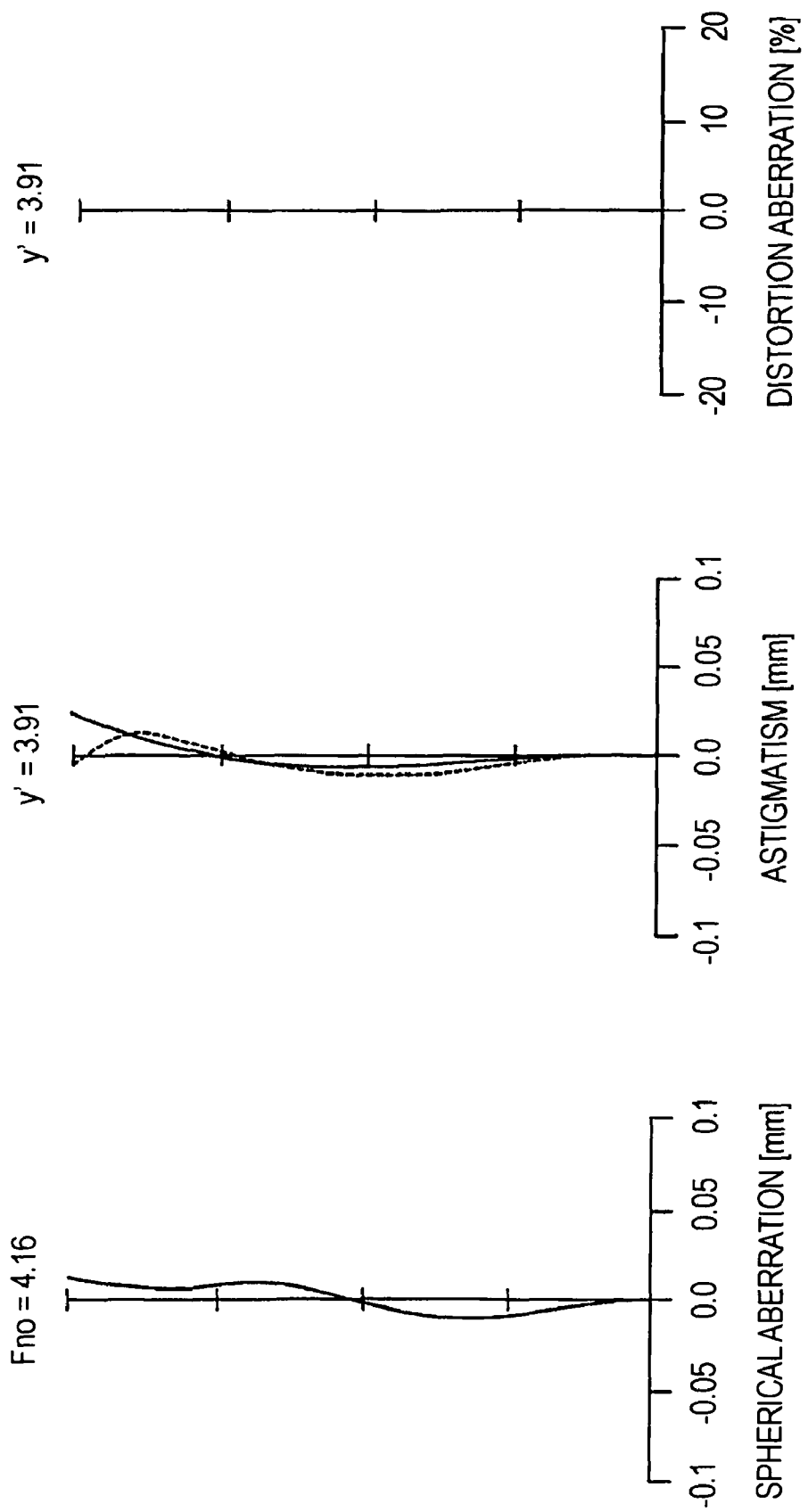
FIG. 11 is a diagram illustrating spherical aberration, astigmatism, and distortion aberration in a middle focal distance state.
Figure 12:
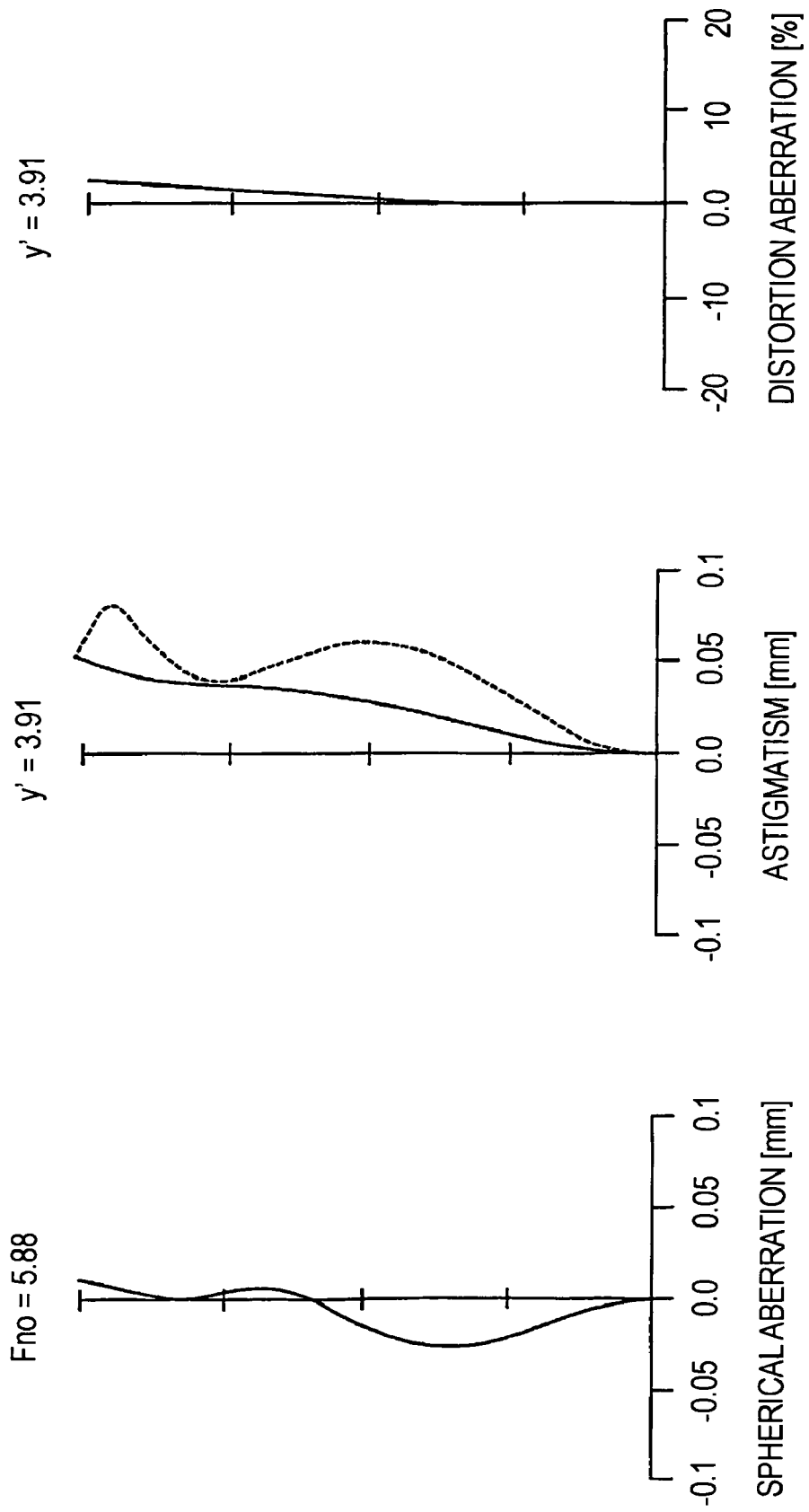
FIG. 12 is a diagram illustrating spherical aberration, astigmatism, and distortion aberration in a telephoto end state.

FIGS. 10 to 12 represent aberration diagrams in an infinity far in-focus state of the numerical example 3. FIG. 10 is an aberration diagram that represents a wide angle end state, FIG. 11 is an aberration diagram that represents a middle focal distance state, and FIG. 12 is an aberration diagram that represents in a telephoto end state.

FIGS. 10 and 12 are illustrated so that solid lines represent values on the sagittal image planes and the dashed lines represent values on the meridional image surfaces.

As is evident from each of the aberration diagrams, it is found that numeral example 3 shows favorably corrected various aberrations and excellent image-forming performance.

As is evident from Table 10, the varifocal length lens systems 1 to 3 are made to satisfy the conditional expressions (1) to (6).

[Configuration of Image Pickup Apparatus with Vari-Focal Length Lens System (Four Groups)]

Hereinafter, according to an embodiment of the present invention, an image pickup apparatus provided with the vari-focal length lens system with four lens groups, first to fourth lens groups, will be described.

The image pickup apparatus of the present embodiment includes a vari-focal length lens system and an imaging element that electrically converts an optical image formed by the vari-focal length lens system into an electric signal.

In the image pickup apparatus of the present embodiment, the vari-focal length lens system includes a first lens group having a positive refractive power, a second lens group having a negative refractive power, a third lens group having positive refractive power, and a fourth lens group having a positive refractive power, which are arranged from an object side to an image side.

In the vari-focal length lens system of the image pickup apparatus of the present embodiment, when a positional lens state is changed from a wide angle end state to a telephoto end state, the distance between the first lens group and the second lens group increases, the distance between the second lens group and the third lens group decreases, and the distance between the third lens group and the fourth lens group varies.

In the vari-focal length lens system of the image pickup apparatus of the present embodiment, when a positional lens state is changed from a wide angle end state to a telephoto end state, all of the lens groups are movable, an aperture stop is arranged near the third lens group, and the fourth lens group moves at the time of short distance focusing.

In the vari-focal length lens system of the image pickup apparatus according to the embodiment of the present invention, the first lens group includes a negative lens with a concave that faces to an image and a positive lens with a convex that faces an object, which are arranged from the object side to the image side in this order.

In the vari-focal length lens system of the image pickup apparatus according to the embodiment of the present invention, the second lens group includes a negative lens with a concave that faces to an image (first negative lens), a negative lens with a concave that faces to the object and an opposite concave that faces to the image (second negative lens), and a meniscus-shaped positive lens with a convex that faces to the object. The lenses are arranged from an object side to an image side. In the second lens group, each of the object-side surface of the first negative lens and the image-side surface of the positive lens is formed in an aspherical shape.

In the image pickup apparatus according to the embodiment of the present invention, the vari-focal length lens system is configured as described above, the lenses can be thinned after securing an aberration-correcting function. In addition, the size reduction can be attained after securing high optical performance.

In the image pickup apparatus according to the embodiment of the present invention, the vari-focal length lens system can realize higher optical performance by using the aspheric surface lens. In particular, the use of the aspheric surface lens in the second lens group allows the lens system to favorably correct a variation in coma aberration due to an angle of view generated in a wide angle end state.

In the vari-focal length lens system of the image pickup apparatus according to the present embodiment, at least two surfaces of the surface on the object side of the negative lens (first negative lens) and the surface on the image side of the positive lens arranged on the object side of the second lens group are formed into aspheric surfaces, respectively. Thus, the size reduction and the high performance can be simultaneously attained in a wide angle end state.

In the image pickup apparatus of the present embodiment, the vari-focal length lens system of the present embodiment satisfies the following conditional expressions (1).

$$2.0 < f1/(fw \cdot ft)^{1/2} < 2.5, \text{wherein} \tag{1}$$

f1: focal length of the first lens group;

fw: focal length in the whole lens system in a wide angle end state; and ft: focal length in the whole lens system in a telephoto end state.

Therefore, in the image pickup apparatus of the present invention, when the vari-focal length lens system satisfies the conditional expression (4), the whole length of the lens system in a telephoto end state can be shortened and the negative spherical aberration generated in the first lens group can be favorably corrected.

[Configuration of Vari-Focal Length Lens System (Five Lens Groups)]

Next, the vari-focal length lens system of the present embodiment with fifth lens groups, first to fifth lens groups, according to one embodiment of the present invention will be described.

The vari-focal length lens system according to the embodiment of the present invention includes a first lens group having a positive refractive power, a second lens group having a negative refractive power, a third lens group having positive refractive power, a fourth lens group having a positive refractive power, and a fifth lens group having a positive refractive power, which are arranged from an object side to an image side.

In the vari-focal length lens system of the present embodiment, when a positional lens state is changed from a wide angle end state to a telephoto end state, the distance between the first lens group and the second lens group increases, the distance between the second lens group and the third lens group decreases, and the distance between the third lens group and the fourth lens group varies.

The position of the fifth lens group is fixed for variable power.

In the vari-focal length lens system of the present embodiment, when a positional lens state is changed from a wide angle end state to a telephoto end state, each lens group of the first to fourth lens groups are movable, an aperture stop is arranged near the third lens group, and the fourth lens group moves at the time of short distance focusing.

Hereinafter, the functions of each lens group in the vari-focal length lens system of the present embodiment will be described.

In the vari-focal length lens system of the present embodiment, a first lens group and a second lens group are arranged close to each other while being in a wide angle end state to make an off-axis light flux incident on the first lens group close to an optical axis. As a result, the diameters of the respective lenses can be reduced. Simultaneously, an increase in distance between the first lens group and the second lens group occurs when a positional lens state is changed from a wide angle end state toward a telephoto end state. Thus, the off-axis light flux passing through the first lens group becomes far from the optical axis.

In the vari-focal length lens system of the present embodiment, a variation in off-axis aberration with a change in positional lens state is favorably correct using a change in height of the off-axis light flux. In particular, the whole length of the lens is shortened in a wide angle end state and lengthened in a telephoto end state to prevent the off-axis light flux incident on the first lens group from getting away from the optical axis too much.

The distance between a second lens group and a third lens group is lengthened to prevent the off-axis light flux passing through the second lens group from getting away from the optical axis too much. As a result, an on-axis aberration and an off-axis aberration can be corrected independently.

When the positional lens state is changed toward the telephoto end state, the distance between the second lens group and the third lens group decreases, and as a result, it becomes possible to move the off-axis light flux incident on the second lens group close to the optical axis. As a result, a variation in off-axis aberration with a change in positional lens state is favorably corrected, so that high performance can be attained.

Since a fourth lens group is arranged near an image plane, the movement of the fourth lens group causes only a small change in lateral magnification. Thus, the fourth lens moves so that a variation in image surface position with the movements of the first to third lens groups can be corrected.

In addition, a suitable lens for the image pickup apparatus (camera) that records a subject using an imaging element is in a state that an exit pupil position is far from an image plane, or the principle ray is almost in parallel with an optical axis. Therefore, a variation in height of light rays becomes small when the light flux passing through moves to the optical axis direction. Thus, since the change of the height of rays is small, the fourth lens group is suitable for a so-called short distance focusing that compensates a variation in image surface position occurred by a change in object position when moving to the optical axis direction.

From the above, the vari-focal length lens system of the present embodiment, the fourth lens group is moved at the time of short distance focusing.

In addition, the arrangement of the fixed fifth lens group allows light incident on the imaging element to be almost in parallel with the optical axis. In addition, the refractive power of the fifth lens group shortens the focal length of the lens system composed of four lens groups to attain a wider angle, while correcting the field curvature and allowing the size reduction of the lens system.

The position of an aperture stop should be considered in order to simultaneously attain size reduction of lens diameter and high performance.

This is because, in general, a change in height of off-axis light flux passing through each lens group occurs more easily as the number of lens groups changing their distances from the aperture stop increases. A change in height of off-axis light flux can be used for correcting a variation in off-axis aberration due to a change in positional lens state. Alternatively, the height of the off-axis light flux may be changed positively to correct the variation of the off-axis aberration more effectively. Furthermore, the arrangement of the aperture stop near the middle of the lens system allows the lenses to have smaller diameters.

Thus, in the vari-focal length lens system of the present embodiment, as described above, the aperture stop is placed near the third lens group to attain the size reduction of lens diameter and high performance of the lens system.

In addition, the aperture stop is arranged on the object side of the third lens group to allow the aperture stop and the third lens group to move together, thereby attaining a further reduction in lens diameter and a simplified structure of the lens barrel.

Furthermore, particularly in a wide angle end state, the arrangement of the aperture stop on the object side of the third lens group allows the off-axis light flux passing through the first lens group to be close to the optical axis to attain a size reduction in lens diameter. Simultaneously, the off-axis light flux passing through the first lens group approaches the optical axis in a wide angle end state, it becomes possible to prevent the generation of a coma aberration in the periphery of a screen to attain high performance.

For simultaneously attaining higher variable power, and size reduction, it is effective to increase the refractive power of each lens group. However, an increase in refractive power of each lens group leads to an increase in curvature of each lens surface in each lens group. Thus, a significantly large aberration may occur in the periphery of a screen when a wider angle is attained after attaining the higher variable power, and size reduction.

In the positive precedence type, the off-axis light flux passing through the first lens group tends to be far from the optical axis in a wide angle end state. In particular, the more the refractive power of the first lens group increases, the more the off-axis flux passing through the first lens group moves away from the optical axis. In this case, furthermore, a large coma aberration occurs in the periphery of the screen.

Therefore, in order to attain a wider angle after simultaneously attaining higher variable power, and size reduction, it is preferable to reduce the refractive power of the first lens group. In this case, however, a decrease in refractive power of the first lens group leads to an increase in whole length of the lens system, thereby resulting in difficulty in securing a predetermined variable magnification ratio.

Thus, in the vari-focal length lens system of the present embodiment, the first and second lens groups are designed as described above to ensure high optical performance by attaining a wider angle while attaining higher variable power, and size reduction without depending to the position of the lens.

In particular, the vari-focal length lens system of the present embodiment can attain both the higher variable power, and the size reduction while having a wider angle of more than 70 degrees in a wide angle end state.

In the vari-focal length lens system according to the embodiment of the present invention, the second lens group includes a negative lens with a concave that faces to an image (first negative lens), a negative lens with a concave that faces to the object and an opposite concave that faces to the image (second negative lens), and a meniscus-shaped positive lens with a convex that faces to the object. The lenses are arranged from an object side to an image side.

In the second lens group, each of the object-side surface of the first negative lens and the image-side surface of the positive lens is formed in an aspherical shape.

In the second lens group of the vari-focal length lens system of the present embodiment, an on-axis aberration is corrected by forming the image-side surface of the positive lens into an aspherical surface. In addition an off-axis aberration is corrected by forming the negative lens into an aspheric surface lens.

As the vari-focal length lens system of the present embodiment is configured as described above, the lenses can be thinned after securing an aberration-correcting function. In addition, the size reduction of the first lens group can be attained after securing high optical performance.

In addition, the first lens group may include two lenses, a negative lens and a positive lens to make a suitable moving distance from the wide-angle end to the telephoto end or vice versa. Thus, the thickness of the lens system at the time of collapsing the lens system and the whole length of the lens system in a telephoto end state can be reduced.

The vari-focal length lens system of the present embodiment can realize higher optical performance by using the aspheric surface lens. In particular, the use of the aspheric surface lens in the second lens group allows the lens system to favorably correct a variation in coma aberration due to an angle of view generated in a wide angle end state.

In the vari-focal length lens system of the present embodiment, at least two surfaces of the surface on the object side of the negative lens (first negative lens) and the surface on the image side of the positive lens arranged on the object side of the second lens group are formed into aspheric surfaces, respectively. Thus, the size reduction and the high performance can be simultaneously attained in a wide angle end state.

For using an aspherical surface, in general, there are methods, (A) a method of forming a surface near an aperture stop into an aspherical surface; and (B) a method of forming a surface far from the aperture stop into an aspherical surface.

In the case of (A), the aspherical surface is suitable for the correction of spherical aberration. In the case of (B), on the other hand the aspherical surface is suitable for the correction of off-axis aberration, such as distortion aberration and field curvature.

In the vari-focal length lens system of the present embodiment, two spherical surfaces are arranged far from each other in the second lens group to independently correct a refractive power near the optical axis and a refractive power, at a position far from the optical axis. Specifically, an entrance pupil position in a paraxial area and an entrance pupil position in the circumference of a screen are corrected independently. As a result, it becomes possible to approximate the off-axis light flux incident on the first lens group to the optical axis, the lens diameter can be reduced and a variation in off-axis aberration due to a change in angle of view can be favorably corrected.
[Conditional Expression of Vari-Focal Length Lens System (Fifth Lens Groups)] Hereinafter, the vari-focal length lens system of the present embodiment with five lens groups, first to fourth lens groups, according to one embodiment of the present invention will be described.

The vari-focal length lens system of the present embodiment satisfies the following conditional expressions (7).

$$2.4 < f1/(fw \cdot ft)^{1/2} < 2.7, \text{wherein} \tag{7}$$

f1: focal length of the first lens group;
fw: focal length in the whole lens system in a wide angle end state; and
ft: focal length in the whole lens system in a telephoto end state.

The conditional expression (7) is provided for shortening the whole length of the first lens group in a telephoto end state and favorably correcting a negative spherical aberration generated in the first lens group.

If it is higher than the upper limit of the conditional expression (7), the whole length of the first lens in a telephoto end state becomes long.

On the other hand, if it is smaller than the lower limit of the conditional expression (7), the negative spherical aberration generated in the first lens group is not corrected favorably. Thus, a further improvement in optical performance is hardly attained.

Therefore, when the vari-focal length lens system satisfies the conditional expression (7), the whole length of the lens system in a telephoto end state can be shortened and the negative spherical aberration generated in the first lens group can be favorably corrected.

It is desirable that the vari-focal length lens system according to one embodiment of the present invention satisfies the following conditional expression (8).

$$5 < |dwt1/dwt2| < 5.8, \text{wherein} \tag{8}$$

dwt1: a moving distance of the first lens group; and dwt2: a moving distance of the second lens group.

The conditional expression (8) is provided for defining the moving distance of the first lens group. In addition, thickness reduction of a zoom lens can be attained at the telephoto end and in a collapse state.

If it is smaller than the lower limit of the conditional expression (8), a desired zoom ratio is not obtained.

On the other hand, if it is higher than the upper limit of the conditional expression (8), the whole length of the lens system at a telephoto end becomes large.

In this case, there is a necessity of increasing the thickness of a mechanical component for securing a cam track corresponding the moving distance between the wide-angle end and the telephoto end of the first lens group, resulting in the hindrance of thickness reduction at the time of collapsing.

Therefore, the vari-focal length lens system satisfies the conditional expression (8) to attain the thickness reduction of lens at the telephoto end and at the time of collapsing.

It is desirable that the vari-focal length lens system according to one embodiment of the present invention satisfies the following conditional expression (9) in addition to the above conditional expression (7).

$$0.47 < |f2|/(fw \cdot ft)^{1/2} < 0.53, \text{wherein} \tag{1}$$

f2: focal length of the second lens group;
fw: focal length in the whole lens system in a wide angle end state; and
ft: focal length in the whole lens system in a telephoto end state.

The conditional expression (9) is provided for defining the focal distance of the second lens group to attain high performance.

If it is smaller than the lower limit of the conditional expression (9), the high-order off-axis aberration occurs significantly. Thus, a further improvement in performance is hardly attained.

On the other hand, if it is higher than the upper limit of the conditional expression (9), a variation in off-axis aberration with a change in positional lens state is hardly corrected in a favorable manner. Thus, a further improvement in performance is hardly attained.

Therefore, when the vari-focal length lens system satisfies the conditional expression (9), the high-order off-axis aberration on the periphery of a screen is suppressed, and a variation in off-axis aberration with a change in positional lens state can be favorably corrected. As a result, a more improvement in performance can be attained.

In the vari-focal length lens system of the present embodiment, to simultaneously obtain still higher variable power, still more size reduction, and still higher performance, the first lens group may be configured as described below.

In order to attain such still higher variable power, it is desired to favorably correct chromatic aberration and spherical aberration because of an increased focal length in a telephoto end state. In order to attain higher performance, it is desired to at least one positive lens and at least one negative lens in the first lens group because of being desired to favorably correct chromatic aberration and spherical aberration generated in each lens group.

Furthermore, in order to shorten the whole length of the lens system in a telephoto end state to reduce the diameter of lens, it is preferable that the first lens group includes a negative lens with a concave side to the image and a positive lens with a convex that faces to the object. The lenses are arranged from an object side to an image side.

In the vari-focal length lens system of the present embodiment, such a configuration of the first lens group allows the positive lens to be arranged nearest to an image, so that an off-axis light flux incident on the first lens group can approach the optical axis and simultaneously the whole length of the lens system can be shortened.

It is desirable that the vari-focal length lens system according to one embodiment of the present invention satisfies the following conditional expression (10).

$$0.53 < dS3/R31 < 0.59, \text{wherein} \tag{10}$$

dS3: the distance between the aperture stop and the nearest surface of the third lens group from an image plane, and
R31: the curvature radius of the nearest surface of the third lens group from an object.

The conditional expression (10) is provided for defining the profile of the nearest surface of the third lens group from an object.

The third lens group has a strong refractive power in order to converge a light flux emitted from the second lens group. Therefore, when optimizing the shape of the third lens group and attaining still higher performance, the nearest surface of the third lens group to the object will play an important role.

If it is higher than the upper limit of the conditional expression (10), the negative spherical aberration generated in the third lens group is not corrected favorably. Thus, a further improvement in performance is hardly attained.

If it is smaller than the lower limit of the conditional expression (10), it becomes difficult to shorten the whole length of the lens system in a telephoto end state.

Therefore, when the vari-focal length lens system satisfies the conditional expression (10), a negative spherical aberration generated in the third lens group can be corrected favorably, while the whole length of the lens system in a telephoto end state can be shortened.

In the vari-focal length lens system of one embodiment of the present invention, it is desirable to satisfy the following conditional expressions (11) to attain still higher performance.

$$2.1 < f3/fw < 2.3, \text{wherein} \quad (11)$$

f3: focal length of the third lens group; and
fw: focal length in the whole lens system in a wide angle end state.

If it is smaller than the lower limit of the conditional expression (11), it becomes difficult to favorably correct a variation in coma aberration with a change in angle of view in a wide angle end state. thus, a sufficient high performance is hardly attained.

On the other hand, if it is higher than the upper limit of the conditional expression (11), the whole length of the lens system becomes long without depending on the positional lens state. Thus, still more size reduction is hardly attained.

Therefore, when the vari-focal length lens system satisfies the conditional expression (11), it is possible to favorably correct a variation in coma aberration in a wide angle end state and the whole length of the lens system can be shortened without depending on the positional lens state.

In the vari-focal length lens system of one embodiment of the present invention, it is desirable to satisfy the following conditional expressions (12) to attain still higher performance.

$$5.6 < f5/fw < 7.2, \text{wherein} \quad (5)$$

f5: focal length of the fifth lens group; and
fw: focal length in the whole lens system in a wide angle end state.

The conditional expression (12) represents a ratio between the focal length of the fifth lens group and the focal length of the entire lens system in a wide angle end state.

If it is smaller than the lower limit of the conditional expression (12), effects of the wider angle and the size reduction is not attained in a wide angle end state.

On the other hand, if it is higher than the upper limit of the conditional expression (12), an increase in field curvature occurs and sufficient performance is hardly attained.

When the vari-focal length lens system satisfies the conditional expression (12), field curvature with an increase in wider angle of an angle can be favorably corrected in a wide angle end state and the whole length of the lens system can be shortened.

In the vari-focal length lens system of one embodiment of the present invention, it is desirable to satisfy the following conditional expressions (13) to favorably correct a positive spherical aberration generated in the second lens group and attain high performance. A positive spherical aberration generated by a second lens group is corrected good, $1 < |1/\beta 2t| < 1.5$, wherein β2t: lateral magnification of the second lens group in a telephoto end state.

The conditional expression (13) is provided for defining the lateral magnification of the second lens group.

If it is higher than the upper limit of the conditional expression (13), the positive spherical aberration generated in the second lens group is not corrected favorably. Thus, a further improvement in performance is hardly attained.

On the other hand, if it is lower than the lower limit of the conditional expression (13), the whole length of the lens system in a telephoto end state is not shortened. Thus, a sufficient decrease positive spherical aberration generated in the second lens group is not corrected favorably. Thus, a sufficient size reduction is hardly attained.

Therefore, when the vari-focal length lens system satisfies the conditional expression (13), a positive spherical aberration generated in the second lens group can be corrected sufficiently, while the whole length of the lens system in a telephoto end state can be shortened.

Furthermore, in the vari-focal length lens system of the present embodiment, one lens group or part of one lens group among the first to fifth lens groups is shifted in a direction substantially perpendicular to the optical axis. In this way, the vari-focal length lens system can shift the lens group or part thereof in the direction substantially perpendicular to the optical axis. Then, the amount of the shift and may also serve as a vibration control optical system by combining with a detection system for detecting an image shaking, a driving system for shifting each of lens groups, and a control system for providing the driving system with the amount of the shift in response to the output of the detection system.

In particular, in the vari-focal length lens system of the present embodiment, the third lens group is shifted in the direction substantially perpendicular to the optical axis. Thus, a change in performance caused by the shifting can be minimized.

If the aperture stop is arranged near the third lens group, an off-axis light flux passes through near the optical axis. Thus, it is possible to suppress a change in off-axis aberration caused by shifting the third lens group in the direction substantially perpendicular to the optical axis.

Furthermore, the vari-focal length lens system of the present embodiment may be provided with a low-pass filter on the image side of the lens system to avoid the generation of a moire pattern or may be provided with an infrared cut filter depending on the spectral sensitivity characteristic of a light-receiving element.

In addition, the lens system may be further thinned at the time of collapsing by allowing any one of the first to fifth lens groups to be shifted in the direction perpendicular to the optical axis to prevent each of the lens groups from causing interference.

Furthermore, the center performance and the peripheral performance of the lens system can be further improvised by introducing an aspheric surface lens into the third or fifth lens group.

In addition, the vari-focal length lens system can secure still higher optical performance by forming a plurality of aspherical surfaces therein.

[Numerical Example of Vari-Focal Length Lens System (Five Groups)]

Hereinafter, the vari-focal length lens system with five lens groups, first to fifth lens groups according to each of concrete embodiments and numerical examples thereof to which specific numerical values are applied will be described with reference to the attached drawings and tables.

Meanings of signs represented in the descriptions and tables below are the same as those represented in the drawings and tables for the description of the vari-focal length lens system of four groups, first to fourth lens groups as described above.

<Fourth Embodiment>

Figure 13:
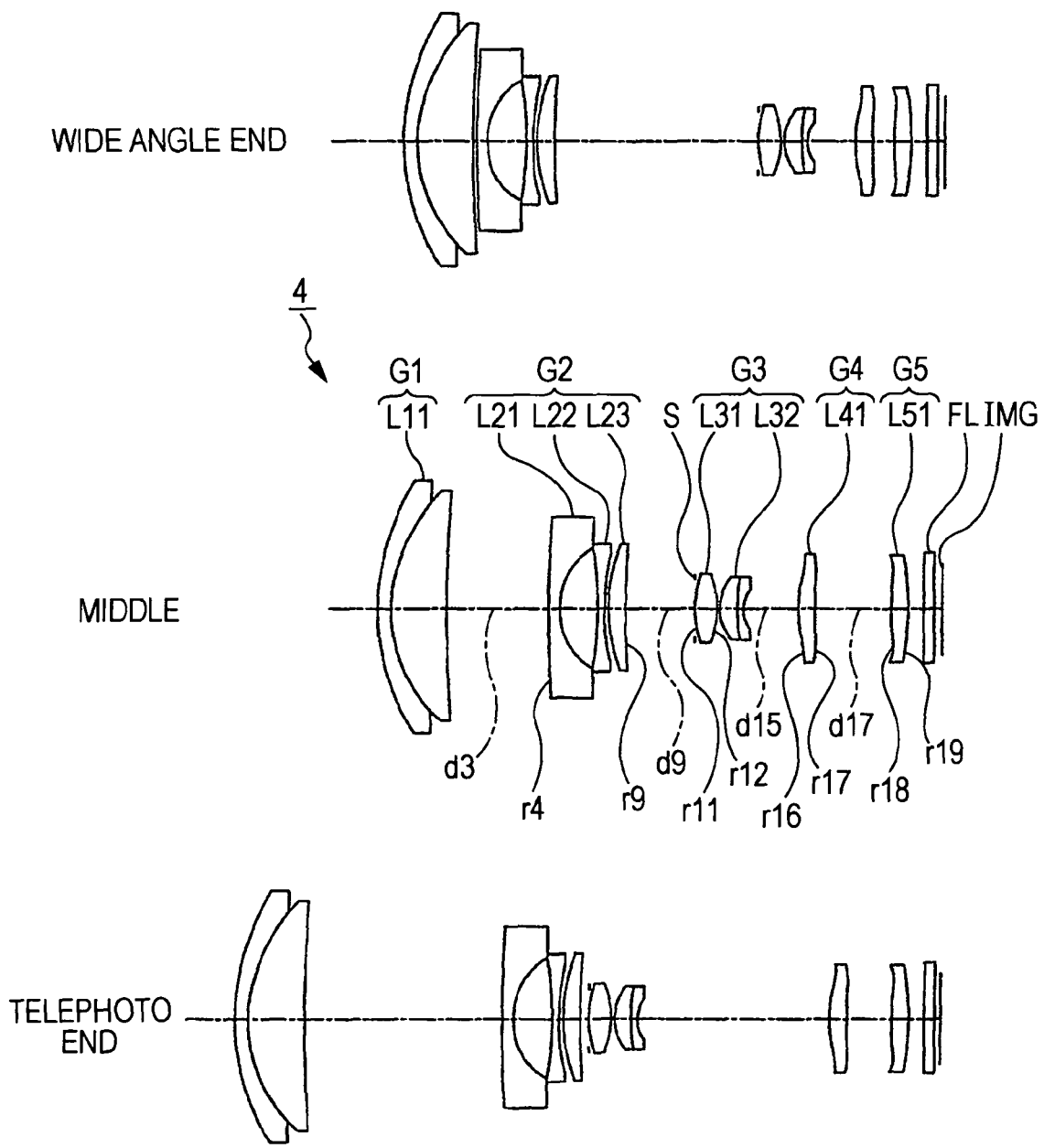
FIG. 13 is a diagram illustrating a lens arrangement in a vari-focal length lens system according to a fourth embodiment of the present invention.

FIG. 13 is a diagram illustrating a vari-focal length lens system 4 according to a fourth embodiment of the present invention. The vari-focal length lens system 4 includes 10 lenses.

The first lens group G1 is provided as a cemented lens L11 in which a meniscus-shaped negative lens with a convex that faces to an object and a positive lens with a convex that faces to the object are cemented together. The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex that faces to the object and a negative lens with a concave that faces to the image are cemented together.

The fourth lens group G4 includes a meniscus-shaped positive lens with a convex that faces to the object.

The fifth lens group 5 includes a positive lens 51 with convex side sides.

A filter FL is arranged between the fifth lens group G5 and an image plane IMG.

Table 11 represents lens data of numerical example 4 obtained by concretely applying numerical values to the vari-focal length lens system 4 of the fourth embodiment.

TABLE 11

| i | ri | di | ni | vi |
|---|---|---|---|---|
| 1 | 20.995 | 1.000 | 2.00069 | 25.5 |
| 2 | 13.187 | 4.433 | 1.81600 | 46.6 |
| 3 | 127.819 | variable | | |
| 4 | 181.907 (ASP) | 0.800 | 1.85135 | 40.1 |
| 5 | 5.990 | 3.235 | | |
| 6 | −27.894 | 0.450 | 1.83481 | 42.7 |
| 7 | 19.783 | 0.301 | | |
| 8 | 12.847 | 1.560 | 2.00178 | 19.3 |
| 9 | 77.083 (ASP) | variable | | |
| 10 (S) | INF | 0.000 | | |
| 11 | 6.594 (ASP) | 1.800 | 1.62263 | 58.2 |
| 12 | −11.878 (ASP) | 0.204 | | |

TABLE 11-continued

| i | ri | di | ni | vi |
|---|---|---|---|---|
| 13 | 4.279 | 1.477 | 1.49700 | 81.6 |
| 14 | 20.811 | 0.400 | 1.90366 | 31.3 |
| 15 | 3.382 | variable | | |
| 16 | 13.733 (ASP) | 1.342 | 1.52470 | 56.2 |
| 17 | 65.664 (ASP) | variable | | |
| 18 | 73.643 (ASP) | 1.405 | 1.52470 | 56.2 |
| 19 | −22.021 (ASP) | 1.220 | | |
| 20 | INF | 0.800 | 1.51680 | 64.2 |
| 21 | INF | | | |

In the vari-focal length lens system 4, an object-side surface (r4) of the first negative lens L21 of the second lens group G2, an image-side surface (r9) of the positive lens L23 of the second lens group G2, both surfaces (r11, r12) of the biconvex lens L31 of the fourth lens group G3, both surfaces (r16, r17) of the positive lens L41 of the fourth lens group G4, both surfaces (r18, r19) of the positive lens L51 of the fourth lens group G5, are formed into aspherical surfaces, respectively. The aspheric coefficients A4, A6, A8, and A10 in the numerical example 4 are listed in Table 12 together with conical coefficient K, respectively.

TABLE 12

| | K | A4 | A6 | A8 | A10 |
|---|---|---|---|---|---|
| r4 | 0.0000E+00 | 7.4312E−06 | 4.1508E−08 | 2.6999E−11 | −6.2793E−13 |
| r9 | 0.0000E+00 | −1.8565E−05 | 4.0721E−06 | −2.0395E−07 | 3.8714E−09 |
| r11 | 0.0000E+00 | −1.0705E−03 | −1.6778E−04 | 1.6850E−05 | −2.7841E−06 |
| r12 | 0.0000E+00 | −4.0956E−04 | −1.4511E−04 | 7.7093E−06 | −1.5863E−06 |
| r16 | 0.0000E+00 | −5.7126E−04 | 2.4782E−06 | −3.7507E−07 | −1.1927E−08 |
| r17 | 0.0000E+00 | −6.0314E−04 | 7.1380E−06 | −8.6259E−07 | 5.2995E−09 |
| r18 | 0.0000E+00 | 1.0957E−04 | 5.7020E−06 | −1.2000E−06 | −4.8378E−08 |
| r19 | 0.0000E+00 | 1.0169E−03 | −3.3546E−05 | −1.8000E−06 | 1.1070E−09 |

In the vari-focal length lens system 4, the surface distance d3 between the first lens group G1 and the second lens group G2, the surface distance d9 between the second lens group G2 and the aperture stop S, the surface distance d15 between the third lens group G3 and the fourth lens group G4, and the surface distance d17 between the fourth lens group G4 and the fifth lens group G5 change with the zooming between a wide angle end state and a telephoto end state. Table 13 represents variable distances in a wide angle end state, middle focal distance state, and telephoto end state in the numerical example 4 in addition to represent their respective F-numbers (Fno) and half view angles ω.

TABLE 13

| | Wide angle end | Middle | Telephoto end |
|---|---|---|---|
| f | 4.64 | 14.28 | 44.01 |
| Fno | 2.91 | 4.01 | 5.69 |
| 2ω | 84.16 | 30.03 | 9.86 |
| d3 | 0.40 | 8.36 | 16.05 |
| d9 | 16.31 | 5.45 | 0.50 |
| d15 | 4.04 | 4.53 | 15.55 |
| d17 | 1.72 | 6.14 | 3.65 |

Figure 14:
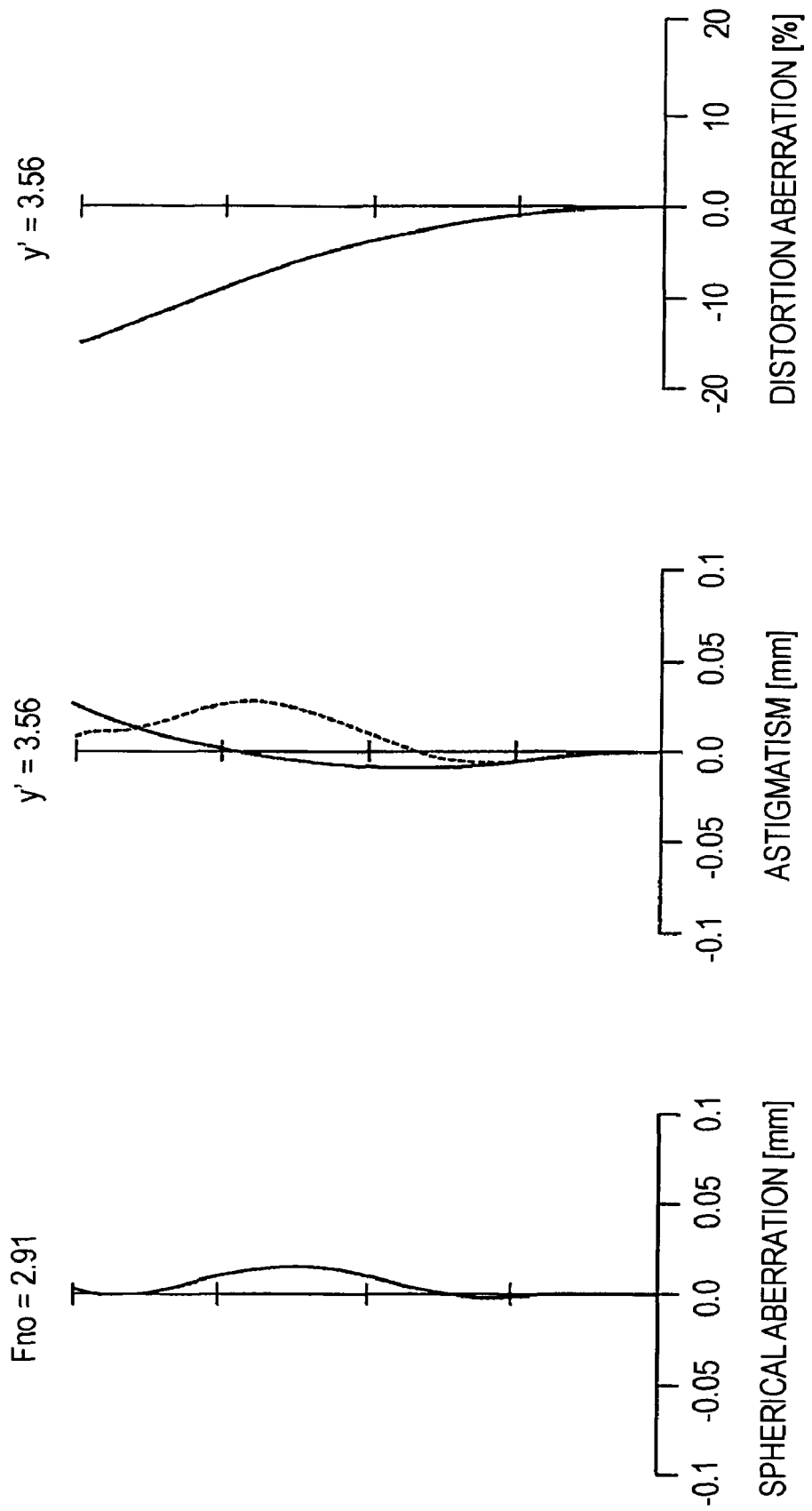
FIG. 14 is a diagram illustrating spherical aberration, astigmatism, and distortion aberration in a wide angle end state, representing an aberration graph of a numerical example in which concrete numerical values are applied to the first embodiment in a manner similar to FIG. 15 and FIG. 16.
Figure 15:
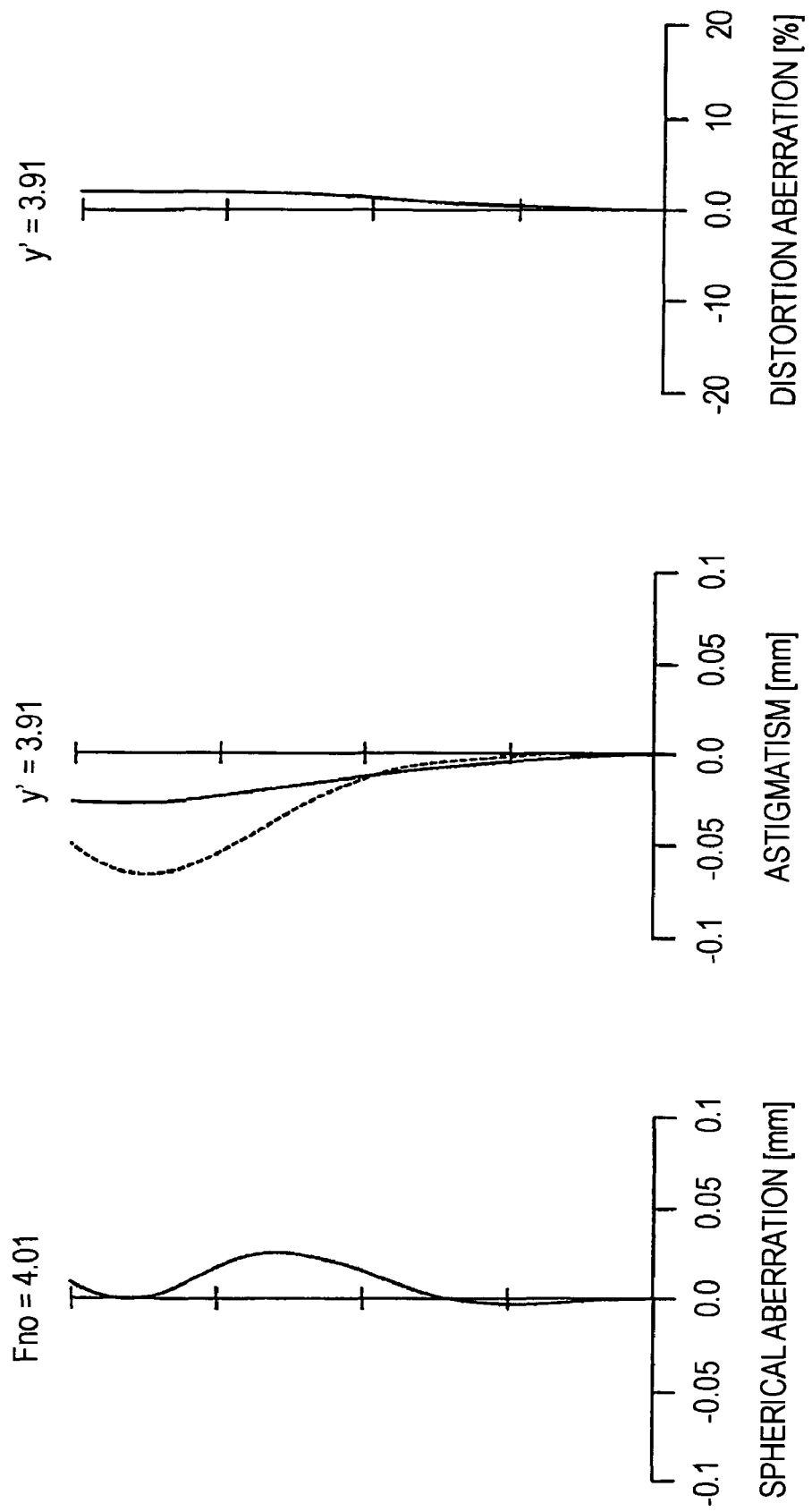
FIG. 15 is a diagram illustrating spherical aberration, astigmatism, and distortion aberration in a middle focal distance state.
Figure 16:
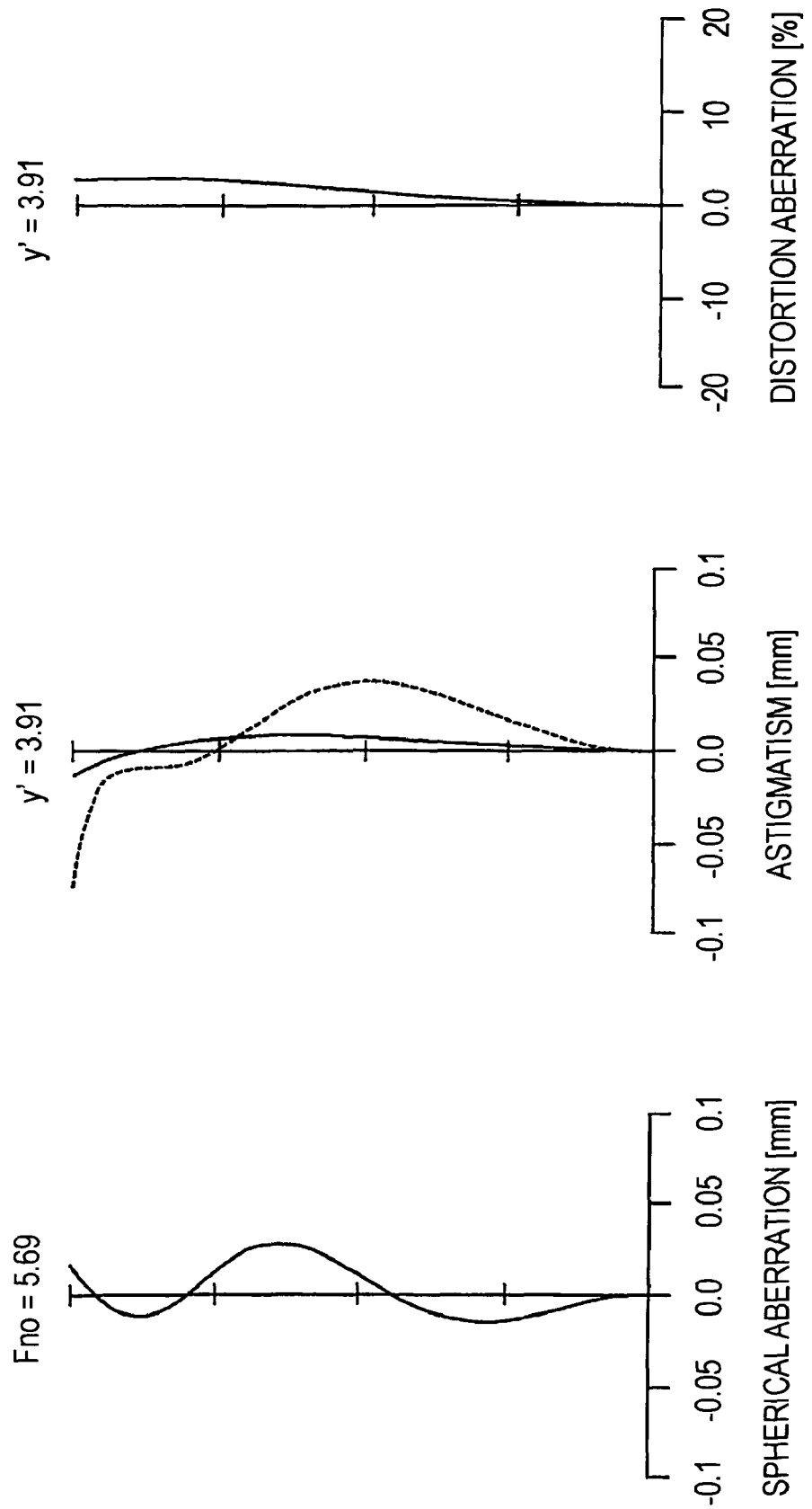
FIG. 16 is a diagram illustrating spherical aberration, astigmatism, and distortion aberration in a telephoto end state.

FIGS. 14 to 16 represent aberration diagrams in an infinity far in-focus state of the numerical example 4. FIG. 14 is an aberration diagram that represents a wide angle end state, FIG. 15 is an aberration diagram that represents a middle focal distance state, and FIG. 16 is an aberration diagram that represents in a telephoto end state.

FIGS. 14 and 16 are illustrated so that solid lines represent values on the sagittal image planes and the dashed lines represent values on the meridional image surfaces.

As is evident from each of the aberration graphs, it is evident that numeral example 4 shows favorably corrected various aberrations and excellent image forming performance.

<Fifth Embodiment>

Figure 17:
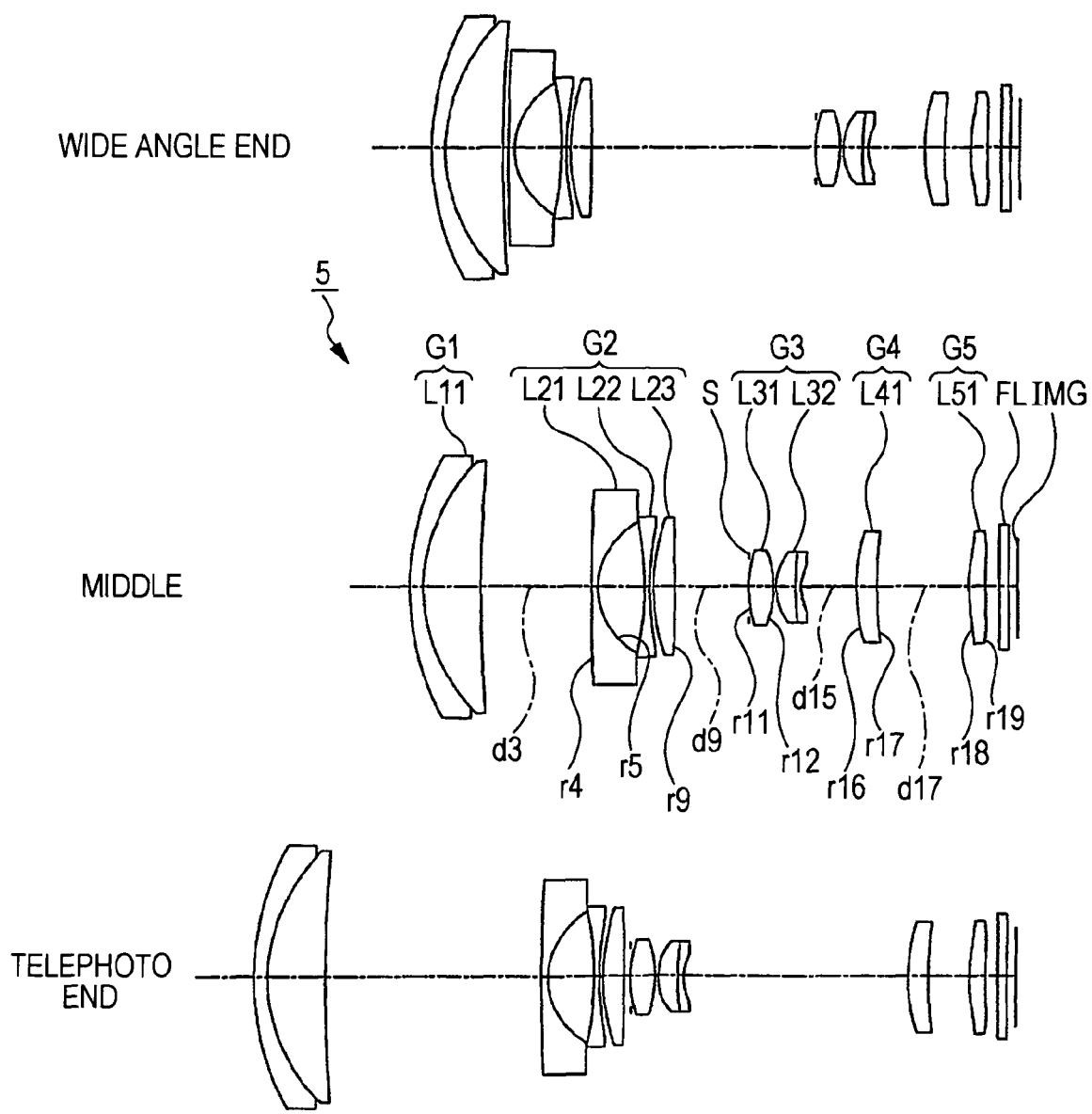
FIG. 17 is a diagram illustrating a lens arrangement in a vari-focal length lens system according to a fifth embodiment of the present invention.

FIG. 17 is a diagram illustrating a vari-focal length lens system 5 according to a fifth embodiment of the present invention. The vari-focal length lens system 5 includes ten lenses.

The first lens group G1 is provided as a cemented lens L11 in which a meniscus-shaped negative lens with a convex that faces to an object and a positive lens with a convex that faces to the object are cemented together. The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex that faces to the object and a negative lens with a concave that faces to the image are cemented together.

The fourth lens group G4 includes a meniscus-shaped positive lens L41 with a convex that faces to the object.

The fifth lens group 5 includes a positive lens 51 with convex side sides.

A filter FL is arranged between the fifth lens group G5 and an image plane IMG.

Table 14 represents lens data of numerical example 5 obtained by concretely applying numerical values to the vari-focal length lens system 5 of the first embodiment 5.

In the vari-focal length lens system 5, both surfaces (r4, r5) of the first positive lens L21 of the second lens group G2, an image-side surface (r9) of the positive lens L23 of the second lens group G2, both surfaces (r11, r12) of the biconvex lens L31 of the third lens group G3, both surfaces (r16, r17) of the positive lens L41 of the fourth lens group G4, and both surfaces (r18, r19) of the positive lens L51 of the fifth lens group G5 are formed into aspherical surfaces, respectively. The aspheric coefficients A4, A6, A8, and A10 in the numerical example 5 are listed in Table 15 together with conical coefficient K, respectively.

TABLE 15

|  | K | A4 | A6 | A8 | A10 |
|---|---|---|---|---|---|
| r4 | 0.0000E+00 | 6.3590E−06 | −1.9196E−07 | −6.4115E−09 | 1.1547E−10 |
| r5 | 0.0000E+00 | 2.2166E−05 | −4.4640E−06 | 5.1683E−07 | −2.2156E−08 |
| r9 | 0.0000E+00 | −6.7789E−05 | 1.0650E−06 | −8.7915E−09 | 4.6224E−10 |
| r11 | 0.0000E+00 | −9.3241E−04 | −1.5885E−04 | 1.5727E−05 | −2.3935E−06 |
| r12 | 0.0000E+00 | −3.4605E−04 | −1.2378E−04 | 5.9513E−06 | −1.3269E−06 |
| r16 | 0.0000E+00 | −3.0761E−04 | 4.3246E−06 | −1.3267E−06 | 1.9871E−08 |
| r17 | 0.0000E+00 | −1.5773E−04 | −7.6994E−06 | −1.0093E−06 | 1.6813E−08 |
| r18 | 0.0000E+00 | 1.1155E−03 | −4.7758E−05 | −1.8638E−06 | −2.3907E−10 |
| r19 | 0.0000E+00 | 2.2359E−03 | −9.5330E−05 | −4.6311E−06 | 1.4074E−07 |

In the vari-focal length lens system 5, the surface distance d3 between the first lens group G1 and the second lens group G2, the surface distance d9 between the second lens group G2 and the aperture stop S, the surface distance d15 between the third lens group G3 and the fourth lens group G4, and the surface distance d17 between the fourth lens group G4 and the fifth lens group G5 change with the zooming between a wide angle end state and a telephoto end state. Table 16 represents variable distances in a wide angle end state, middle focal distance state, and telephoto end state in the numerical example 5 in addition to represent their respective F-numbers (Fno) and half view angles ω.

TABLE 16

|  | Wide angle end | Middle | Telephoto end |
|---|---|---|---|
| f | 4.50 | 13.84 | 42.61 |
| Fno | 2.88 | 4.02 | 5.78 |
| 2ω | 85.83 | 30.65 | 9.99 |
| d3 | 0.43 | 8.32 | 16.10 |
| d9 | 16.50 | 5.42 | 0.50 |
| d15 | 4.18 | 4.10 | 16.59 |
| d17 | 1.88 | 6.83 | 3.00 |

TABLE 14

| i | ri | di | ni | vi |
|---|---|---|---|---|
| 1 | 21.060 | 1.030 | 2.00069 | 25.5 |
| 2 | 13.321 | 4.168 | 1.81600 | 46.6 |
| 3 | 126.881 | variable |  |  |
| 4 | 143.650 (ASP) | 0.500 | 1.85135 | 40.1 |
| 5 | 5.820 (ASP) | 3.369 |  |  |
| 6 | −25.574 | 0.450 | 1.83481 | 42.7 |
| 7 | 25.574 | 0.300 |  |  |
| 8 | 16.276 | 1.525 | 2.00178 | 19.3 |
| 9 | 1148.252 (ASP) | variable |  |  |
| 10 (S) | INF | 0.000 |  |  |
| 11 | 6.914 (ASP) | 1.792 | 1.62263 | 58.2 |
| 12 | −11.654 (ASP) | 0.240 |  |  |
| 13 | 4.290 | 1.511 | 1.49700 | 81.6 |
| 14 | 24.270 | 0.419 | 1.90366 | 31.3 |
| 15 | 3.474 | variable |  |  |
| 16 | 12.689 (ASP) | 1.467 | 1.58313 | 59.5 |
| 17 | 26.236 (ASP) | variable |  |  |
| 18 | 16.873 (ASP) | 1.222 | 1.58313 | 59.5 |
| 19 | −154.130 (ASP) | 0.922 |  |  |
| 20 | INF | 0.800 | 1.51680 | 64.2 |
| 21 | INF |  |  |  |

Figure 18:
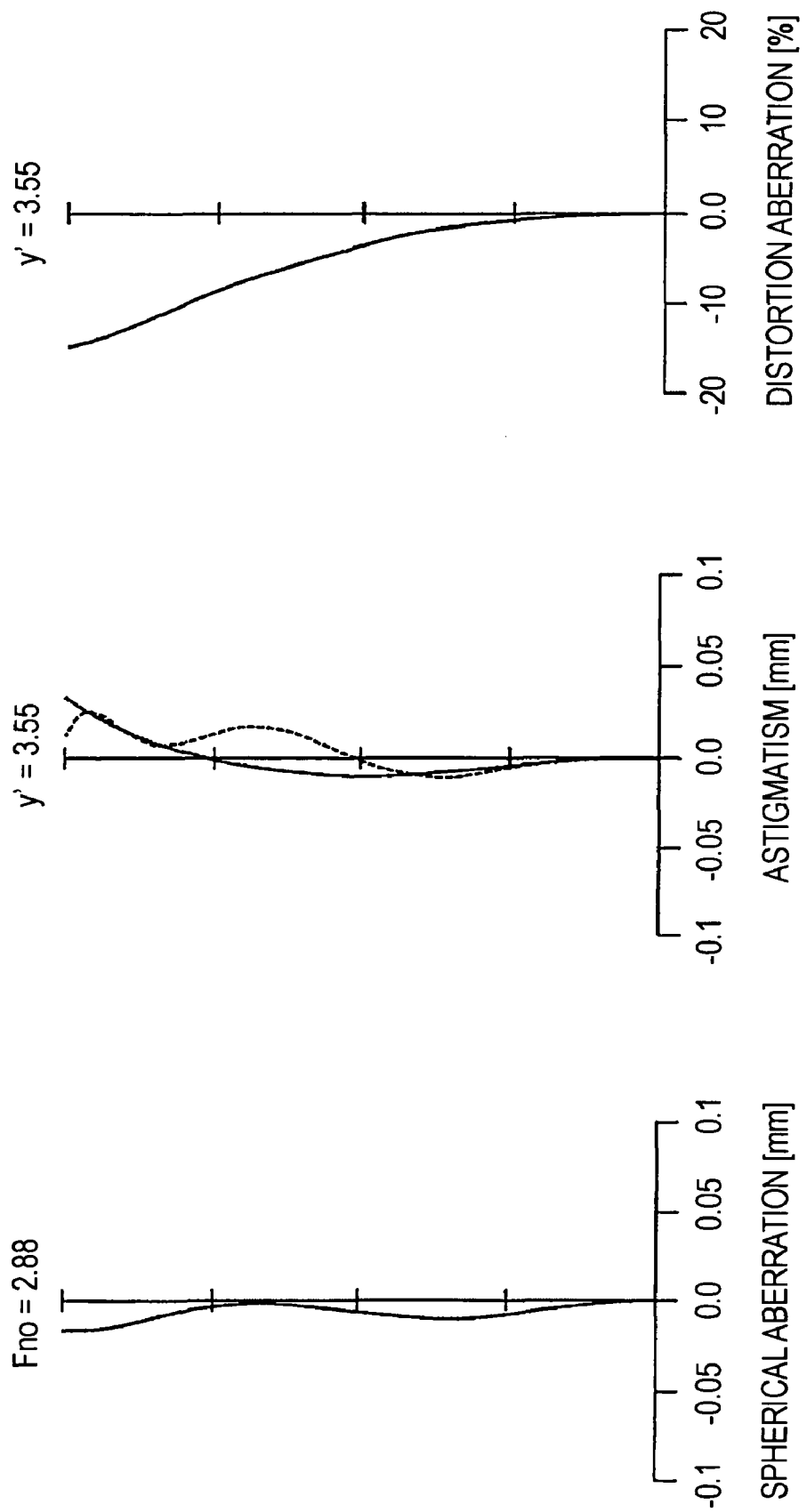
FIG. 18 is a diagram illustrating spherical aberration, astigmatism, and distortion aberration in a wide angle end state, representing an aberration graph of a numerical example in which concrete numerical values are applied to the first embodiment in a manner similar to FIG. 19 and FIG. 20.
Figure 19:
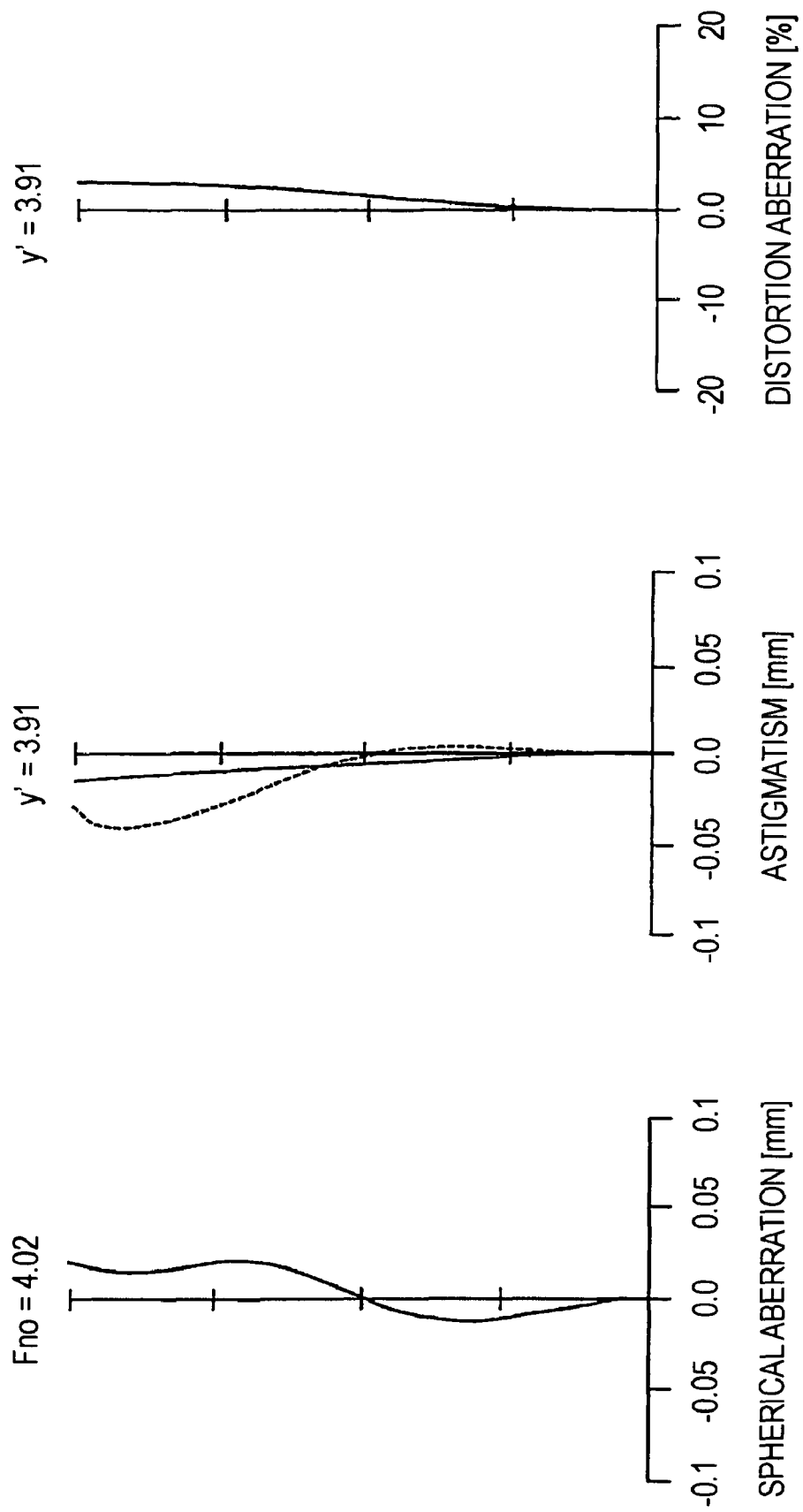
FIG. 19 is a diagram illustrating spherical aberration, astigmatism, and distortion aberration in a middle focal distance state.
Figure 20:
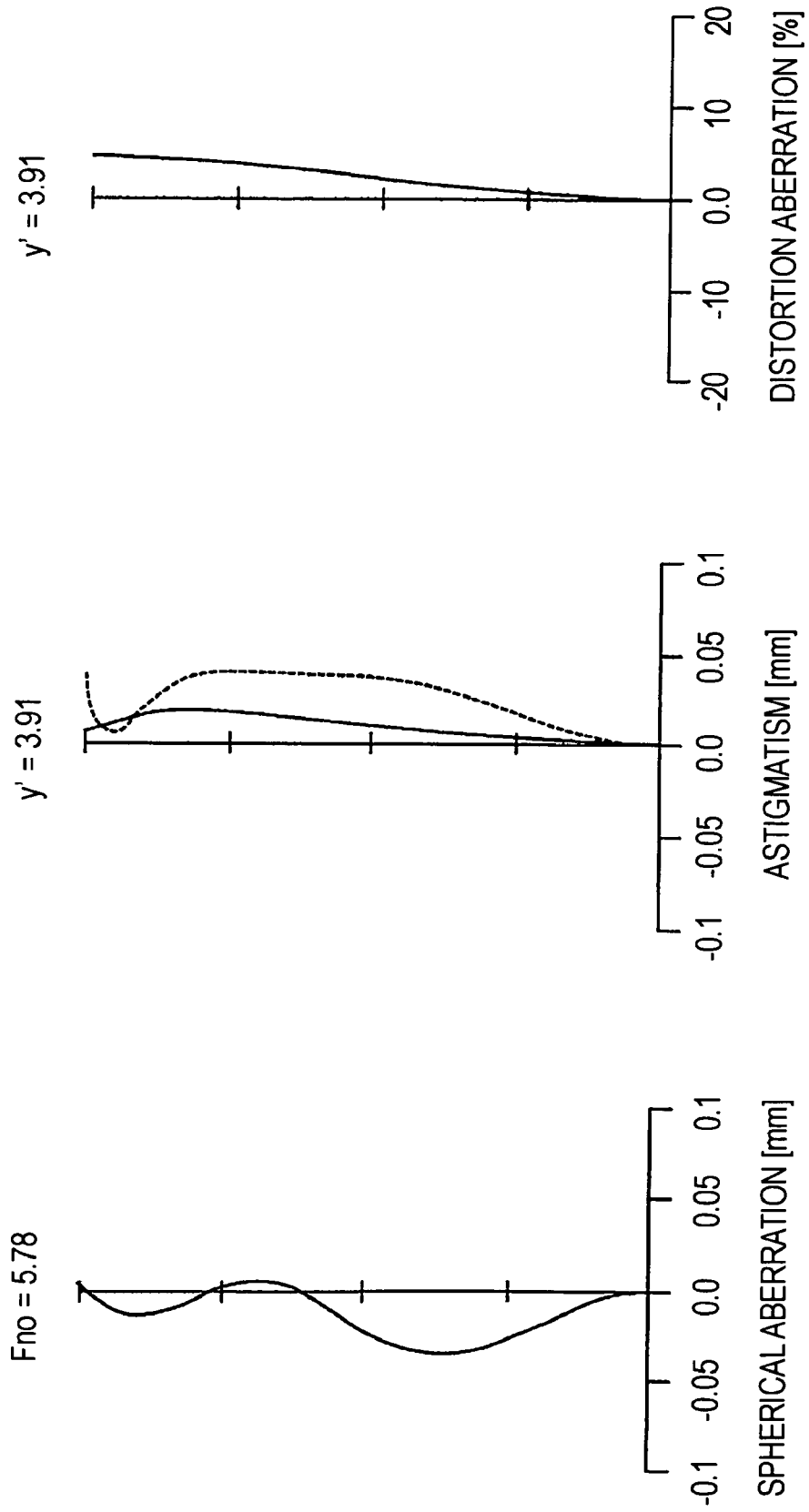
FIG. 20 is a diagram illustrating spherical aberration, astigmatism, and distortion aberration in a telephoto end state.

FIGS. 18 to 20 represent aberration diagrams in an infinity far-in-focus state of the numerical example 5. FIG. 18 is an aberration diagram that represents a wide angle end state, FIG. 19 is an aberration diagram that represents a middle focal distance state, and FIG. 20 is an aberration diagram that represents in a telephoto end state.

FIGS. 18 and 20 are illustrated so that solid lines represent values on the sagittal image planes and the dashed lines represent values on the meridional image surfaces.

As is evident from each of the aberration diagrams, it is found that numeral example 5 shows favorably corrected various aberrations and excellent image-forming performance.

<Sixth Embodiment>

Figure 21:
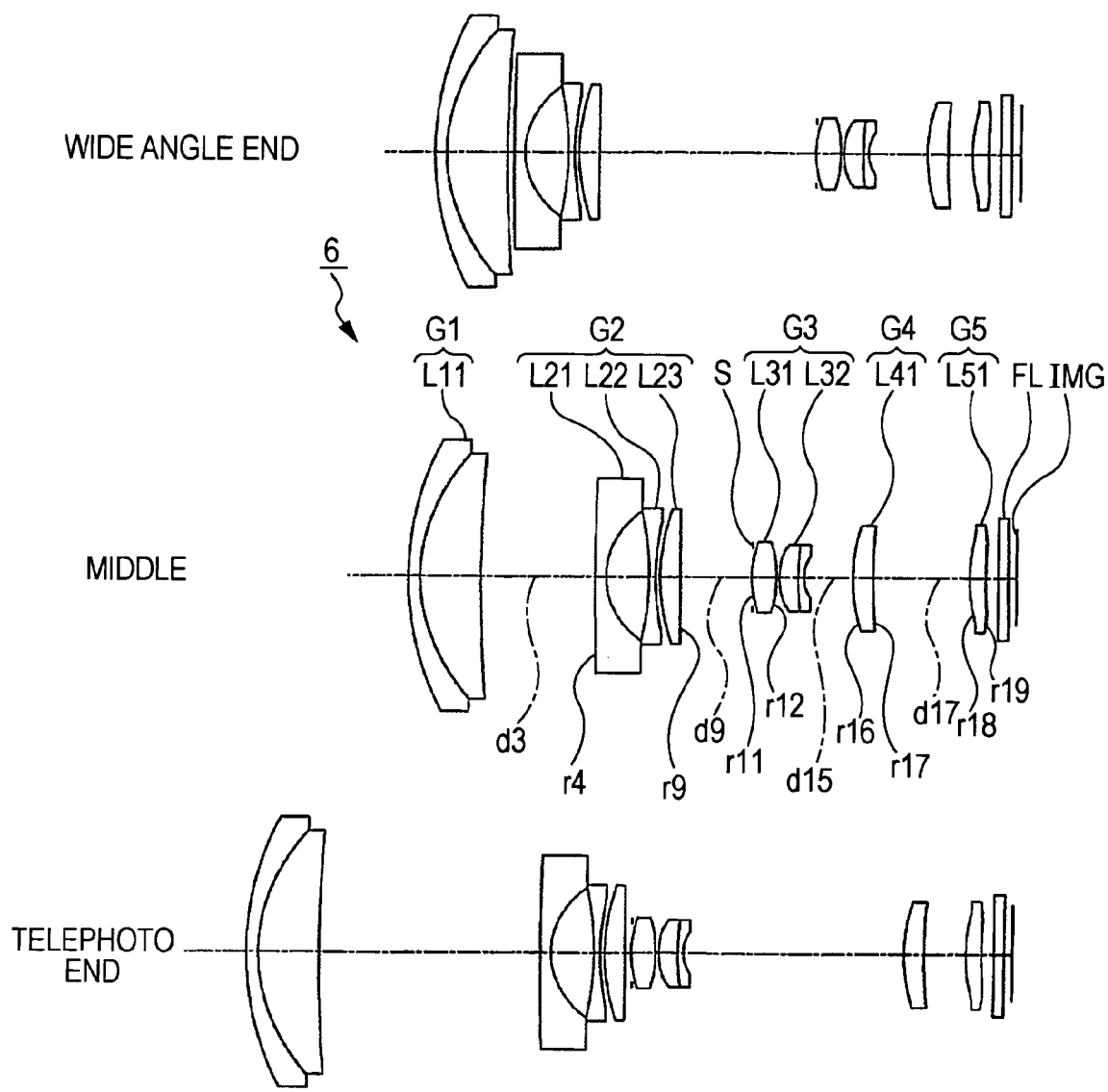
FIG. 21 is a diagram illustrating a lens arrangement in a vari-focal length lens system according to a six embodiment of the present invention.

FIG. 21 is a diagram illustrating a vari-focal length lens system 6 according to a sixth embodiment of the present invention. The vari-focal length lens system 6 includes nine lenses.

The first lens group G1 is provided as a cemented lens L11 in which a meniscus-shaped negative lens with a convex that faces to an object and a positive lens with a convex that faces to the object are cemented together. The second lens group G2 includes a first meniscus-shaped negative lens L21 with a concave that faces to an image, a second negative lens L22 with opposite concave sides, and a meniscus-shaped positive lens L23 with a convex that faces to the object.

The third lens group G3 includes a first positive lens L31 with opposite convex sides, and a cemented lens L32 in which a second positive lens with a convex that faces to the object and a negative lens with a concave that faces to the image are cemented together.

The fourth lens group G4 includes a meniscus-shaped positive lens L41 with a convex that faces to the object.

The fifth lens group G5 includes a positive lens with a convex that faces to the object.

A filter FL is arranged between the fifth lens group G5 and an image plane IMG.

Table 17 represents lens data of numerical example 6 obtained by concretely applying numerical values to the vari-focal length lens system 6 of the first embodiment 6.

TABLE 17

| i | ri | di | ni | vi |
|---|---|---|---|---|
| 1 | 22.163 | 1.000 | 2.00069 | 25.5 |
| 2 | 13.903 | 4.574 | 1.81600 | 46.6 |
| 3 | 150.174 | variable | | |
| 4 | 309.492 (ASP) | 0.800 | 1.85135 | 40.1 |
| 5 | 6.033 | 3.264 | | |
| 6 | −26.001 | 0.451 | 1.78590 | 43.9 |
| 7 | 20.124 | 0.324 | | |
| 8 | 14.647 | 1.621 | 2.00178 | 19.3 |
| 9 | 224.847 (ASP) | variable | | |
| 10 (S) | INF | 0.000 | | |
| 11 | 7.116 (ASP) | 1.799 | 1.62263 | 58.2 |
| 12 | −11.304 (ASP) | 0.200 | | |
| 13 | 4.199 | 1.507 | 1.49700 | 81.6 |
| 14 | 22.049 | 0.435 | 1.90366 | 31.3 |
| 15 | 3.433 | variable | | |
| 16 | 14.615 (ASP) | 1.500 | 1.52470 | 56.2 |
| 17 | 40.300 (ASP) | variable | | |
| 18 | 11.025 (ASP) | 1.294 | 1.58313 | 59.5 |
| 19 | 38.491 (ASP) | 0.794 | | |
| 20 | INF | 0.800 | 1.51680 | 64.2 |
| 21 | INF | | | |

In the vari-focal length lens system 6, an object-side surface (r4) of the first negative lens L21 of the second lens group G2, an image-side surface (r9) of the positive lens L23 of the second lens group G2, both surfaces (r11, r12) of the biconvex lens L31 of the third lens group G3, both surfaces (r16, r17) of the positive lens L41 of the fourth lens group G4, and both surfaces (r18, r19) of the positive lens L51 of the fifth lens group G5 are formed into aspherical surfaces, respectively. The aspheric coefficients A4, A6, A8, and A10 in the numerical example 6 are listed in Table 18 together with conical coefficient K, respectively.

TABLE 18

| | K | A4 | A6 | A8 | A10 |
|---|---|---|---|---|---|
| r4 | 0.0000E+00 | 2.1569E−06 | 1.5085E−07 | 2.2213E−09 | −4.3124E−11 |
| r9 | 0.0000E+00 | −4.2370E−05 | 4.0123E−08 | 4.8457E−08 | −1.4605E−09 |
| r11 | 0.0000E+00 | −9.8674E−04 | −1.5538E−04 | 1.4435E−05 | −2.4368E−06 |
| r12 | 0.0000E+00 | −3.8569E−04 | −1.3171E−04 | 6.4710E−06 | −1.4050E−06 |
| r16 | 0.0000E+00 | −4.1850E−05 | 1.8656E−05 | −7.8393E−07 | −4.1602E−08 |
| r17 | 0.0000E+00 | −7.7407E−05 | 2.7728E−05 | −1.1821E−06 | −3.9803E−08 |
| r18 | 0.0000E+00 | 1.7646E−04 | −2.9190E−05 | −2.6604E−06 | 2.0366E−08 |
| r19 | 0.0000E+00 | 1.3231E−03 | −1.1193E−04 | −3.9708E−06 | 1.5417E−07 |

In the vari-focal length lens system, the surface distance d3 between the first lens group G1 and the second lens group G2, the surface distance d9 between the second lens group G2 and the aperture stop S, the surface distance d15 between the third lens group G3 and the fourth lens group G4, and the surface distance d17 between the fourth lens group G4 and the fifth lens group G5 change with the zooming between a wide angle end state and a telephoto end state. Table 19 represents variable distances in a wide angle end state, middle focal distance state, and telephoto end state in the numerical example 6 in addition to represent their respective F-numbers (Fno) and half view angles ω.

TABLE 19

| | Wide angle end | Middle | Telephoto end |
|---|---|---|---|
| f | 4.51 | 13.88 | 42.72 |
| Fno | 3.00 | 4.14 | 6.02 |
| 2ω | 85.95 | 30.42 | 9.97 |
| d3 | 0.40 | 8.68 | 16.51 |
| d9 | 16.49 | 5.38 | 0.50 |
| d15 | 4.40 | 3.64 | 16.66 |
| d17 | 1.73 | 7.16 | 3.00 |

Figure 22:
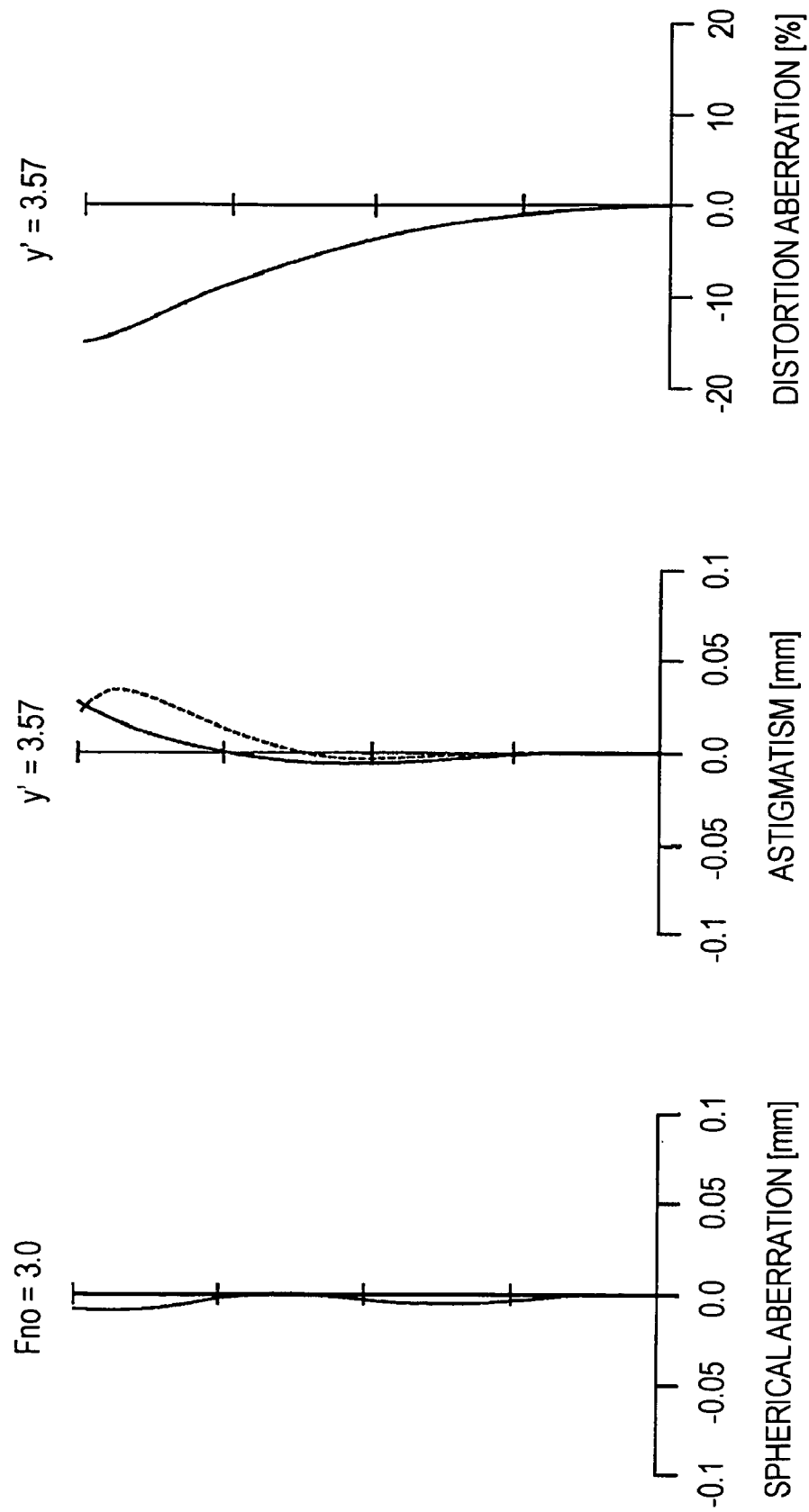
FIG. 22 is a diagram illustrating spherical aberration, astigmatism, and distortion aberration in a wide angle end state, representing an aberration graph of a numerical example in which concrete numerical values are applied to the first embodiment in a manner similar to FIG. 23 and FIG. 24.
Figure 23:
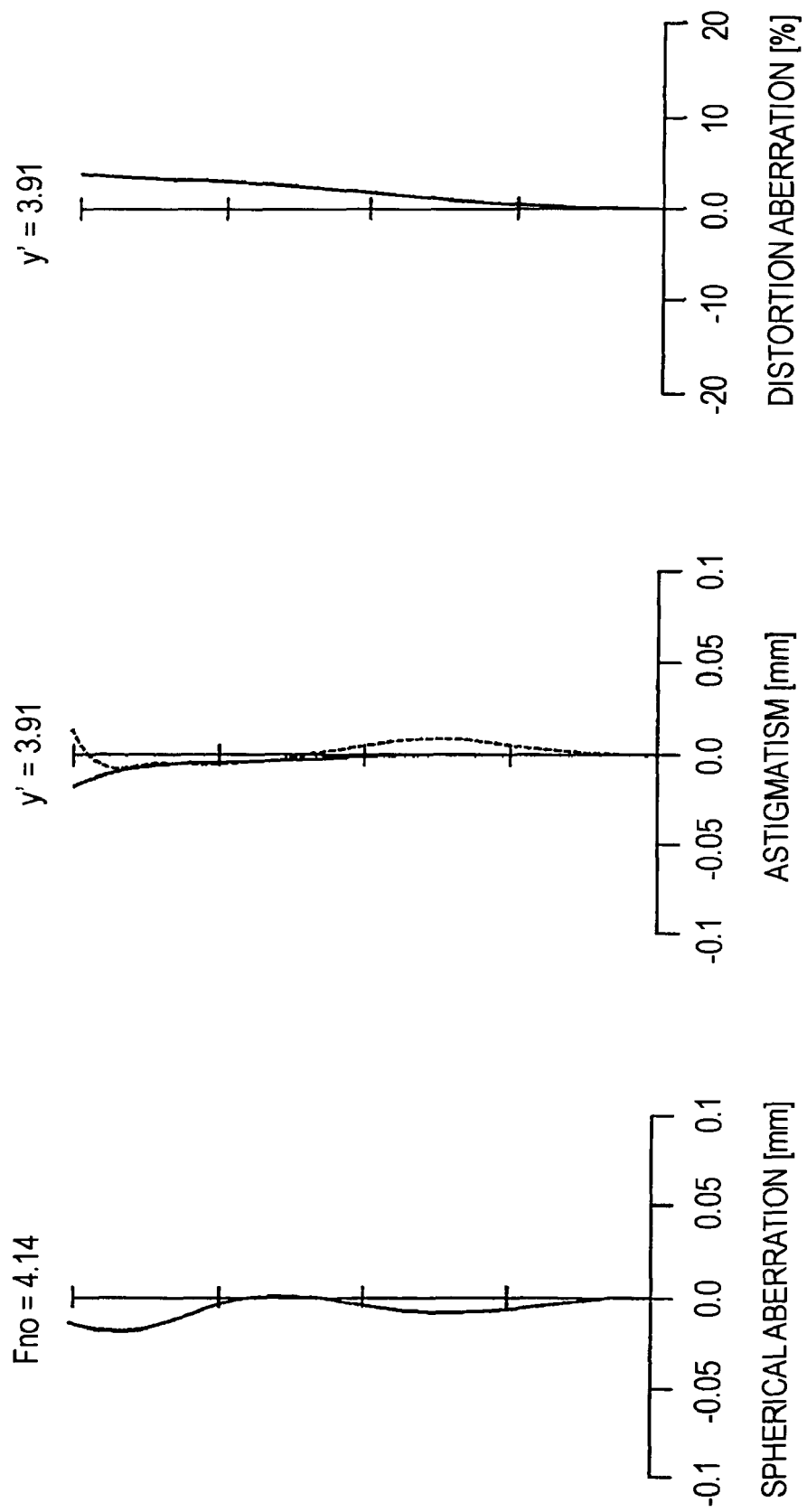
FIG. 23 is a diagram illustrating spherical aberration, astigmatism, and distortion aberration in a middle focal distance state.
Figure 24:
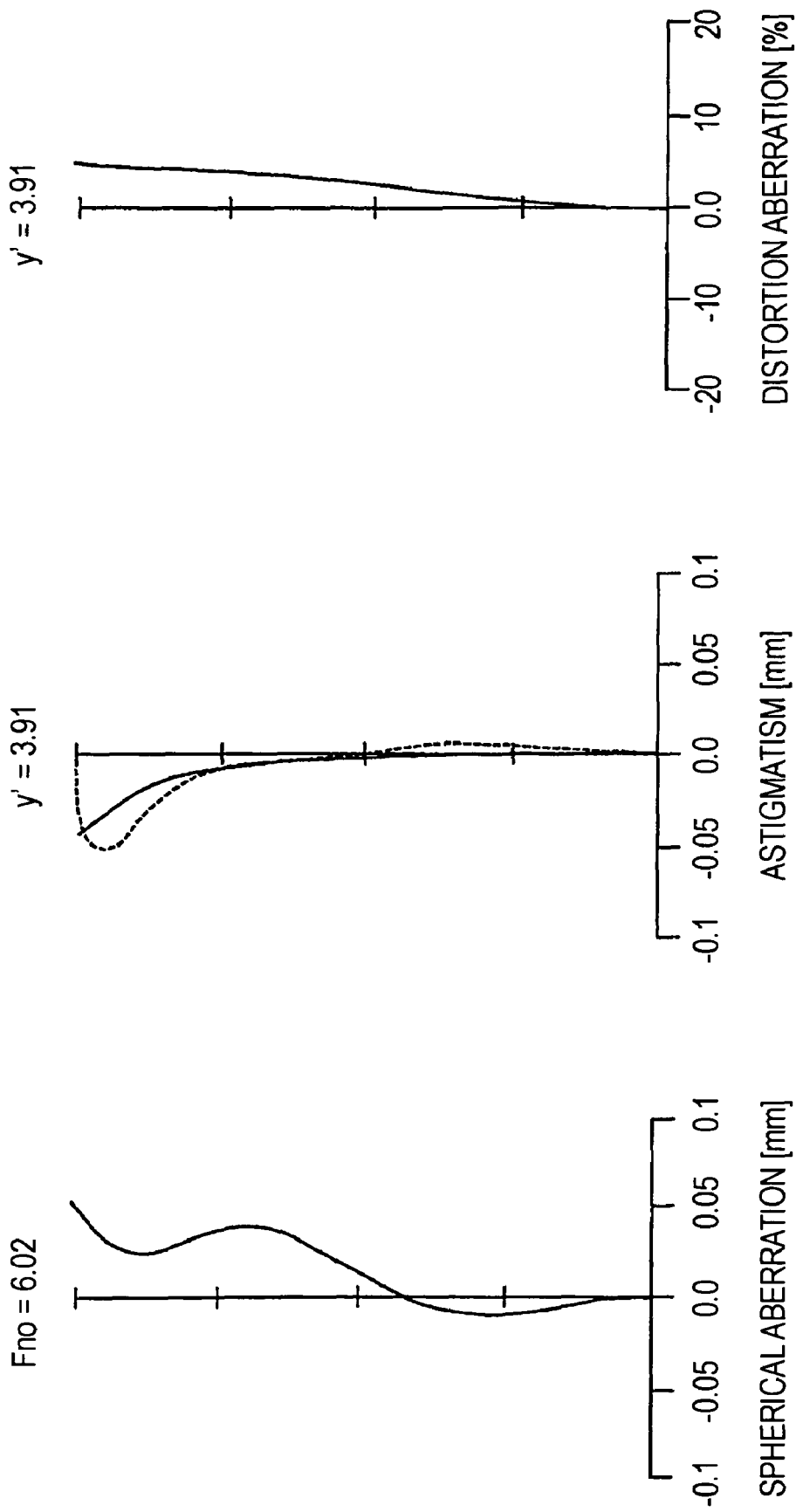
FIG. 24 is a diagram illustrating spherical aberration, astigmatism, and distortion aberration in a telephoto end state.

FIGS. 22 to 24 represent aberration diagrams in an infinity far in-focus state of the numerical example 6. FIG. 22 is an aberration diagram that represents a wide angle end state, FIG. 23 is an aberration diagram that represents a middle focal distance state, and FIG. 24 is an aberration diagram that represents in a telephoto end state.

FIGS. 22 and 24 are illustrated so that solid lines represent values on the sagittal image planes and the dashed lines represent values on the meridional image surfaces.

As is evident from each of the aberration diagrams, it is found that numeral example 6 shows favorably corrected various aberrations and excellent image-forming performance.

[Each Value of Conditional Expression of Vari-Focal Length Lens System (Five Lens Groups)]

Hereinafter, each value of the conditional expression of the vari-focal length lens with five lens groups, first to fifth lens groups, according to one embodiment of the present invention will be described.

The values of the above conditional expressions (7) to (13) in the varifocal length lens systems 4 to 6 are listed in Table 10, respectively.

TABLE 20

| | | Numerical example 4 | Numerical example 5 | Numerical example 6 |
|---|---|---|---|---|
| | f1 | 35.349 | 35.438 | 36.634 |
| | fw | 4.64 | 4.50 | 4.51 |
| | ft | 44.01 | 42.61 | 42.72 |
| Conditional equation (7) | $2.4 < f1/(fw \cdot ft)^{1/2} < 2.7$ | 2.473 | 2.561 | 2.640 |
| | dwt1 | 13.280 | 13.193 | 13.653 |
| | dwt2 | 2.37 | 2.48 | 2.46 |
| Conditional equation (8) | $5 < |dwt1/dwt2| < 5.8$ | 5.603 | 5.320 | 5.552 |
| | f2 | −6.997 | −7.074 | −7.127 |
| Conditional equation (9) | $0.47 < |f2|/(fw \cdot ft)^{1/2} < 0.53$ | 0.490 | 0.511 | 0.514 |
| | dS3 | 3.881 | 3.961 | 3.942 |
| | R31 | 6.594 | 6.914 | 7.116 |
| Conditional equation (10) | $0.53 < dS3/R31 < 0.59$ | 0.589 | 0.573 | 0.554 |
| | f3 | 9.920 | 9.957 | 9.892 |
| Conditional equation (11) | $2.1 < f3/fw < 2.3$ | 2.138 | 2.213 | 2.193 |
| | f5 | 32.472 | 26.149 | 26.043 |
| Conditional equation (12) | $5.6 < f5/fw < 7.2$ | 6.998 | 5.811 | 5.775 |
| Conditional equation (13) | $1 < |1/\beta 2t| < 1.5$ | 1.152 | 1.195 | 1.241 |

As is evident from Table 20, the varifocal length lens systems 7 to 6 are made to satisfy the conditional expressions (7) to (13).

[Configuration of Image Pickup Apparatus with Vari-Focal Length Lens System (Five Groups)]

Hereinafter, according to an embodiment of the present invention, an image pickup apparatus provided with the vari-focal length lens system with five lens groups, first to fifth lens groups, will be described.

The image pickup apparatus of the present embodiment includes a vari-focal length lens system and an imaging element that electrically converts an optical image formed by the vari-focal length lens system into an electric signal.

The vari-focal length lens system of the image pickup apparatus according to the embodiment of the present invention includes a first lens group having a positive refractive power, a second lens group having a negative refractive power, a third lens group having positive refractive power, a fourth lens group having a positive refractive power, and a fifth lens group having a positive refractive power, which are arranged from an object side to an image side.

In the vari-focal length lens system of the image pickup apparatus according to the present embodiment, when a positional lens state is changed from a wide angle end state to a telephoto end state, the distance between the first lens group and the second lens group increases, the distance between the second lens group and the third lens group decreases, and the distance between the third lens and the fourth lens decreases. The position of the fifth lens group is fixed for variable power.

In the vari-focal length lens system of the image pickup apparatus according to the present embodiment, when a positional lens state is changed from a wide angle end state to a telephoto end state, each lens group of the first to fourth lens groups are movable, an aperture stop is arranged near the third lens group, and the fourth lens group moves at the time of short distance focusing.

In the vari-focal length lens system of the image pickup apparatus according to the embodiment of the present invention, the first lens group includes a negative lens with a concave that faces to an image and a positive lens with a convex that faces an object, which are arranged from the object side to the image side in this order.

In the vari-focal length lens system of the image pickup apparatus according to the embodiment of the present invention, the second lens group includes a negative lens with a concave that faces to an image (first negative lens), a negative lens with a concave that faces to the object and an opposite concave that faces to the image (second negative lens), and a meniscus-shaped positive lens with a convex that faces to the object. The lenses are arranged from an object side to an image side. In the second lens group, each of the object-side surface of the first negative lens and the image-side surface of the positive lens is formed in an aspherical shape.

In the image pickup apparatus according to the embodiment of the present invention, the vari-focal length lens system is configured as described above, the lenses can be thinned after securing an aberration-correcting function. In addition, the size reduction can be attained after securing high optical performance.

In the image pickup apparatus according to the embodiment of the present invention, the vari-focal length lens system can realize higher optical performance by using the aspheric surface lens. In particular, the use of the aspheric surface lens in the second lens group allows the lens system to favorably correct a variation in coma aberration due to an angle of view generated in a wide angle end state.

In the vari-focal length lens system of the image pickup apparatus according to the present embodiment, at least two surfaces of the surface on the object side of the negative lens (first negative lens) and the surface on the image side of the positive lens arranged on the object side of the second lens group are formed into aspheric surfaces, respectively. Thus, the size reduction and the high performance can be simultaneously attained in a wide angle end state.

In the image pickup apparatus of the present embodiment, the vari-focal length lens system of the present embodiment satisfies the following conditional expressions (7).

$$2.4 < f1/(fw \cdot ft)^{1/2} < 2.7, \text{ wherein} \quad (7)$$

f1: focal length of the first lens group;
fw: focal length in the whole lens system in a wide angle end state; and
ft: focal length in the whole lens system in a telephoto end state.

In the image pickup apparatus of the present embodiment, therefore, when the vari-focal length lens system satisfies the conditional expression (7), the whole length of the lens system in a telephoto end state can be shortened and the negative spherical aberration generated in the first lens group can be favorably corrected.

[One Embodiment of Image Pickup Apparatus]

FIG. 25 is a block diagram illustrating the configuration of a digital still camera according to one of the embodiments of the present invention.

An image pickup apparatus (digital still camera) 100 includes a camera block 10 provided for imaging functions, a camera signal processing unit 20 that carries out signal processing, such as analog-digital conversion of captured image signals, an image processing unit 30 that performs recording and reproducing processing of the image signal, a liquid crystal display (LCD) 40 that displays the captured image or the like, a reader/writer (R/W) 50 that performs writing/reading the image signal on/from a memory card 50, a central processing unit 60 that controls the entire image pickup apparatus, an input unit 70 for an input operation by a user, which is constructed of a various kinds of switches and so on, and lens driving controller 80 that controls driving of lenses provided in the lens block 10.

The camera block 10 includes a vari-focal length lens system 11 (vari-focal length lens systems 1, 2, 3, 4, 5, and 6 to which any embodiment of the present invention is applied), an imaging element 12, such as a charge coupled device (CCD) or a complementary metal-oxide semiconductor (CMOS).

The camera signal processing unit 20 performs signal processing including conversion of an output signal from the imaging element 12 into a digital signal, de-noising, correction of the image quality, and conversion of a signal into a luminance signal and a color-difference signal.

The image processing unit 30 performs compressing and encoding processing, and decompressing and decoding processing for an image signal on the basis of a predetermined image data format; and conversion of a data specification such as a resolution.

The LCD 40 has a function of displaying various kinds of data, such as an operating state of the user to an input unit 70.

The R/W 50 writes image data coded by the image possessing unit 30 on the memory card 1000 and reads the image data recorded on the memory card 1000.

The CPU 60 serves as a control processing unit that controls each of the circuit blocks mounted on the image pickup apparatus 100 and controls each of the circuit blocks based on an instruction input signal and so on from the input unit 70.

Input section 70 is constituted by a shutter release button for performing shutter operation, selection switch for choosing an operation mode, etc., for example, and outputs an indicating input signal according to operation by a user to CPU60.

Lens drive control section 80 controls a motor which drives each lens of vari-focal length lens system 11 based on a control signal from CPU60 and which is not illustrated.

The memory card 1000 is, for example, a semiconductor memory which is irremovably attached to a slot connected to the R/W 50.

Hereinafter, the operation of the image pickup apparatus will be described.

In a standby state of photographing, under the control of the CPU 60, an image signal captured with the lens block 10 is output to the camera signal processor 20, and then to the LCD 40, thereby being displayed as a camera-through image. In addition, when an instruction input signal for zooming is input from the input unit 70, the CPU 60 outputs a control signal to the lens drive control unit 80. Subsequently, a predetermined lens in the varifocal length system 11 id moved under the control of the lens drive control unit 80.

When a shutter (not shown) of the camera block 10 is released in response to the instruction input signal from the input unit 70, a captured image signal is output from the camera signal processing unit 20 to the image processing unit 30 where the signal is subjected to the compressing and encoding processing. Thus, the signal is converted into digital data with a predetermined format. The converted data is output to the reader/writer (R/W) 50 and then written on the memory card 1000.

Furthermore, focusing is performed by pressing a shutter-release button (not shown) of the input unit 50 halfway or completely to records (capture) an image such that the predetermined lens of the vari-focal length lens system 11 is moved by the lens drive control unit 80 in response to the control signal from the CPU 60.

To reproduce image data stored in the memory card 51, in accordance with an operation with the input unit 70, the reader/writer 50 reads desired image data from the memory card 51, the image processing unit 30 performs the decompressing and decoding processing for the image data, and then a reproduction image signal is output to the LCD 40. Accordingly, a reproduction image is displayed.

In the above-described embodiment, while the image pickup apparatus according to the embodiment of the present invention is applied to a digital still camera, the image pickup apparatus may be not limited to the digital still camera. The image pickup apparatus according to any of the embodiments is widely applicable to any of a digital video camera, a camera-equipped cellular phone, and camera section of a digital input/output apparatus such as a personal digital assistant (PDA).

In any of the aforementioned embodiments, the shapes and numerical values provided in the numerical examples are merely examples for implementing the present invention. Therefore, the technical scope of the present invention should not be restrictively interpreted by these examples.

The present application contains subject matter related to that disclosed in Japanese Priority Patent Application JP 2009-125425 filed in the Japan Patent Office on May 25, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A vari-focal length lens system comprising:
a first lens group having a positive refractive power;
a second lens group having a negative refractive power;
a third lens group having a positive refractive power, and
a fourth lens group having a positive refractive power, wherein
said first to fourth lens groups are arranged from an object side to an image side,
when a positional lens state is changed from a wide angle end state to a telephoto end state, a distance between said first lens and said second lens increases, a distance between said second lens and said third lens decreases, and a distance between said third lens and said fourth lens varies,
when said positional lens state is changed from a wide angle end state to a telephoto end state, all of said lens groups are movable, an aperture stop is arranged near said third lens group, and said fourth lens group moves at the time of short distance focusing,
said first lens group includes a negative lens with a concave that faces to an image and a positive lens with a convex that faces an object, which are arranged from said object side to said image side in this order
said second lens group includes a negative lens with a concave side to said image, a negative lens with a concave that faces to said object and an opposite concave that faces to said image, a meniscus-shaped positive lens with a convex that faces to said object, which are arranged in this order from said object side to said image side and in said second lens group, each of said object-side surface of said negative lens arranged on said object side and said object-side surface of said positive lens is formed in an aspherical shape and satisfies the following conditional expression (1):

$$2.0 < f1/(fw \cdot ft)^{1/2} < 2.5 \quad (1)$$

wherein f1 is a focal length of said first lens group, fw is a focal length in the whole lens system in a wide angle end state, and ft is a focal length in the whole lens system in a telephoto end state.

2. The vari-focal length lens system according to claim 1, wherein the following conditional expression (2) is satisfied:

$$0.65 < |dwt1/dt| < 0.9 \quad (2)$$

wherein dwt1 is a moving distance of said first lens group; and dt is air spacing between said first lens group and said second lens group in a telephoto end state.

3. The vari-focal length lens system according to claim 1, wherein the following conditional expression (3) is satisfied:

$$0.42 < |f2|/(fw \cdot ft)^{1/2} < 0.49 \quad (3)$$

wherein f2 is a focal length of said second lens group;

fw is a focal length in the whole lens system in a wide angle end state; and ft is a focal length in the whole lens system in a telephoto end state.

4. The vari-focal length lens system according to claim 2, wherein the following conditional expression (3) is satisfied:

$$0.42 < |f2|/(fw \cdot ft)^{1/2} < 0.49 \quad (3)$$

wherein f2 is a focal length of said second lens group;

fw is a focal length in the whole lens system in a wide angle end state; and ft is a focal length in the whole lens system in a telephoto end state.

5. The vari-focal length lens system according to claim 1, wherein said aperture stop is arranged on said object side of said third lens group and moves together with said third lens group when said positional lens state changes, while being expected to satisfy the following conditional expression (4):

$$0.44 < dS3/R31 < 0.58 \quad (4)$$

wherein dS3 is a distance between said aperture stop and the nearest surface of said third lens group from an image plane, and R31 is a curvature radius of the nearest surface of said third lens group from an object.

6. The vari-focal length lens system according to claim 2, wherein said aperture stop is arranged on said object side of said third lens group and moves together with said third lens group when said positional lens state changes, while being expected to satisfy the following conditional expression (4):

$$0.44 < dS3/R31 < 0.58 \quad (4)$$

wherein dS3 is a distance between said aperture stop and the nearest surface of said third lens group from an image plane, and R31 is a curvature radius of the nearest surface of said third lens group from an object.

7. The vari-focal length lens system according to claim 1, wherein the following conditional expression (5) is satisfied:

$$1.75 < f3/fw < 2.1 \quad (5)$$

wherein f3 is a focal length of said third lens group; and fw is a focal length in the whole lens system in a wide angle end state.

8. The vari-focal length lens system according to claim 2, wherein the following conditional expression (5) is satisfied:

$$1.75 < f3/fw < 2.1 \quad (5)$$

wherein f3 is a focal length of said third lens group; and fw is a focal length in the whole lens system in a wide angle end state.

9. An image pickup apparatus comprising a vari-focal length lens system and an imaging element that converts an optical image formed by said vari-focal length lens system into an electrical signal, wherein said vari-focal length lens system includes:

a first lens group having a positive refractive power;

a second lens group having a negative refractive power;

a third lens group having a positive refractive power, and a fourth lens group having a positive refractive power, wherein said first to fourth lens groups are arranged from an object side to an image side, when a positional lens state is changed from a wide angle end state to a telephoto end state, a distance between said first lens and said second lens increases, a distance between said second lens and said third lens decreases, and a distance between said third lens and said fourth lens varies, when said positional lens state is changed from a wide angle end state to a telephoto end state, all of said lens groups are movable, an aperture stop is arranged near said third lens group, and said fourth lens group moves at the time of short distance focusing, said first lens group includes a negative lens with a concave that faces to an image and a positive lens with a convex that faces an object, which are arranged from said object side to said image side in this order said second lens group includes a negative lens with a concave side to said image, a negative lens with a concave that faces to said object and an opposite concave that faces to said image, a meniscus-shaped positive lens with a convex that faces to said object, which are arranged in this order from said object side to said image side and in said second lens group, each of the object-side surface of said negative lens arranged on said object side and the object-side surface of said positive lens is formed in an aspherical shape and satisfies the following conditional expression (1):

$$2.0 < f1/(fw \cdot ft)^{1/2} < 2.5 \quad (1)$$

wherein
- f1 is a focal length of said first lens group,
- fw is a focal length in the whole lens system in a wide angle end state, and ft is a focal length in the whole lens system in a telephoto end state.

10. A vari-focal length lens system comprising:
- a first lens group having a positive refractive power;
- a second lens group having a negative refractive power;
- a third lens group having a positive refractive power, and
- a fourth lens group having a positive refractive power, wherein
- said first to fourth lens groups are arranged from an object side to an image side,
- when a positional lens state is changed from a wide angle end state to a telephoto end state, a distance between said first lens and said second lens increases, a distance between said second lens and said third lens decreases, and a distance between said third lens and said fourth lens varies,
- when a positional lens state is changed from a wide angle end state to a telephoto end state, all of said lens groups are movable, and an aperture stop is arranged near said fourth lens group moves at the time of short distance focusing,
- said first lens group includes a negative lens with a concave that faces to an image and a positive lens with a convex that faces an object, which are arranged from said object side to said image side in this order,
- said second lens group includes a negative lens with a concave that faces to an image, a negative lens with a concave that faces to said object and an opposite concave that faces to said image, and a meniscus-shaped positive lens with a convex that faces to said object, which are arranged from an object side to an image side, and
- in said second lens group, each of the object-side surface of said negative lens arranged on said object side and the image-side surface of said positive lens is formed in an aspherical shape and satisfies the following conditional expression (7):

$$2.4 < f1/(fw \cdot ft)^{1/2} < 2.7 \tag{7}$$

wherein
- f1 is a focal length of said first lens group,
- fw is a focal length in the whole lens system in a wide angle end state, and ft is a focal length in the whole lens system in a telephoto end state.

11. The vari-focal length lens system according to claim 10, wherein
the following conditional expression (8) is satisfied:

$$5 < |dwt1/dwt2| < 5.8 \tag{8}$$

wherein
- dwt1 is a moving distance of said first lens group; and
- dwt2 is a moving distance of said second lens group.

12. The vari-focal length lens system according to claim 10, wherein
the following conditional expression (9) is satisfied:

$$0.47 < |f2|/(fw \cdot ft)^{1/2} < 0.53 \tag{9}$$

wherein
- f2 is a focal length of said second lens group;
- fw is a focal length in the whole lens system in a wide angle end state; and
- ft is a focal length in the whole lens system in a telephoto end state.

13. The vari-focal length lens system according to claim 11, wherein
the following conditional expression (9) is satisfied:

$$0.47 < |f2|/(fw \cdot ft)^{1/2} < 0.53 \tag{9}$$

wherein
- f2 is a focal length of said second lens group;
- fw is a focal length in the whole lens system in a wide angle end state; and
- ft is a focal length in the whole lens system in a telephoto end state.

14. The vari-focal length lens system according to claim 10, wherein
said aperture stop is arranged on said object side of said third lens group and moves together with said third lens group when said positional lens state changes, while being expected to satisfy the following conditional expression (10):

$$0.53 < dS3/R31 < 0.59 \tag{10}$$

wherein
- dS3 is a distance between said aperture stop and the nearest surface of said third lens group from an image plane, and
- R31 is a curvature radius of the nearest surface of said third lens group from an object.

15. The vari-focal length lens system according to claim 11, wherein
said aperture stop is arranged on said object side of said third lens group and moves together with said third lens group when said positional lens state changes, while being expected to satisfy the following conditional expression (10):

$$0.53 < dS3/R31 < 0.59 \tag{10}$$

wherein
- dS3 is a distance between said aperture stop and the nearest surface of said third lens group from an image plane, and
- R31 is a curvature radius of the nearest surface of said third lens group from an object.

16. The vari-focal length lens system according to claim 10, wherein
the following conditional expression (11) is satisfied:

$$2.1 < f3/fw < 2.3 \tag{11}$$

wherein
- f3 is a focal length of said third lens group; and
- fw is a focal length in the whole lens system in a wide angle end state.

17. The vari-focal length lens system according to claim 11, wherein
the following conditional expression (11) is satisfied:

$$2.1 < f3/fw < 2.3 \tag{11}$$

wherein
- f3 is a focal length of said third lens group; and
- fw is a focal length in the whole lens system in a wide angle end state.

18. The vari-focal length lens system according to claim 12, wherein
the following conditional expression (12) is satisfied:

$$5.6 < f5/fw < 7.2 \tag{12}$$

wherein
- f5 is a focal length of said fifth lens group; and
- fw is a focal length in the whole lens system in a wide angle end state.

19. The vari-focal length lens system according to claim 11, wherein
the following conditional expression (12) is satisfied:

$$5.6 < f5/fw < 7.2 \qquad (12)$$

wherein
f5 is a focal length of said fifth lens group; and
fw is a focal length in the whole lens system in a wide angle end state.

20. An image pickup apparatus comprising a vari-focal length lens system and an imaging element that converts an optical image formed by said vari-focal length lens system into an electrical signal, wherein
said vari-focal length lens system includes:
a first lens group having a positive refractive power;
a second lens group having a negative refractive power;
a third lens group having a positive refractive power, and
a fourth lens group having a positive refractive power, wherein
said first to fourth lens groups are arranged from an object side to an image side,
when a positional lens state is changed from a wide angle end state to a telephoto end state, a distance between said first lens and said second lens increases, a distance between said second lens and said third lens decreases, and a distance between said third lens and said fourth lens varies,
when a positional lens state is changed from a wide angle end state to a telephoto end state, all of said lens groups are movable, and an aperture stop is arranged near said fourth lens group moves at the time of short distance focusing,
said first lens group includes a negative lens with a concave that faces to an image and a positive lens with a convex that faces an object, which are arranged from said object side to said image side in this order,
said second lens group includes a negative lens with a concave that faces to an image, a negative lens with a concave that faces to said object and an opposite concave that faces to said image, and a meniscus-shaped positive lens with a convex that faces to said object, which are arranged from an object side to an image side, and
in said second lens group, each of said object-side surface of said negative lens arranged on said object side and the image-side surface of said positive lens is formed in an aspherical shape and satisfies the following conditional expression (7):

$$2.4 < f1/(fw \cdot ft)^{1/2} < 2.7 \qquad (7)$$

wherein
f1 is a focal length of said first lens group,
fw is a focal length in the whole lens system in a wide angle end state, and ft is a focal length in the whole lens system in a telephoto end state.

\* \* \* \* \*